United States Patent [19]
Kimura et al.

[11] Patent Number: 6,018,980
[45] Date of Patent: Feb. 1, 2000

[54] METHOD AND DEVICE FOR DETERMINING DEFORMATION OF A VEHICLE SIDE PART

[75] Inventors: Hiroaki Kimura; Junji Kanamoto, both of Osaka; Shigeo Tobaru, Tokyo, all of Japan

[73] Assignees: NEC Home Electronics, Ltd.; Honda Giken Kogyo Kabushiki Kaisha, both of Tokyo, Japan

[21] Appl. No.: 09/063,386

[22] Filed: Apr. 21, 1998

[30] Foreign Application Priority Data

Apr. 21, 1997 [JP] Japan .................................. 9-117632
Feb. 27, 1998 [JP] Japan ................................ 10-063987

[51] Int. Cl.$^7$ .................................................. G01M 7/00
[52] U.S. Cl. .......................................................... 73/12.04
[58] Field of Search .............................. 73/12.01, 12.04, 73/12.09

[56] References Cited

U.S. PATENT DOCUMENTS

| | | | |
|---|---|---|---|
| 3,759,085 | 9/1973 | Wilson et al. | 73/12.09 |
| 4,379,401 | 4/1983 | Miguel | 73/12.08 |
| 4,452,066 | 6/1984 | Klochko et al. | 73/12.01 |
| 5,445,412 | 8/1995 | Gillis et al. | 280/735 |
| 5,580,084 | 12/1996 | Gioutsos | 280/735 |
| 5,684,701 | 11/1997 | Breed | 701/45 |

FOREIGN PATENT DOCUMENTS 4-325349  11/1992  Japan .

*Primary Examiner*—Max Noori
*Attorney, Agent, or Firm*—Armstrong, Westerman, Hattori, McLeland & Naughton

[57] ABSTRACT

The present invention allows accurate determination as to if deformation of a vehicle side part has occurred or not as a result of a side impact even though the used data consists of outputs of acceleration sensors for detecting accelerations given as combinations of deformation of a vehicle side part and a travel of the vehicle body. The device comprises a unit for detecting an acceleration produced in a first part of the vehicle body which moves in response to a deformation of the vehicle side part resulting from a side impact; a unit for detecting an acceleration produced in a second part of the vehicle body which substantially does not move in response to a deformation of the vehicle side part resulting from a side impact; a unit for analyzing frequency components included in a time change of the detected acceleration of the first vehicle body part over a prescribed preceding time period; a unit for analyzing frequency components included in a time change of the detected acceleration of the second vehicle body part over a prescribed preceding time period; and a unit for determining deformation of a vehicle side part resulting from a side impact according to the frequency components obtained by the two analyzing units.

43 Claims, 23 Drawing Sheets

FIG. 5
(a)
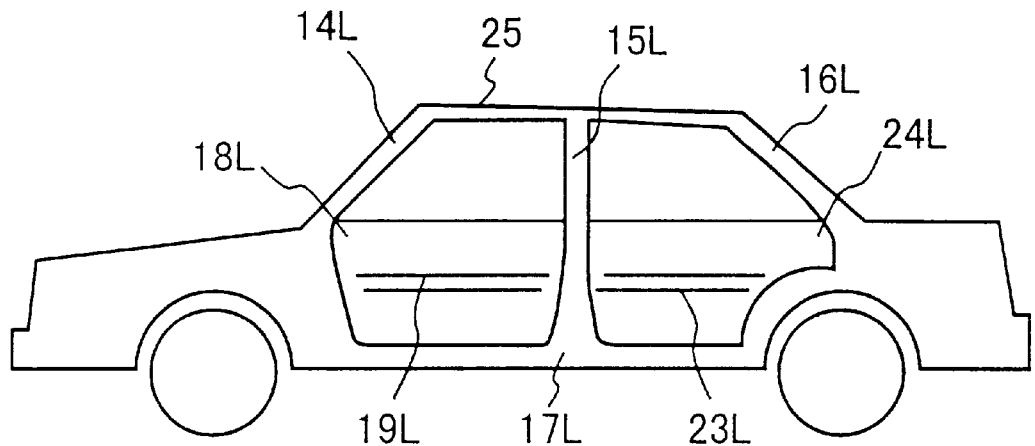
(b)
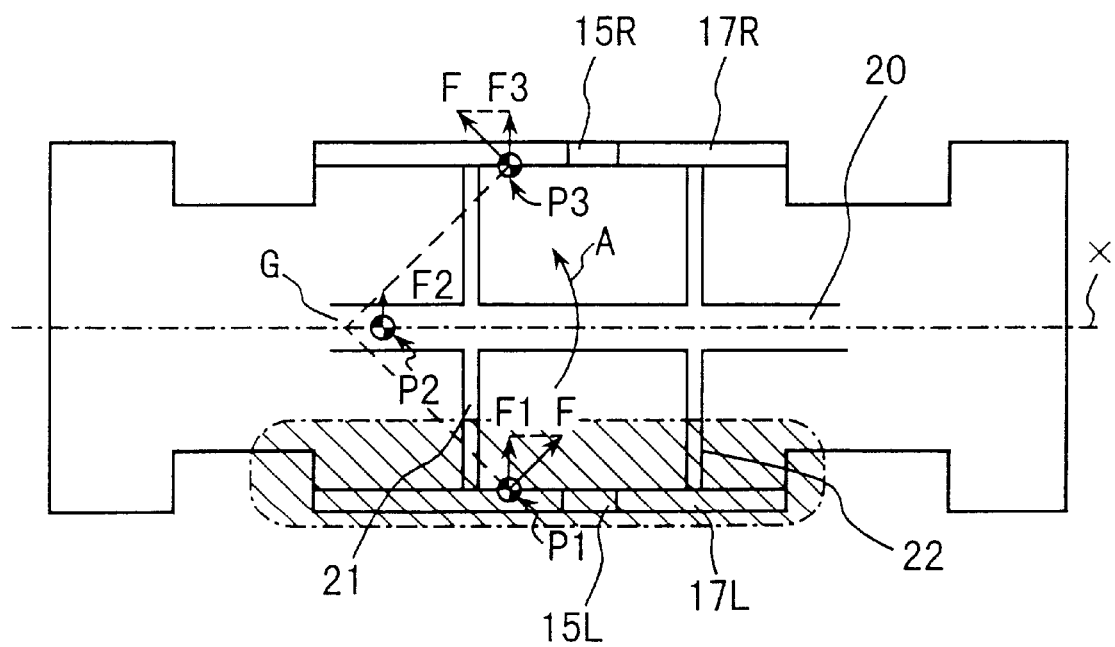

FIG. 25
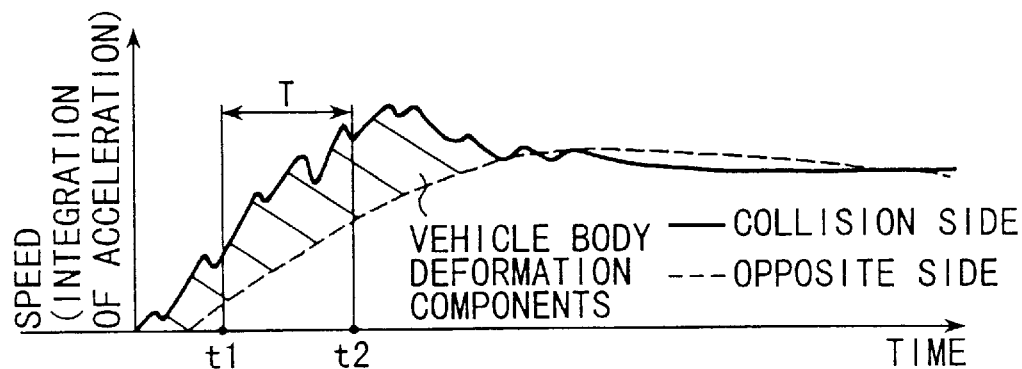
(a) COLLISION INVOLVING SIDE DEFORMATION
(SUCH AS INTERMEDIATE SPEED SIDE COLLISION)
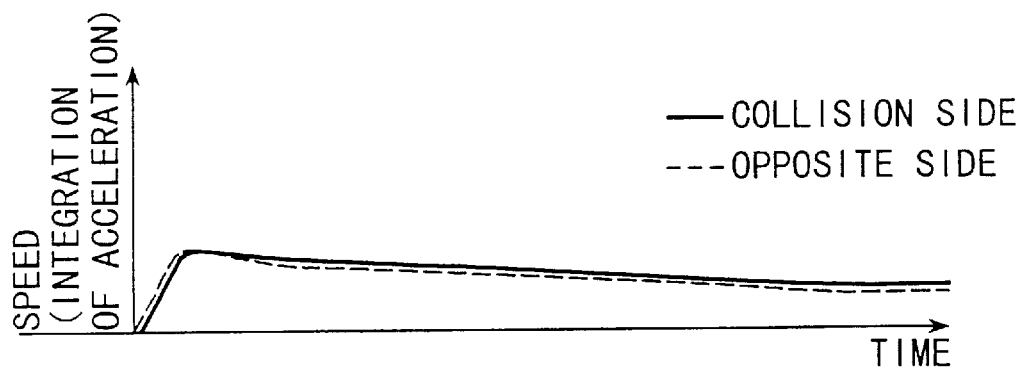
(b) COLLISION INVOLVING NO SIDE DEFORMATION
(SUCH AS LOW SPEED CURBSTONE SIDE COLLISION)
FIG. 26
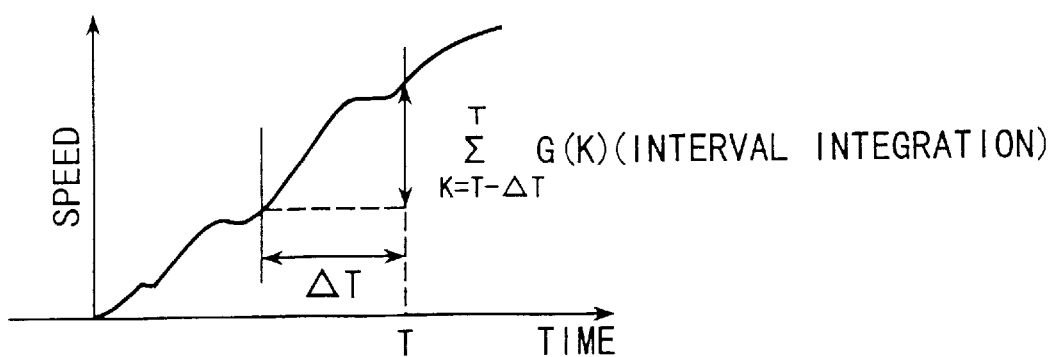
$\sum_{K=T-\Delta T}^{T} G(K)$ (INTERVAL INTEGRATION)

METHOD AND DEVICE FOR DETERMINING DEFORMATION OF A VEHICLE SIDE PART

TECHNICAL FIELD

The present invention relates to a device for determining deformation of a side part of a passenger compartment which accommodates a vehicle occupant according to the output from one or more than one acceleration sensors mounted to suitable locations in a vehicle body. In particular, the present invention relates to a device for detecting deformation of a vehicle side part which is suitable for the application of improving the performance of a side air bag activation control system for a vehicle.

BACKGROUND OF THE INVENTION

There are two types of situations where a side air bag is required to be activated. A situation of a first type can occur when a heavy object such as another vehicle collides with a side part of a vehicle body at a high speed. In this case, the door inner panel intrudes into the passenger compartment ("intrusion") before the vehicle occupant is thrown onto the door by the inertia of the vehicle occupant, thereby causing an injury to the vehicle occupant. A situation of a second type can occur when a heavy object such as another vehicle collides with a side part of a vehicle body at an intermediate speed. In this case, although the intrusion may be relatively insignificant, because of the inertial movement of the vehicle occupant toward the door combined with the intrusion, the vehicle occupant may still hit the inner surface of the door in such a forcible manner that the vehicle occupant may sustain an injury.

To appropriately deal with such different situations, it is conceivable to install a switch such as a compression switch inside the door so as to activate a side air bag in response to the actuation of the switch by an intrusion resulting from a vehicle crash.

However, according to such a proposal, because the detection area that can be covered by each sensor such as a compression switch is relatively limited, it is necessary to install such a large number of sensors in a side part of the vehicle body to deal with a wide range of conceivable situations that a substantial cost will be necessary. Also, when the deformation of the door is relatively small even though the crash speed is high such as when the center pillar (B pillar) of the vehicle body hits a utility pole, expanding the detection area in the door cannot necessarily ensure reliable actuation of these sensors.

It is also conceivable to mount an acceleration sensor to a relatively rigid part of the vehicle body such as a lower part of the center pillar and the side sill, and, with the aim of dealing with a wide range of different side impact modes, monitor a composite acceleration given as a combination of the deformation of the side part of the vehicle body detected by this acceleration sensor and the travel of the overall vehicle body (or the translational movement of the vehicle body) by using a plurality of interval integrators having different integration times (typically carried out as a sliding window integration process by software) as proposed in Japanese patent laid open publication (kokai) No. 4-325349.

According to this proposal, because the acceleration sensor mounted to a side part of the vehicle body is attached to a relatively rigid part of the vehicle body, the single acceleration sensor can deal with impacts over a wide area of a side part of the vehicle body, and can deal with different situations simply by adjusting the integration times of the interval integrators and the determination threshold value through modification of the circuit design and the software, the overall structure can be simplified, and the production cost can be reduced.

For instance, when a heavy object such as another vehicle collides with a side part of a vehicle body at a high speed, and the door inner panel intrudes into the passenger compartment ("intrusion") before the vehicle occupant is thrown onto the door by the inertia of the vehicle occupant, thereby causing an injury to the vehicle occupant (which is referred to as "high speed side impact" hereinafter), such an occurrence can be detected by shortening the integration time (integration interval) to the order of 5 ms, and comparing the result of each interval integration with a prescribed threshold value.

In case of an incidence where a massive object such as another vehicle collides at an intermediate speed with a vehicle side part near the vehicle occupant, and the vehicle occupant is thrown onto the door inner panel or the like due to the combination of the intrusion and the inertial movement of the vehicle occupant toward the door, resulting an injury to the vehicle occupant (intermediate speed side impact), such an incidence can be determined by setting the integration time (integration interval) relatively long (in the order of 10 to 40 ms), and comparing the result of each interval integration with a prescribed threshold value.

However, according to such a side air bag activation control device, because it is unconditionally determined that the side air bag needs to be activated once the result of interval integration of acceleration, which has been monitored, and is given as a combination of the deformation of a vehicle side part and the travel of the entire vehicle, has exceeded a prescribed threshold value, in case of a special mode of impact which would not cause an injury to the vehicle occupant in spite of a significant change in velocity during the interval of integration, an erroneous determination may be made that the side air bag is required to be activated even though it is in fact unnecessary. The "travel" as used herein means the translational movement of the vehicle body.

For instance, when the vehicle has slid sideways and collided with a curbstone or when the vehicle obliquely collides with a curbstone and is bounced back again in an oblique direction, because the impact is produced by the collision of rigid bodies such as the vehicle side wheel or the side sill with the curbstone, even when the speed of the vehicle may be so low that there is no possibility of the vehicle occupant sustaining any injury, because the change in velocity during the integration interval immediately following the impact tends to be significantly high, an erroneous determination may be made that the side air bag is required to be activated even though it is in fact unnecessary if the determination logic for an impact at an intermediate speed is applied. It was also discovered that a low speed collision with a curbstone could produce a sharp change in velocity in a short time interval which is comparable to that of a high speed side impact.

Also, in case of a collision at a side of a front part or a rear part of the vehicle body (which is referred to as an offset side impact hereinafter) which causes little deformation to a side of the passenger compartment could cause a significant change in velocity during the integration interval immediately following the impact even though the speed level is so low that there is no possibility of the vehicle occupant sustaining an injury, an erroneous determination may be made that the side air bag is required to be activated even though it is in fact unnecessary if the determination logic for an impact at an intermediate speed is applied.

Such determination processes are more fully described in the following with reference to FIG. 25. In this drawing, (a) denotes a graph showing a time change of total integration (integration over the entire time interval from immediately after the impact to the elapsing of 100 ms) in a case where the activation of a side air bag is necessary such as a case of an intermediate speed side impact, and (b) denotes a graph showing a time change of total integration (integration over the entire time interval from immediately after the impact to the elapsing of 100 ms) in a case where the activation of a side air bag is not necessary such as a case of a low speed side collision with a curbstone.

In these graphs, t1 indicates the time point by which the determination of impact should be completed, t2 indicates a time point at which the vehicle occupant may sustain an injury, and T indicates the time period required for the deployment of a side air bag. The solid line indicates the values corresponding to the output of the acceleration sensor attached to the collision side of the vehicle body while the broken line indicates the values corresponding to the output of the acceleration sensor attached to the opposite side of the vehicle body.

As shown in FIG. 25(a), in case of a side impact involving a side deformation, the result of total integration of the acceleration on the collision side (impact side) of the vehicle body rises relatively sharply, and continues to rise even after passing the determination time point t1 because of the presence of the component of the deformation of the vehicle body indicated by the shaded area in the drawing. On the other hand, as shown in FIG. 25(b), even in case of a side impact not involving a side deformation such as a collision of a side of a wheel or a side sill with a curbstone, although the speed of impact is relatively small, the result of total integration of the acceleration rises equally sharply, and may reach a level comparable to that of an impact involving deformation.

The interval integration of acceleration which is used for determining an impact may be deemed to be substantially equal to the result of integrating the output G(k) of the acceleration sensor over a prescribed integration time interval $\Delta T$, or to the slope of the curves shown in FIGS. 25(a) and (b). Therefore, as long as the need for activating a side air bag is determined by comparing the result of an interval integration with a single threshold value, it is difficult to distinguish the case of an intermediate speed collision which requires the activation of a side air bag as indicated in FIG. 25(a) and the case of a low speed side collision with a curbstone which does not require the activation of a side air bag as indicated in FIG. 25(b).

In this conjunction, the Inventors have realized that the cases of FIGS. 25(a) and 25(b) can be distinguished from each other if the deformation of a vehicle side part or the deformation of the passenger compartment accommodating the vehicle occupant can be directly determined, and have accordingly arrived at the following lemmas.

With respect to the frequency distribution of the output of an acceleration sensor attached to a vehicle body part which moves in response to a deformation of a vehicle side part as a result of a side impact over a preceding time period, a certain correlation can be found between the two frequency distributions obtained during the time period when the deformation of the vehicle side part is in progress, and during the time period when the deformation of the vehicle side part is not in progress (first lemma).

With respect to the frequency distributions of the outputs of an acceleration sensor attached to a first vehicle body part which moves in response to a deformation of a vehicle side part as a result of a side impact and another acceleration sensor attached to a second vehicle body part which does not substantially move in response to a deformation of a vehicle side part as a result of the side impact over a preceding time period, a certain correlation can be found between the two frequency distributions obtained from the two sensors during the time period when the deformation of the vehicle side part is in progress, and during the time period when the deformation of the vehicle side part is not in progress (second lemma).

It is presumed that these correlations may be attributed to the presence and absence of certain frequency components which are specific to the occurrence of a side impact.

BRIEF SUMMARY OF THE INVENTION

In view of such problems of the prior art and the discovery made by the Inventors, a primary object of the present invention is to allow an accurate determination of the occurrence of deformation of a vehicle side part by using an acceleration signal obtained from a vehicle part which moves in response to a deformation of a vehicle side part as a result of a side impact although it is give as a combination contributions from the travel of the entire vehicle body and the deformation of the vehicle body.

A second object of the present invention is to provide a method and device for determining the occurrence of a deformation of a vehicle side part which are useful as means for providing signals for activating vehicle occupant restraint systems such as vehicle side air bag systems.

A third object of the present invention is to provide a method and device for determining the occurrence of a deformation of a vehicle side part which are useful as means for avoiding erroneous signals for activating vehicle occupant restraint systems such as vehicle side air bag systems from being produced so that undesirable deployment of the occupant restraint system can be prevented when such a deployment is in fact unnecessary.

A fourth object of the present invention is to provide a method and device which can accurately evaluate the nature of an acceleration obtained as a result of a side impact if it warrants a deployment of a protective device such as a side air bag by taking into account the occurrence of a deformation of a side part of the vehicle body.

These and other objects of the present invention can be accomplished by the inventive concept of the present invention which is set forth in this specification.

As described earlier, as a result of research efforts, the Inventors have realized that the cases of FIGS. 25(a) and 25(b) can be distinguished from each other if the deformation of a vehicle side part or the deformation of the passenger compartment accommodating the vehicle occupant can be directly determined, and have accordingly arrived at the following two lemmas.

With respect to the frequency distribution of the output of an acceleration sensor attached to a vehicle body part which moves in response to a deformation of a vehicle side part as a result of a side impact over a preceding time period, a certain correlation can be found between the two frequency distributions obtained during the time period when the deformation of the vehicle side part is in progress, and during the time period when the deformation of the vehicle side part is not in progress as indicated in FIGS. 1(I)(a) and 1(II)(a') (first lemma).

With respect to the frequency distributions of the outputs of an acceleration sensor attached to a first vehicle body part which moves in response to a deformation of a vehicle side part as a result of a side impact and another acceleration sensor attached to a second vehicle body part which does not substantially move as a result of the side impact over a preceding time period, a certain correlation can be found between the two frequency distributions obtained from the two sensors during the time period when the deformation of the vehicle side part is in progress, and during the time period when the deformation of the vehicle side part is not in progress as can be appreciated by comparing FIGS. 1(I)(a), 1(I)(b) and 1(I)(c), and comparing FIGS. 1(II)(a)', 1(II)(b') and 1(II)(c') (second lemma).

It is presumed that these correlations may be attributed to the presence and absence of certain frequency components which are specific to the occurrence of a side impact.

The aspect of the invention which is based on the first lemma, and uses only a part which is sensitive to a side deformation (such as a collision side of the vehicle body) for the point for detecting the acceleration needed for the determination of deformation of a vehicle side part is called as "single point embodiment", and the aspect of the invention which is based on the second lemma, and uses both a part which is sensitive to a side deformation (such as a collision side of the vehicle body) and a part which is insensitive to a side deformation (such as an opposite side or the central part of the vehicle body) for the points for detecting the accelerations needed for the determination of deformation of a vehicle side part is called as "multiple point embodiment".

Now is described the single point embodiment.

According to this arrangement, the acceleration produced in a part of the vehicle body which moves in response to a deformation of a vehicle part as a result of a side impact is detected. Then, the frequency components contained in the change of the acceleration over a preceding prescribed time interval are analyzed. Finally, the occurrence of a side deformation is determined according to the frequency components obtained from the frequency analysis.

According to this embodiment, it is possible to determine a deformation of a vehicle side part of interest by using only one acceleration sensor. If a side air bag is provided only on one side of the vehicle body, only one acceleration sensor is needed for determining a deformation of a vehicle side part.

The "prescribed preceding time interval" that is required for the analysis of the frequency components contained in the change in acceleration can be determined from various view points. Basically, a "prescribed preceding time interval" is determined by considering how long a time period (maximum time period for completing the determination process) is allowed before a determination of the need to deploy a vehicle occupant side restraint system (such as a side air bag" is completed from the time point of the onset of a side impact. The maximum time period for completing the determination process depends of the structure of the vehicle body (in particular, the rigidity of the vehicle body), and the time period required for the deployment of the vehicle occupant side restraint system (such as a side air bag). The "prescribed preceding time interval" is typically selected in a range of 5 ms to 30 ms.

The determination of the occurrence of a deformation of a vehicle side part can be made by comparing the frequency components obtained by the frequency analysis with a certain reference value according to a determination logic. This determination logic allows a time interval involving an intrusion (side deformation) and a time interval not involving an intrusion to be accurately distinguished according to the differences between the distributions of frequency components shown in FIGS. 1(I)(a) and 1(II)(a').

One of the determination logics is based on the evaluation of high frequency components obtained from the frequency analysis. More specifically, this determination logic allows the occurrence of a deformation of a vehicle side part according to the comparison of high frequency components with a reference value. If the high frequency components are larger than the reference value, it can be determined that a deformation has been produced in a vehicle side part. If the high frequency components are smaller than the reference value, it can be determined that a deformation has not been produced in a vehicle side part.

Another determination logic is based on the evaluation of low frequency components or a wider frequency range including low frequency components in relation with high frequency components. More specifically, this determination logic allows the occurrence of a deformation of a vehicle side part according to the comparison of the low frequency components or a wider frequency range including low frequency components with the high frequency components. According to this determination logic, occurrence of side deformation is determined if the ratio between the low frequency components in relation with high frequency components and the high frequency components obtained by the frequency analysis is greater than a reference value. Conversely, non-occurrence of side deformation is determined if the ratio between the low frequency components in relation with high frequency components and the high frequency components obtained by the frequency analysis is greater than a reference value.

The above two determination logics were specifically taken as examples in this application because these determination logics allow a case of the occurrence of a deformation of a vehicle side part and a case of non-occurrence of a deformation of a vehicle side part can be accurately distinguished, given the differences in the distributions of the frequency components shown in FIGS. 1(I)(a) and 1(II)(a').

Now is described the single point embodiment.

According to this arrangement, the acceleration produced in a first part of the vehicle body which moves in response to a deformation of a vehicle part, and the acceleration produced in a second part of the vehicle body which does not substantially move in response to a deformation of a vehicle part as a result of a side impact are detected. Then, the frequency components contained in the change of the accelerations at the first and second parts of the vehicle body over a preceding prescribed time interval are analyzed. Finally, the occurrence of a side deformation is determined according to the two sets of frequency components obtained from the frequency analysis.

Because the accelerations detected at the two locations consisting of the first part of the vehicle body which moves in response to a deformation of a vehicle part, and the second part of the vehicle body which does not substantially move in response to a deformation of a vehicle part as a result of a side impact, an even more accurate determination of the occurrence of deformation of vehicle side part is possible.

The second part of the vehicle body can be located near a central longitudinal line extending in a fore-and-aft direction of the vehicle body. Thus, when the first part of the vehicle body is arranged symmetrically with respect to the longitudinal line of the vehicle body, the second part of the vehicle body may be a common part for two systems. Additionally, by sharing the acceleration sensor on the center tunnel with the existing frontal air bag system, and the need of an additional acceleration sensor may be eliminated.

The second part of the vehicle body can be located symmetrically to the first part of the vehicle body with respect to a central longitudinal line extending in a fore-and-aft direction of the vehicle body. In this case, by arranging the first part of the vehicle body symmetric with respect to the longitudinal line of the vehicle body, the two first parts of the vehicle body may serve as the second parts of the vehicle body for two systems, and the need to provide any separate second parts of the vehicle body may be eliminated.

The second part of the vehicle body can be located both at a part near a central longitudinal line extending in a fore-and-aft direction of the vehicle body, and a part symmetrically to the first part of the vehicle body with respect to the central longitudinal line to provided a certain redundancy to the system. Thus, a highly reliable system can be achieved by using three acceleration sensor for each system.

The determination of the occurrence of deformation of a vehicle side part is based on the comparison of frequency components of the acceleration detected at the first part of the vehicle body, and frequency components at the second part of the vehicle body obtained by the frequency analysis with a certain reference value according to a determination logic. This determination logic allows a time interval involving an intrusion (side deformation) and a time interval not involving an intrusion to be accurately distinguished according to the differences between the distributions of frequency components shown in FIGS. 1(I)(*a*) and 1(II)(*a*').

A first exemplary determination logic is based on the comparison of high frequency components of the acceleration detected at the first part of the vehicle body, and low frequency components or a wider frequency range including low frequency components. More specifically, according to this determination logic, the occurrence of deformation of a vehicle side part is determined from the comparison of the high frequency components of the acceleration detected at the first part of the vehicle body, and the low frequency components or a wider frequency range including low frequency components. For instance, the occurrence of deformation of a vehicle side part is determined when the ratio between the high frequency components of the acceleration detected at the first part of the vehicle body, and the low frequency components or a wider frequency range including low frequency components is smaller than a reference value. On the other hand, the non-occurrence of deformation of a vehicle side part is determined when the ratio between the high frequency components of the acceleration detected at the first part of the vehicle body, and the low frequency components or a wider frequency range including low frequency components is larger than a reference value.

A second exemplary determination logic is based on the comparison of low frequency components or a wider frequency range including low frequency components of the acceleration detected at the first part of the vehicle body, and low frequency components or a wider frequency range including low frequency components. More specifically, according to this determination logic, the occurrence of deformation of a vehicle side part is determined from the comparison of the low frequency components or a wider frequency range including low frequency components of the acceleration detected at the first part of the vehicle body, and the low frequency components or a wider frequency range including low frequency components. For instance, the occurrence of deformation of a vehicle side part is determined when the ratio between the low frequency components or a wider frequency range including low frequency components of the acceleration detected at the first part of the vehicle body, and the low frequency components or a wider frequency range including low frequency components is smaller than a reference value. On the other hand, the non-occurrence of deformation of a vehicle side part is determined when the ratio between the low frequency components or a wider frequency range including low frequency components of the acceleration detected at the first part of the vehicle body, and the low frequency components or a wider frequency range including low frequency components is larger than or substantially equal to a reference value.

A first exemplary determination logic is based on the comparison of high frequency components of the acceleration detected at the first part of the vehicle body, and high frequency components. More specifically, according to this determination logic, the occurrence of deformation of a vehicle side part is determined from the comparison of the high frequency components of the acceleration detected at the first part of the vehicle body, and the high frequency components. For instance, the occurrence of deformation of a vehicle side part is determined when the ratio between the high frequency components of the acceleration detected at the first part of the vehicle body, and the high frequency components is smaller than a reference value. On the other hand, the non-occurrence of deformation of a vehicle side part is determined when the ratio between the high frequency components of the acceleration detected at the first part of the vehicle body, and the high frequency components is larger than or substantially equal to a reference value.

The above three determination logics were specifically taken as examples in this application because these determination logics allow a case of the occurrence of a deformation of a vehicle side part and a case of non-occurrence of a deformation of a vehicle side part can be accurately distinguished, given the differences in the distributions of the frequency components shown between FIGS. 1(I)(*a*), 1(I)(*b*) and 1(I)(*c*) and between FIGS. 1(II)(*a*'),1(II)(*b*') and 1(II)(*c*').

Methods for analyzing the frequency components in the detected acceleration includes the method of extracting frequency components by filtering the acceleration detected at a part of the vehicle body by using various filters, and integrating the obtained value with appropriate signs or the absolute value thereof over a prescribed interval.

The comparison between two sets of frequency components or between frequency components and a reference value that is required for the determination of the occurrence of deformation of a vehicle side part can be made by comparing the on-timings of binary values obtained from these data. By using the time comparison of the on-timings, the circuit structure can be simplified, and the influences from noises can be reduced as compared with the arrangement involving direct transmission of acceleration data between different units.

This concept of time comparison of on-timings can be applied to the single point embodiment by providing binary value conversion means for converting frequency components into binary values in the acceleration detecting unit on the collision side of the vehicle body. The determination means may be provided in the acceleration detecting unit, or in a control unit which is typically mounted on the center tunnel in a central part of the vehicle body.

The determination of the occurrence of deformation of a side part of a vehicle body in the determination means may be, for instance, based on the comparison between the on-timing of the binary output signal corresponding to the high frequency components contained in the output signal of the acceleration sensor incorporated in the acceleration detecting unit over a prescribed preceding time period, and a prescribed reference timing.

Alternatively, the determination of the occurrence of deformation of a side part of a vehicle body in the determination means may be, for instance, based on the comparison between the on-timing of the binary output signal corresponding to the high frequency components contained in the output signal of the acceleration sensor incorporated in the acceleration detecting unit over a prescribed preceding time period, and the on-timing of the binary output signal corresponding to the low frequency components or a wide frequency range including low frequency components contained in the output signal of the acceleration sensor incorporated in the acceleration detecting unit over a prescribed preceding time period.

This concept of time comparison of on-timings can be applied to the multiple point embodiment by providing binary value conversion means for converting frequency components into binary values in both the acceleration detecting units on the collision side and the opposite side or the central part of the vehicle body.

The determination means may be provided in the acceleration detecting unit on either the collision side or the opposite side of the vehicle body (including the central part of the vehicle body), or in other locations.

The determination of the occurrence of deformation of a side part of a vehicle body in the determination means may be, for instance, based on the comparison between the on-timing of the binary output signal corresponding to the high frequency components contained in the output signal of the acceleration sensor incorporated in the acceleration detecting unit on the collision side over a prescribed preceding time period, and the on-timing of the binary output signal corresponding to the low frequency components or a wide frequency range including low frequency components contained in the output signal of the acceleration sensor incorporated in the acceleration detecting unit on the opposite side (including the central part) over a prescribed preceding time period.

The determination of the occurrence of deformation of a side part of a vehicle body in the determination means may be, for instance, based on the comparison between the on-timing of the binary output signal corresponding to the low frequency components or a wide frequency range including low frequency components contained in the output signal of the acceleration sensor incorporated in the acceleration detecting unit on the collision side over a prescribed preceding time period, and the on-timing of the binary output signal corresponding to the high frequency components contained in the output signal of the acceleration sensor incorporated in the acceleration detecting unit on the opposite side (including the central part) over a prescribed preceding time period.

The determination of the occurrence of deformation of a side part of a vehicle body in the determination means may be, for instance, based on the comparison between the on-timing of the binary output signal corresponding to the high frequency components contained in the output signal of the acceleration sensor incorporated in the acceleration detecting unit on the collision side over a prescribed preceding time period, and the on-timing of the binary output signal corresponding to the high frequency components contained in the output signal of the acceleration sensor incorporated in the acceleration detecting unit on the opposite side (including the central part) over a prescribed preceding time period.

The deformation determining devices of the single point type, the multiple point type, and the on-timing comparison type can be used for the switch over control between a first impact determination system for application when deformation of a vehicle side part is involved and a second impact determination system for application when substantially no deformation of a vehicle side part is involved in a vehicle occupant restraint system (such as a vehicle side air bag system).

BRIEF DESCRIPTION OF THE DRAWINGS

Now the present invention is described in the following with reference to the appended drawings, in which:

FIG. 5 is a vehicle structural view for illustrating the locations for mounting the acceleration sensors;

FIG. 25 is a graph for illustrating the problems of the conventional device. entire side air bag activation; and FIG. 26 is a diagram for illustrating the definition of interval integration.

DETAILED DESCRIPTION OF THE PREFERRED EMBODIMENTS

EMBODIMENT

Now the present invention is described in the following in more detail in terms of concrete embodiments with reference to the appended drawings.

Determination Principle

As described earlier, as a result of research efforts, the Inventors have realized that the cases of FIGS. 25(a) and 25(b) can be distinguished from each other if the deformation of a vehicle side part or the deformation of the passenger compartment accommodating the vehicle occupant can be directly determined, and have accordingly arrived at the following two lemmas.

With respect to the frequency distribution of the output of an acceleration sensor attached to a vehicle body part which moves in response to a deformation of a vehicle side part as a result of a side impact over a preceding time period, a certain correlation can be found between the two frequency distributions obtained during the time period when the deformation of the vehicle side part is in progress, and during the time period when the deformation of the vehicle side part is not in progress (first lemma).

With respect to the frequency distributions of the outputs of an acceleration sensor attached to a first vehicle body part which moves in response to a deformation of a vehicle side part as a result of a side impact and another acceleration sensor attached to a second vehicle body part which does not substantially move as a result of a side impact over a preceding time period, a certain correlation can be found between the two frequency distributions obtained from the two sensors during the time period when the deformation of the vehicle side part is in progress, and during the time period when the deformation of the vehicle side part is not in progress (second lemma).

It is presumed that these correlations may be attributed to the presence and absence of certain frequency components which are specific to the occurrence of a side impact. In other words, an acceleration signal resulting from an intrusion appears to include low frequency components primarily due to the deformation of the components of the vehicle body and high frequency components primarily due to the rupture and collapse of the components of the vehicle body.

Figure 1:
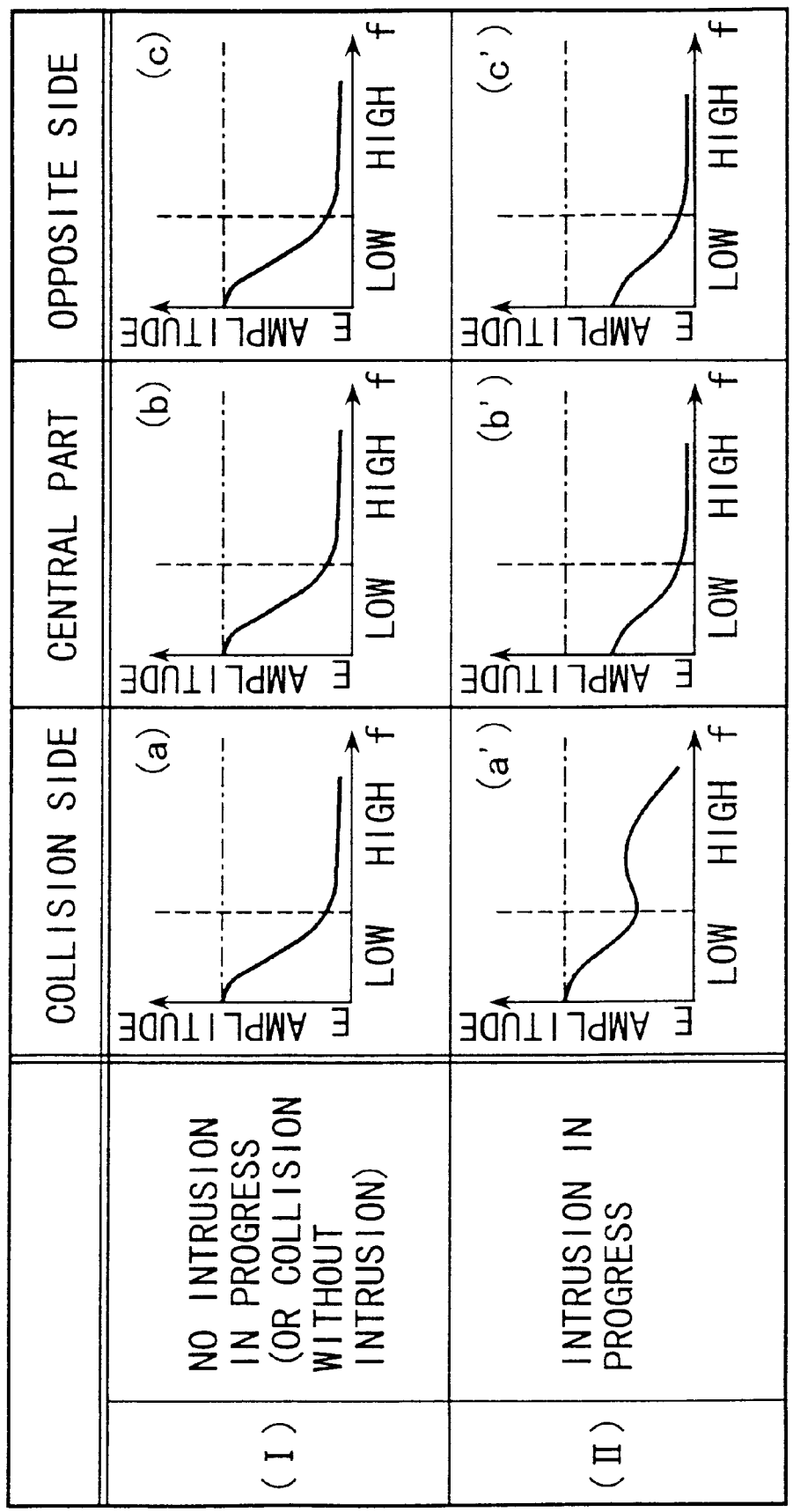
FIG. 1 is a view showing the differences in the frequency distributions of the outputs of the acceleration sensors attached to the collision side, the central part and the opposite side of the vehicle body depending on the time intervals involving an intrusion and not involving an intrusion.

FIG. 1 shows a ground for these lemmas. Three acceleration sensors are attached to a vehicle side part facing the side impact (a collision side, point P1 of FIG. 5(b)), a vehicle central part adjacent to a central line of the vehicle body extending in the fore-and-aft direction (a vehicle center, point P2 of FIG. 5(b)), and another vehicle side part facing away from the side impact (an opposite side, point P3 of FIG. 5(b)), and the frequency distributions of the outputs from these acceleration sensors for a time period (I) when an intrusion is not in progress (or when there is no intrusion) and a time period (II) when an intrusion is in progress are shown in FIG. 1 for comparison.

As can be appreciated by comparing FIGS. 1(I)(a) and 1(II)(a'), a comparison of the frequency distributions for the time period (I) when an intrusion is not in progress (or when there is no intrusion) and the time period (II) when an intrusion is in progress reveals that there is no significant difference in the frequency distribution of low frequency components between (I) and (II), but the frequency distribution of high frequency components is significantly larger for (II) than for (I). In other words, the frequency distribution of the output from the acceleration sensor for (II) extends over a wide range, from a low frequency range to a high frequency range, but the frequency distribution for (I) is more or less limited to a low frequency range, and lacks a high frequency range. From this finding, one can conclude that there is a certain correlation between the presence of an intrusion from a vehicle side part and the contents of high frequency components in the output signal of an acceleration sensor corresponding to the impact side of the vehicle body or the ratio of high frequency components to low frequency components or frequency components of a wider range.

As can be appreciated from FIGS. 1(I)(a), 1(I)b and 1(I)(c), the frequency distributions of the output from the three acceleration sensors attached to the collision side, the central part and the opposite side of the vehicle body are similar to each other, the frequency distribution obtained from each sensor over a preceding time period being predominantly in low frequency ranges and lacking in high frequency components. In other words, the influences of the motion (translational movement and/or angular movement) of the vehicle on the frequency components of the outputs from the acceleration sensors are limited to low frequency ranges, and this tendency is common to all parts of the vehicle body.

As can be appreciated by comparing FIGS. 1(II)(a'), 1(II)(b') and 1(II)(c'), a comparison of the frequency distributions of the outputs from the acceleration sensors attached to the collision side, the central part and the opposite side of the vehicle body for the time period (II) when an intrusion is in progress reveals that the high frequency components which are contained in the output from the acceleration sensor of the collision side of the vehicle body are almost totally absent in the outputs of the acceleration sensors attached to the central part and the opposite side of the vehicle body. Furthermore, the low frequency components which are contained in the outputs from the acceleration sensors attached to the central part and the opposite side of the vehicle body are significantly smaller than those contained in the output of the acceleration sensor attached to the collision side of the vehicle body. It is deduced that an intrusion gives rise to low frequency components in the acceleration signal due to the deformation of the component parts of the vehicle body, and high frequency components in the acceleration signal due to the rupture and collapse of the component parts of the vehicle body. Therefore, an intrusion affects both the low frequency components and the high frequency components of the acceleration signal. However, the influence of an intrusion is limited to the output signal of the acceleration sensor attached to the part of the vehicle body which is subjected to deformation.

From these findings, it is possible to deduce that the occurrence of an intrusion to a vehicle side part has a certain correlation with (1) the ratio of the high frequency components contained in the output signal of an acceleration sensor attached to a collision side of a vehicle body over a preceding time period to the low frequency components (or frequency components of a wider frequency range including low frequency components) contained in the output signal of an acceleration sensor attached to an opposite side or a central part of the vehicle body over the preceding time period;

(2) the ratio of the low frequency components (or frequency components of a wider frequency range including low frequency components) contained in the output signal of an acceleration sensor attached to a collision side of a vehicle over the preceding time period to the low frequency components (or frequency components of a wider frequency range including low frequency components) contained in the output signal of an acceleration sensor attached to an opposite side or a central part of the vehicle body over the preceding time period; or (3) the ratio of the high frequency components contained in the output signal of an acceleration sensor attached to a collision side of a vehicle body over a preceding time period to the high frequency components contained in the output signal of an acceleration sensor attached to an opposite side or a central part of the vehicle body over the preceding time period.

Figure 2:
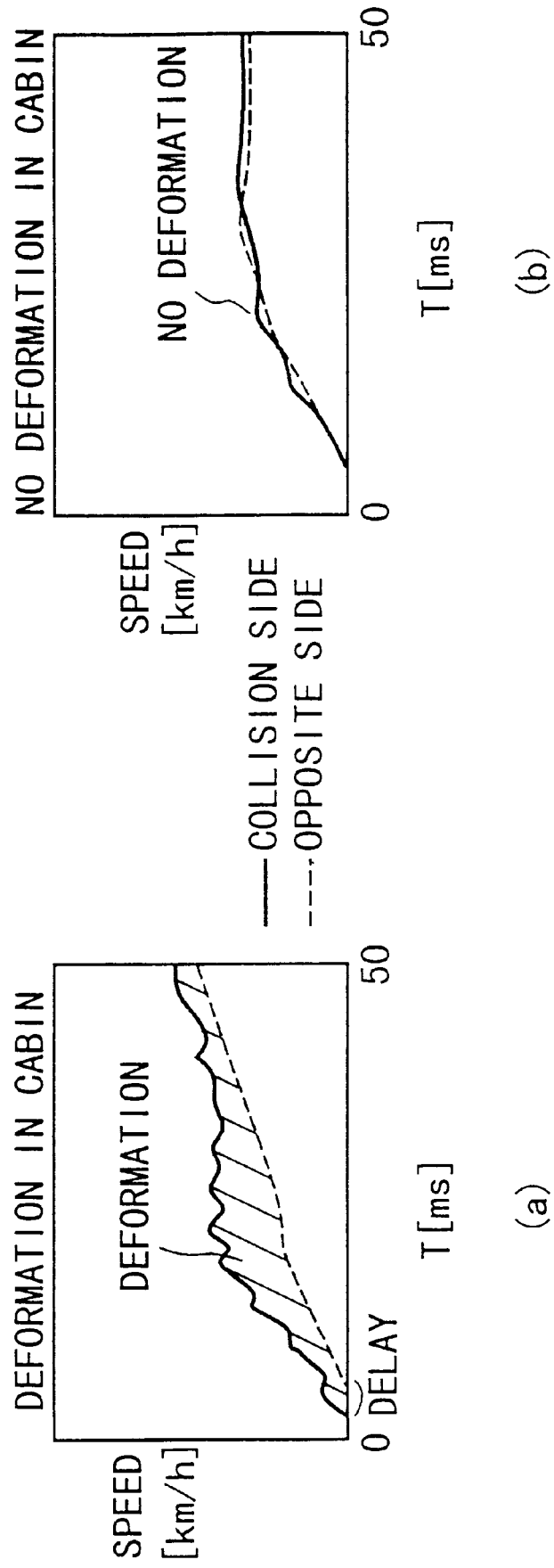
FIG. 2 is a view showing the differences in the rise timings of the output of the acceleration sensors attached to the collision side and the opposite side of the vehicle body depending on whether a side deformation has been produced or not.

As can be appreciated from FIGS. 2(a) and 2(b), in case of a crash involving an intrusion, because the intrusion serves the function of buffering the crash as indicated in FIG. 2(a), the starting point of the movement or the travel of the vehicle is delayed by a few milliseconds from the actual time point of the crash. Hence, the rise timing of the output of the acceleration sensor corresponding to the central part or the opposite side of the vehicle body is delayed by a few milliseconds from the rise timing of the output of the acceleration sensor corresponding to the collision side of the vehicle body. On the other hand, in case of a vehicle crash involving only a travel of the vehicle body substantially without any intrusion, the travel of the vehicle body starts simultaneously over the entire vehicle body as shown in FIG. 2(b). Hence, the rise timing is substantially identical for the outputs of the all three acceleration sensors attached to the collision side, the central part and the opposite side of the vehicle body.

It also means that the time difference between the rise of the output of the acceleration sensor corresponding to the collision side of the vehicle body and the rise of the output of the acceleration sensor corresponding to the central part or the opposite side of the vehicle body has a certain correlation with the occurrence of an intrusion from a side part of the vehicle body.

First Preferred Embodiment

Figure 4:
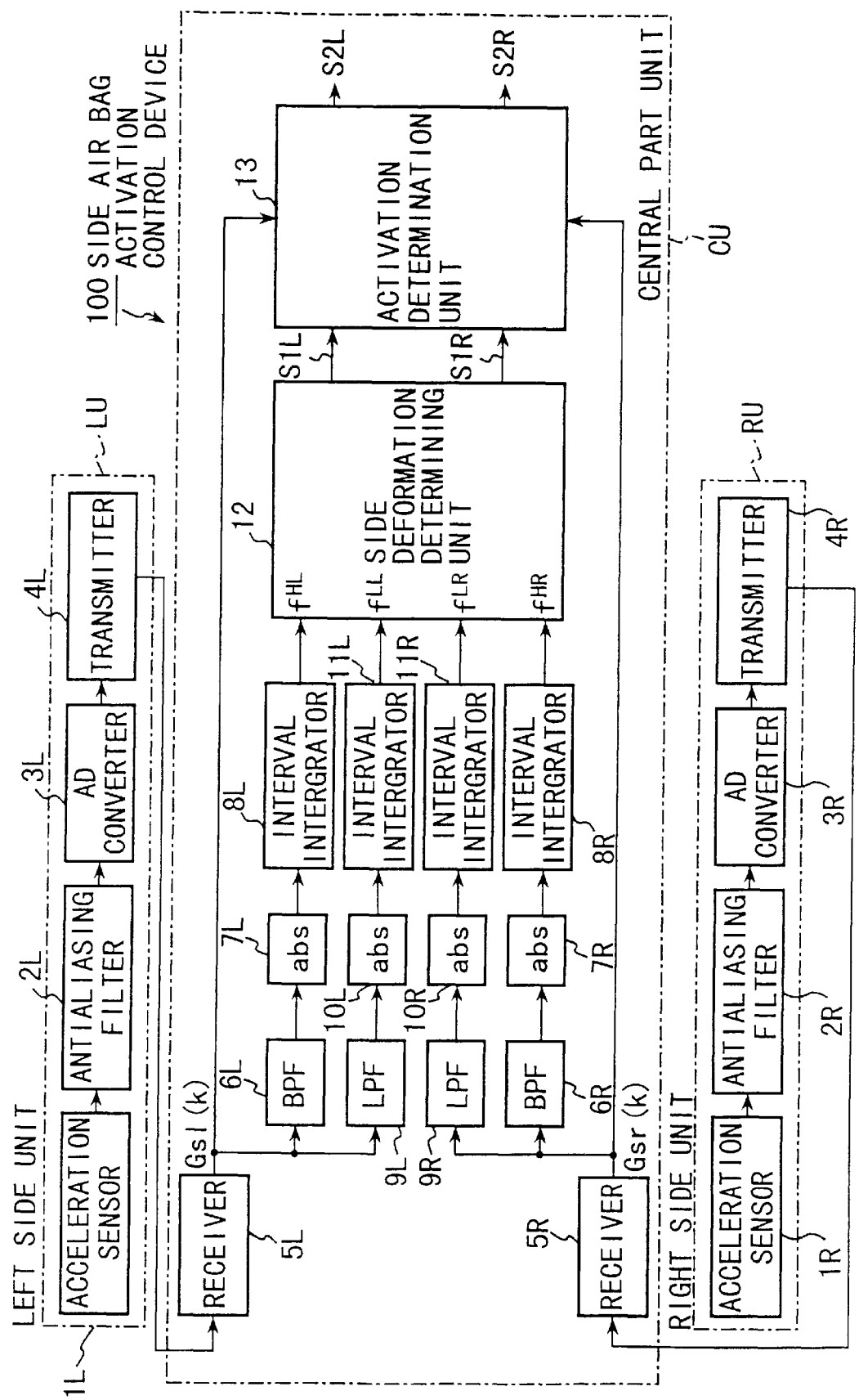
FIG. 4 is a block diagram schematically showing the electric arrangement of the entire side air bag activation control device to which the method and device of the first embodiment of the present invention has been applied.

Now is described the overall electrical structure of a side air bag activation control device to which the method and device for determining the occurrence of deformation of a vehicle side part are applied by making use of the various correlations discussed above, with reference to the block diagram of FIG. 4.

As can be appreciated from this drawing, this side air bag activation control device 100 comprises a left side unit LU attached to a part of the vehicle body corresponding to a left side part of the vehicle body (for instance, point P1 of FIG. 5(b)), a right side unit RU attached to a part of the vehicle body corresponding to a right side part of the vehicle body (for instance, point P3 of FIG. 5(b)), and a central part unit CU attached to a part of the vehicle body corresponding to a central part (adjacent to a central longitudinal line of the vehicle body extending along the fore-and-aft direction of the vehicle body (for instance, point P2 of FIG. 5(b)).

Possible locations for mounting these units LU, RU and CU are indicated in the overall views of FIG. 5. FIG. 5(a) is a side view of the vehicle body, and FIG. 5(b) is a plan view of the vehicle body.

In these drawings, numeral 14L denotes a left A-pillar, numerals 15L and 15R denote left and right B-pillars, numeral 16L denotes a left C-pillar, numerals 17L and 17R denote left and right side sills, numeral 18L denotes a left front door inner panel, numeral 19L denotes a left front door beam, numeral 20 denotes a center tunnel, and numeral 21 denotes a front seat cross member.

As discussed earlier, the left side unit LU and the right side unit RU incorporated with acceleration sensors are attached to relatively rigid parts of the vehicle body or those vehicle body parts which move in response to the deformation of the vehicle side part so that a side deformation of a relatively large part of a left or right side part of the vehicle body may be detected.

The "vehicle body parts which move in response to the deformation of the vehicle side part" may consist of various different parts depending on the make and the structure of the vehicle in question. Basically, these parts may be selected from any vehicle parts which move to any appreciable extent in response to a deformation of a vehicle side part resulting from a side impact (for instance, the region which is roughly indicated by the shaded area in FIG. 5(b)), but the movements of the vehicle parts are desired to be as large as possible. Based on such a view, in case of a typical sedan, these parts may consist of the parts defining the side ends of the passenger compartment such as the right and left center pillars (B-pillars) 15L and 15R, the right and left front pillars (A-pillars) 14L, the right and left rear pillars (C-pillars) 16L, and the side roof frame 25. The members directly defining the side ends of the passenger compartment such as the doors (including the inner parts of the door outer panels, the inner and outer parts of the door inner panels, and the door beams 19L and 23L) would provide such locations.

In view of the need to avoid an erroneous determination due to a collision with a light object such as a bicycle and a closing of a door, the vehicle parts suitable for determination of vehicle body deformation would be further limited. With respect to the center pillars 15L and 15R, the front pillars 14L and the rear pillars 16L mentioned above, their lower end portions adjacent to the floor would be desirable, and the lower end portions of the center pillars 15L and 15R would be most desirable because the vehicle body parts close to the vehicle occupant can be monitored, and they are located in a middle part of the vehicle body with respect to the fore-and-aft direction thereof.

The side sills 17L and 17R are also desirable locations for determining vehicle body deformation as they are relatively rigidly connected to the center pillars 15L and 15R, and can deform when a significant deformation stress is applied to the center pillars 15L and 15R. In particular, the front parts, the parts adjacent to the front seat cross member 21, the central parts, the parts adjacent to the center pillars 15L and 15R, the parts adjacent to the rear seat cross member 22, and the rear parts of the side sills 17L and 17R may be considered as possible candidates when selecting such locations.

The front seat and rear seat cross members 21 and 22 are also desirable locations for determining vehicle body deformation as they are relatively rigidly connected to the side sills 17L and 17R. With respect to the front seat and rear seat cross members 21 and 22, the areas extending from their outer ends to their parts middle way to the center tunnel 20 may be considered as possible candidates.

With respect to the floor panel (floor pan), the areas extending from its outer ends to its parts middle way to the center tunnel 20 may be considered as possible candidates.

By using the acceleration sensors incorporated in the left side unit and the right side unit which are attached to these vehicle body parts, it is possible to relatively accurately detect an acceleration due to both vehicle body deformation and movement of the entire vehicle body resulting from a side impact.

Referring to FIG. 4 again, the left side unit LU and the right side unit RU each comprise an acceleration sensor 1L or 1R, an antialiasing filter 2L or 2R, an AD converter 3L or 3R, and a transmitter 4L or 4R.

The accelerations sensors 1L and 1R may each consist of an acceleration sensor using a strain gauge of a piezoelectric resistive type formed on a semiconductor substrate, a capacitive acceleration sensor, or an electromechanical transducer type acceleration sensor. The direction of the acceleration which is of interest in this case is primarily lateral, but each single sensor may be capable to detecting acceleration in two or three directions.

The antialiasing filters 2L and 2R are used for removing fold-back errors which may arise during the AD conversion process, but may also consist of other known filters having various different structures.

The AD converters 3L and 3R each convert the output of the corresponding acceleration sensor 1L or 1R, which is forwarded thereto via the antialiasing filter 2L or 2R, into discrete acceleration data Gsl(k) or Gsr(k), but may also consist of other known AD converters having various different structures.

The transmitters 4L and 4R transmit the thus obtained discrete acceleration data Gsl(k) and Gsr(k) to the central part unit CU.

The discrete acceleration data Gsl(k) and Gsr(k) transmitted from the left side unit LU and the right side unit RU is respectively received by receivers 5L and 5R incorporated in the central part unit CU.

The transmitters 4L and 4R and the receivers 5L and 5R can be formed by installing specially designed IC pairs which are coupled with each other by a communication protocol for high speed transmission in the left side unit LU, the right side unit RU and the central part unit CU. It is also possible to carry out necessary communication based on a suitable communication protocol by using interface circuits and microcomputers.

The discrete acceleration data Gsl(k) and Gsr(k) received by the receivers 5L and 5R are branched into three paths.

The discrete acceleration data Gsl(k) received by the receiver 5L is branched into a first path which directly reaches an activation determination unit 13 for determining if the side air bag should be activated or not, a second path consisting of a left side high frequency components energy extracting system (the energy as used herein means the contents of various frequency components) which includes a band pass filter 6L, an absolute value converter 7L and an interval integrator 8L, and a third path consisting of a right side low frequency components energy extracting system which includes a low pass filter 9L, an absolute value converter 10L and an interval integrator 11L.

Similarly, the discrete acceleration data Gsr(k) received by the receiver 5R is branched into a first path which directly reaches an activation determination unit 13 for determining if the side air bag should be activated or not, a second path consisting of a right side hith frequency energy components extracting system which includes a band pass filter 6R, an absolute value converter 7R and an interval integrator 8R, and a third path consisting of a left side low frequency components energy extracting system which includes a low pass filter 9R, an absolute value converter 10R and an interval integrator 11R.

As described previously with reference to FIG. 1, the band pass filter 6L included in the left side high frequency energy components extracting system and the band pass filter 6R included in the right side high frequency components energy extracting system are adapted to extract high frequency components from the acceleration signals produced from the acceleration sensors 1L and 11R, respectively. Likewise, as described previously with reference to FIG. 1, the low pass filter 9L included in the left side low frequency components energy extracting system and the low pass filter 9R included in the right side low frequency components energy extracting system are adapted to extract low frequency components from the acceleration signals produced from the acceleration sensors 1L and 1R, respectively. As can be readily appreciated by a person skilled in the art, the functions of these filters 6L, 6R, 9L and 9R can be accomplished by a microcomputer provided with suitable software.

The signals extracted by these band pass filters 6L and 6R, and low pass filters 9L and 9R are converted into their absolute values by the absolute value converters 7L, 7R, 10R and 10R provided in the following stages, and are integrated over the prescribed integration time (5 ms to 20 ms, for instance) by the interval integrators 8L, 8R, 11L and 11R provided in the following stages. As a result, the energy of the high frequency components and the low frequency components is extracted from the acceleration signal (change in acceleration) over the prescribed preceding time period is extracted with respect to the output of each of the left and right side acceleration sensors 1L and 1R. In other words, by using the left high frequency energy extraction system (6L, 7L and 8L) and the left low frequency energy extraction system (9L, 10L and 11L), the frequency components of the acceleration signal detected by the left side acceleration sensor 1L over the prescribed preceding time period are analyzed. Likewise, by using the right high frequency energy extraction system (6R, 7R and 8R) and the right low frequency energy extraction system (9R, 10R and 11R), the frequency components of the acceleration signal detected by the right side acceleration sensor 1R over the prescribed preceding time period are analyzed. As can be readily appreciated by a person skilled in the art, the functions of these absolute value converters 7L, 7R, 10L and 10R and the interval integrators 8L, 8R, 11L and 11R can be accomplished by a microcomputer provided with suitable software.

The high frequency components energy thus produced from the interval integrators 8L and 8R is forwarded to corresponding input terminals fHL and fHR of the side deformation determining unit 12 while the low frequency components energy thus produced from the interval integrators 11L and 11R is forwarded to corresponding input terminals fLL and fLR of the side deformation determining unit 12

In the above described circuit structure, if the high cut frequency (340 Hz) of the band pass filters (BPF) 6L and 6R is identical to the cut off frequency of the antialiasing filter 2L and 2R, the software processing load can be reduced by using high pass filters (HPF) instead of the band pass filters (BPF) 6L and 6R. The function of the high pass filter (HPF) can be replaced with an arithmetic algorithm such as a forward or backward differential or Simpson's differential theorem. In particular, when the absolute value converters 10L and 10R are not used for the extraction of low frequency components, it is possible to pay attention only to the low frequency components of the side of collision which is of interest.

Figure 6:
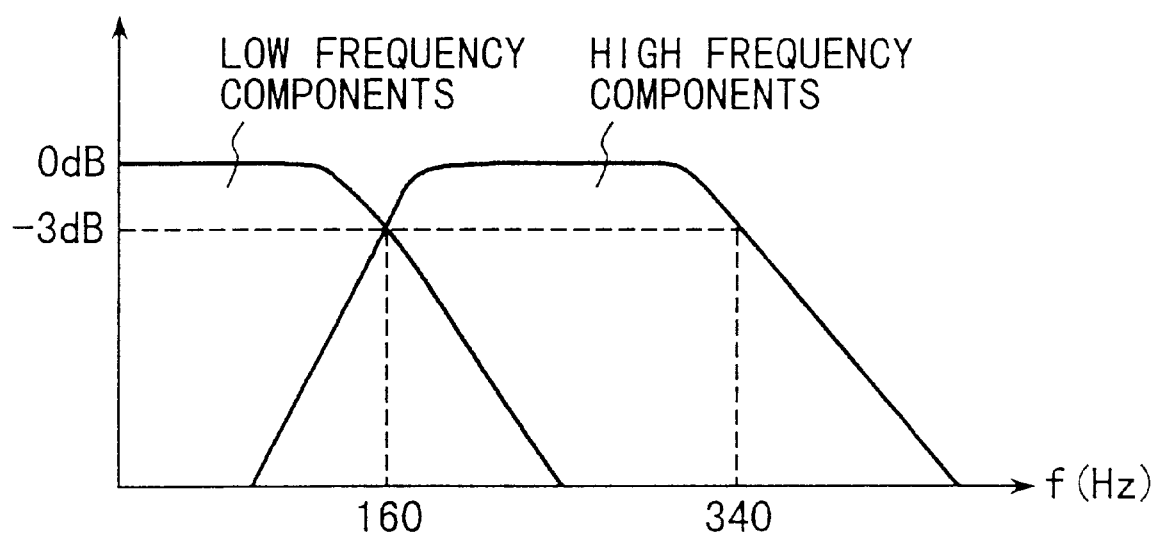
FIG. 6 is a graph for describing the frequency properties of the low pass filter and the band pass filter for extracting frequency components.

Referring to FIG. 6, in the above described circuit structure, the frequency properties of the low pass filters 9L and 9R for extracting the low frequency components of the acceleration signals, and the band pass filters 6L and 6R for extracting the high frequency components of the acceleration signals may be determined as described in the following.

The low frequency components may be defined as those in the frequency range of DC to 160 Hz (−3 dB). However, according to the experiments conducted by the Inventors using actual vehicles, it was confirmed that an important point about the low frequency components in determining deformation of a vehicle side part is to make sure to include the frequency components near the DC, for instance 10 Hz (−3 dB), which is known to have a strong correlation with deformation of a vehicle side part.

Thus, an important matter about the low frequency components is that they include the components near DC, and as long as the frequency components near DC are included, it is not important how high the upper frequency limit should be set. Based on the experiments conducted by the Inventors, the upper limit of the high frequency components was set at a relatively high frequency level of 160 Hz (−3 dB) only because of a desire to avoid the phase delay of the filters from causing any significant time delay in response speed.

Similarly, frequency components in the range of 160 Hz (−3 dB) to 340 Hz (−3 dB) may be used as the high frequency components. However, according to the experiments conducted by the Inventors using actual vehicles, it was confirmed that an important point about the high frequency components in determining deformation of a vehicle side part is to make sure not to include the low frequency components near the DC, for instance 10 Hz (−3 dB), In the experiments conducted by the Inventors, the lower limit of the high frequency components was set at 160 Hz only because it is sufficient for eliminating the frequency component near 10 Hz.

In short, an important point about the high frequency components is that they do not contain frequency components near DC, in particular the frequency component near 10 Hz, and there is no positive reason for limiting their upper limit.

However, in the experiments conducted by the Inventors, the upper limit of the high frequency components was set at 340 Hz only because it was necessary to cut off the resonance frequencies of the side sills and other members to which the unit incorporated with the acceleration sensor is attached, and the associated mounting brackets (with the aim of eliminating any ambiguity that may arise due to resonant vibrations of these members), and to remove any influences of the aliasing errors that may be produced during the process of discretizing the acceleration data by AD conversion.

Because an actual side collision involving deformation of a vehicle side part will produce high frequency components of up to 1 kHz, there is no positive reason to set the upper limit at 340 Hz if it were not for the considerations to avoid the resonant vibrations and remove the aliasing errors.

If the upper limit of the high frequency components can be set higher than 340 Hz, the lower limit of the high frequency components may be set accordingly higher than 160 Hz. The range of the high frequency components can be set freely over a wide range in this way, but, in reality, there is a limit in setting a higher upper limit due to the problems associated with the mounting of the sensors, and the lower limit of the high frequency components is limited in a corresponding way.

Now is described the operation of the side deformation determining unit 12 which constitutes an essential part of the present invention. The side deformation determining unit 12 determines if a left or right side deformation (such as an intrusion) has occurred or not according to the frequency components (fLL and fHL) corresponding to the results of frequency analysis of the acceleration signal obtained by the acceleration sensor 1L incorporated in the left side unit LU, and the frequency components (fLR and fHR) corresponding to the results of frequency analysis of the acceleration signal obtained by the acceleration sensor 1R incorporated in the right side unit RU. This determination process can be carried out by a microcomputer provided with software.

More specifically, the side deformation determining unit 12 determines if a left or right side deformation (such as an intrusion) has occurred or not according to the left high frequency components energy (fHL) obtained by the interval integrator 8L, the left low frequency components energy (fLL) obtained by the interval integrator 11L, the right high frequency components energy (fHR) obtained by the interval integrator 8R, and the right low frequency components energy (fLR) obtained by the interval integrator 11RL.

As described earlier, the algorithm for the determination process is based on the correlation between the frequency distributions (see FIGS. 1 and 2) discovered by the Inventors, or the correlation between the frequency distributions of the acceleration signals detected by acceleration sensors over a preceding time period when an intrusion has occurred and when no intrusion has taken place and the vehicle simply moved as a whole.

The specific determination algorithm may be selected from three types, depending on which of the acceleration sensors to use. The three possible acceleration sensor arrangement includes (1) a case where only the acceleration on the collision side is used (single point type), (2) a case where the acceleration sensors on both the collision and opposite sides of the vehicle body are used (multi point type 1), and (3) a case where an acceleration sensor on neither side of the vehicle body (for instance, the acceleration sensor mounted on the laterally centrally located tunnel) is used (multi point type 2). For the convenience of illustration, it is assumed that the collision side is the left side of the vehicle body in the following description.

The determination of deformation of a vehicle side part using only the output of the acceleration sensor on the collision side is carried out by evaluating the frequency components (fLL and fHL) according to a prescribed determination logic.

The determination logic may be based on the high frequency components (fHL) in the frequency components obtained by the frequency analysis. According to this determination logic, when the high frequency components (fHL) exceed a certain reference value, it is determined that a vehicle side part has deformed. If the high frequency components (fHL) are found to be lower than reference value, it is determined that no side deformation has taken place in the side part of the vehicle body.

According to another exemplary determination logic, the high frequency components (fHL), and the low frequency components (fLL) or the frequency components (fLL+fHL) of a wider frequency range in the frequency components obtained by the frequency analysis are both taken into consideration. According to this determination logic, the occurrence of deformation in the vehicle side part is determined according to the result of such a comparison. In a certain comparison logic, the occurrence of deformation of the vehicle side part is determined when the ratio (fHL/fLL or fHL/(fLL+fHL)) between the two is greater than a certain reference value. Conversely, no occurrence of deformation of the vehicle side part is determined when the ratio (fHL/fLL or fHL/(fLL+fHL)) between the two is smaller than the reference value.

This determination logic is based on the recognition that when the frequency components are considered which are contained in the acceleration signal detected, over a prescribed time period, in a certain vehicle part which moves in response for the deformation of a vehicle side part due to a side impact as can be appreciated from the comparison of FIG. 1(I)(*a*) and FIG. 1(II)(*a'*), the high frequency contents are greater in case of a side impact involving an intrusion than in a case of a side impact not involving an intrusion. No flow chart is given in this specification, but a person skilled in the art should be able to readily achieve the digital comparator arrangement which is required for the determination logic by using computer software.

The side deformation determination process which uses a pair of acceleration sensors mounted on either side of a vehicle body (multiple point type 1) can be carried out by comparing the frequency components of the left system and the right system (fLL, fHL, fLR and fHR) obtained by the frequency analysis according to the prescribed determination logic.

According to one of variations of such determination logic (which is referred to as a first determination logic), the high frequency components (fHL) contained in the acceleration signal detected by the acceleration sensor on the collision side of the vehicle body, and the low frequency components (fLR) or the frequency components (fLR+fHR, for instance) of a wider frequency range contained in the acceleration sensor on the opposite side of the vehicle body are taken into consideration. According to the first determination logic, the occurrence of deformation of a side part of a vehicle body is determined by a result of comparison of these two sets of frequency components. According to this determination logic, the occurrence of deformation of the vehicle side part is determined when the ratio (fLR/fHL or fLR/(fLR+fHR)) between the high frequency components on the collision side (fHL) and the low frequency components (fLR) or the frequency components (fLR+fHR, for instance) of a wider frequency range contained in the acceleration sensor on the opposite side of the vehicle body is smaller than a certain reference value. Conversely, no occurrence of deformation of the vehicle side part is determined when the ratio between the high frequency components on the collision side (fHL) and the low frequency components (fLR) or the frequency components (fLR+fHR, for instance) of a wider frequency range on the opposite side of the vehicle body is larger than a certain reference value.

This determination logic is based on the recognition that when the high frequency components obtained from the acceleration sensor on the collision side are considered, as can be appreciated from the comparison of FIG. 1(I)(*a*) and FIG. 1(II)(*a'*), such contents are greater in case (I) involving no intrusion than in case (II) involving an intrusion. Additionally, when the low frequency components obtained from the acceleration sensor on the opposite side are considered, as can be appreciated from the comparison of FIG. 1(I)(*c*) and FIG. 1(II)(*c'*), such contents are smaller in the case involving no intrusion than in the case involving an intrusion.

The determination logic which takes into consideration both the high frequency components on the collision side (fHL) and the low frequency components (fLR) or the frequency components (fLR+fHR, for instance) of a wider frequency range can be implemented, in a more concrete term, as a comparison of certain regions which may be defined on a 2-dimensional coordinate system taking the component energy levels on the ordinate and abscissa axes or ratios (fLR/fHL or (fLR+fHR)/fLR) of the component energy levels with respect to prescribed threshold levels. No flow chart is given in this specification, but a person skilled in the art should be able to readily achieve this comparison process by using computer software.

Figure 7:
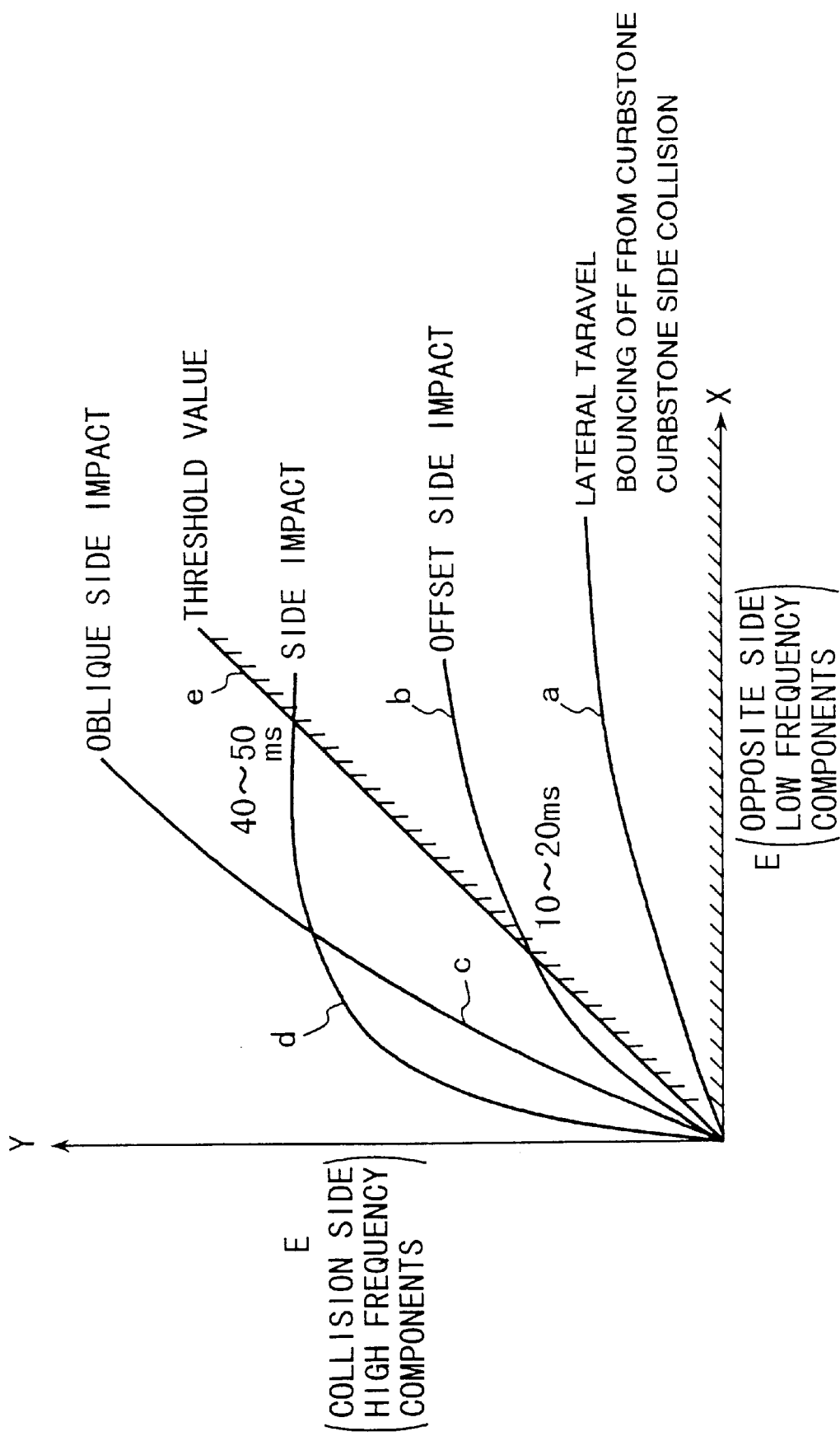
FIG. 7 is a graph for describing the method for determining the occurrence of deformation of a vehicle side part by comparing areas on a two-dimensional coordinate plane.

In a two-dimensional coordinate system taking the low frequency components energy (fLR) on the opposite side on the X-axix and the high frequency components energy (fHL) on the collision side on the Y-axis, exemplary determination criteria for determining the occurrence of deformation on the collision side are illustrated in FIG. 7.

In this drawing, "a" indicates a curve showing the values on the two-dimensional coordinate system when the vehicle has moved laterally and been bounced back by a curbstone or when the vehicle has collided laterally with a curbstone, "b" indicates a curve showing the values on the two-dimensional coordinate system when the vehicle has made an offset side collision, "c" indicates a curve showing the values on the two-dimensional coordinate system when the vehicle has made an angled side collision, "d" indicates a curve showing the values on the two-dimensional coordinate system when the vehicle has made a side collision, and "e" indicates a slanted straight line having a prescribed inclination to serve as a reference for determining the occurrence of deformation in a vehicle side part.

When the coordinate value in the two dimensional coordinate system is located in the shaded area defined by the X-axis and the slanted threshold line e, it can be concluded that deformation involving an intrusion has not occurred to the collision side of the vehicle body. On the other hand, when the coordinate value in the two dimensional coordinate system is located in the area defined by the Y-axis and the slanted threshold line e, it can be concluded that deformation involving an intrusion has occurred to the collision side of the vehicle body.

Observation of the curves a, b, c and d based on such an assumption leads to the conclusion that no deformation involving an intrusion has occurred to the collision side of the vehicle body when the vehicle has moved laterally, and has been bounced back by the curbstone or when the vehicle collided sideways with a curbstone, because the curve a is located within the shaded area. Also when the vehicle has made an offset side collision, because the curve b is located within the shaded area, it can be concluded that no deformation involving an intrusion has occurred to the collision side of the vehicle body. On the other hand, when the vehicle has made an oblique side collision, because the curve c is not located in the shaded area, it can be concluded that deformation involving an intrusion has occurred to the collision side of the vehicle body. Also when the vehicle has made a side collision, because the curve d is not located in the shaded area, it can be concluded that deformation has occurred to the collision side of the vehicle body.

Thus, when a signal is obtained from a pair of acceleration sensors mounted on either side of the vehicle body, by plotting the high frequency components energy (fHL) on the collision side and the low frequency components energy (fLR) on the opposite side on a two-dimensional coordinate system, and determining in which of the areas the coordinate value is located with respect to the slanted threshold line e, it is possible to determine if the side impact has caused any deformation to the impact side of the vehicle body.

Figure 8:
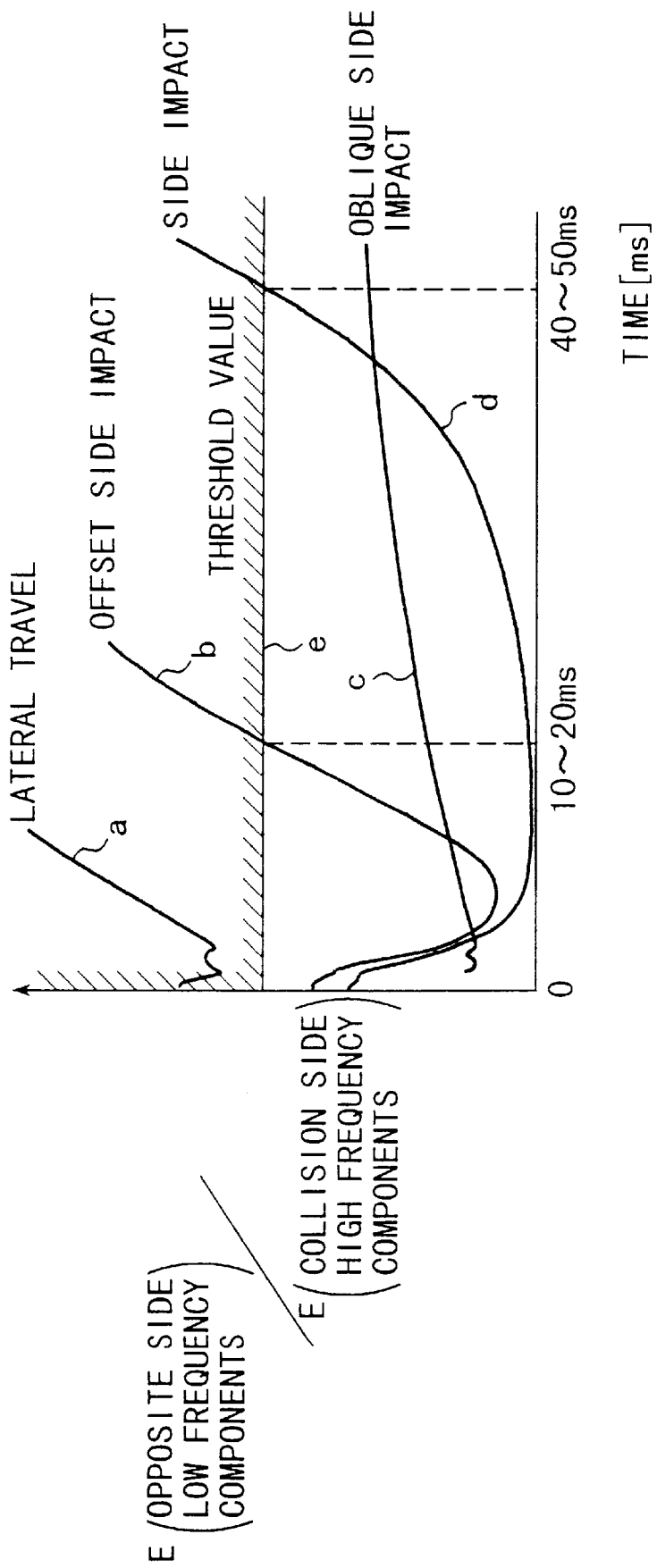
FIG. 8 is a graph for describing the method for determining the occurrence of deformation of a vehicle side part according to the ratio between the low frequency components energy on the opposite side and the high frequency components energy on the collision side.

Now the example which was described with reference to FIG. 7 showing a two-dimensional coordinate system divided in the slanted threshold line is described with reference to FIG. 8 showing the ratio of the frequency components ratio vs time coordinate system. The division of the two-dimensional coordinate plate by the slanted threshold line in FIG. 7 corresponds to the comparison of the ratio of the high frequency components energy on the collision side to the low frequency components energy (fLR) on the opposite with the threshold line e in FIG. 8.

In this drawing, "a" indicates a curve showing the values on the two-dimensional coordinate system when the vehicle has moved laterally and been bounced back by a curbstone or when the vehicle has collided laterally with a curbstone, "b" indicates a curve showing the values on the two-dimensional coordinate system when the vehicle has made an offset side collision, "c" indicates a curve showing the values on the two-dimensional coordinate system when the vehicle has made an angled side collision, "d" indicates a curve showing the values on the two-dimensional coordinate system when the vehicle has made a side collision, and "e" indicates a threshold line for determining the occurrence of deformation in a vehicle side part. When the coordinate value is located in the region above this line e, it can be concluded that no deformation has occurred to the collision side of the vehicle body.

Observation of the curves a, b, c and d based on such an assumption leads to the conclusion that no deformation involving an intrusion has occurred to the collision side of the vehicle body when the vehicle has moved laterally, and has been bounced back by the curbstone or when the vehicle collided sideways with a curbstone, because the curve a is located above the threshold line.

Also when the vehicle has made an offset side collision, because the curve b is located above the threshold line e only for a short time period (10 to 20 ms) immediately following the collision but is located above the threshold line e thereafter, it can be concluded that no deformation involving an intrusion has occurred to the collision side of the vehicle body. Therefore, it can be concluded in a very short time after the collision has occurred that no deformation has occurred to the collision side of the vehicle body.

On the other hand, when the vehicle has made an oblique side collision, because the curve c is located below the threshold line e, it can be concluded that deformation involving an intrusion has occurred to the collision side of the vehicle body.

Also when the vehicle has made a side collision, because the curve d is not located below the threshold line for a relatively long period of time (40 to 50 ms), it can be concluded that deformation has occurred to the collision side of the vehicle body.

By thus keeping track of the time change in the ratio between the two frequency components energy levels, it is possible to accurately determine if deformation involving an intrusion has occurred to the collision side of the vehicle body or not as a result of a side impact.

Figure 9:
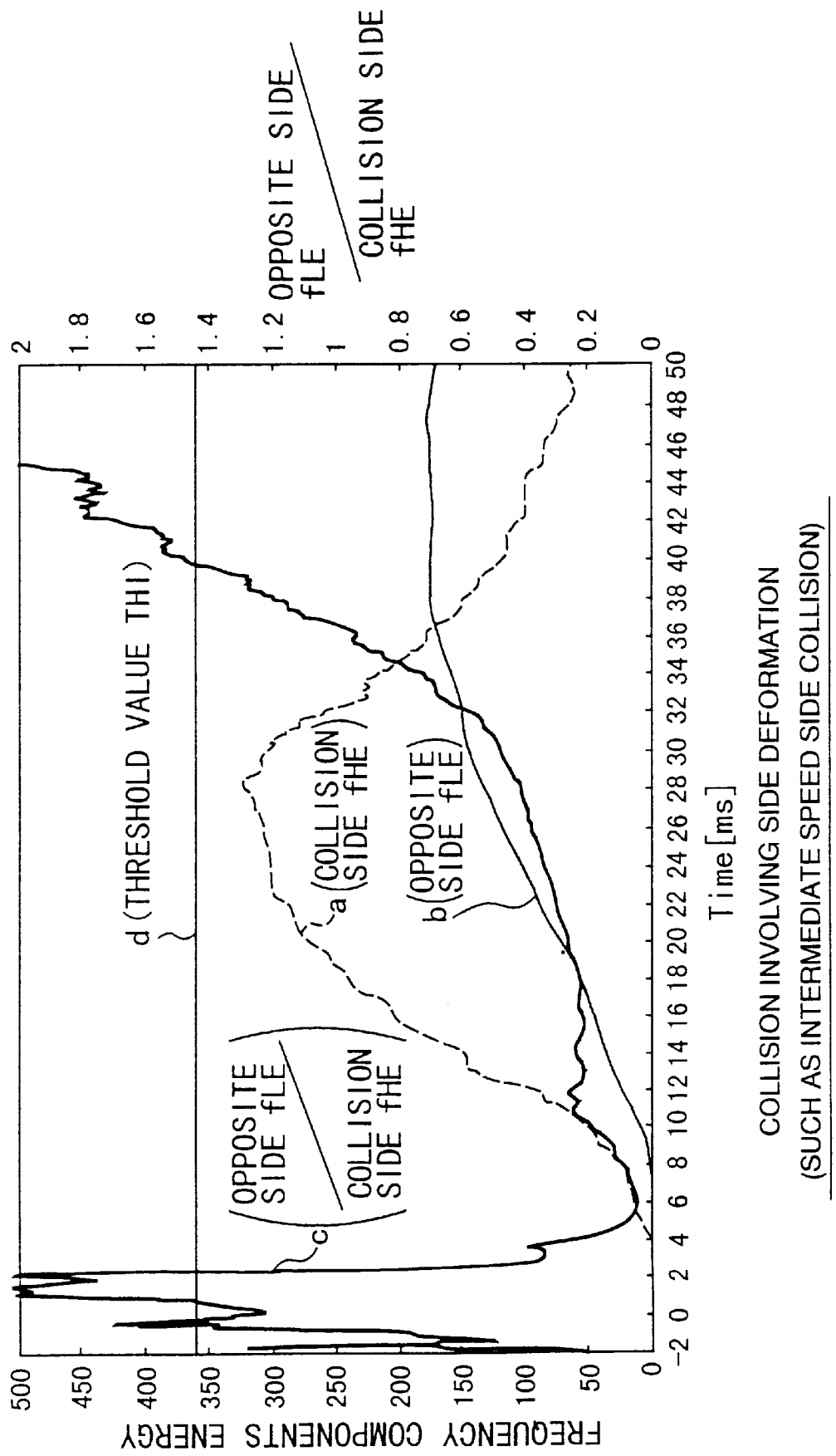
FIG. 9 is a graph for showing the actual results of determining the occurrence of deformation of a vehicle side part according to the ratio between the low frequency components energy on the opposite side and the high frequency components energy on the collision side.
Figure 10:
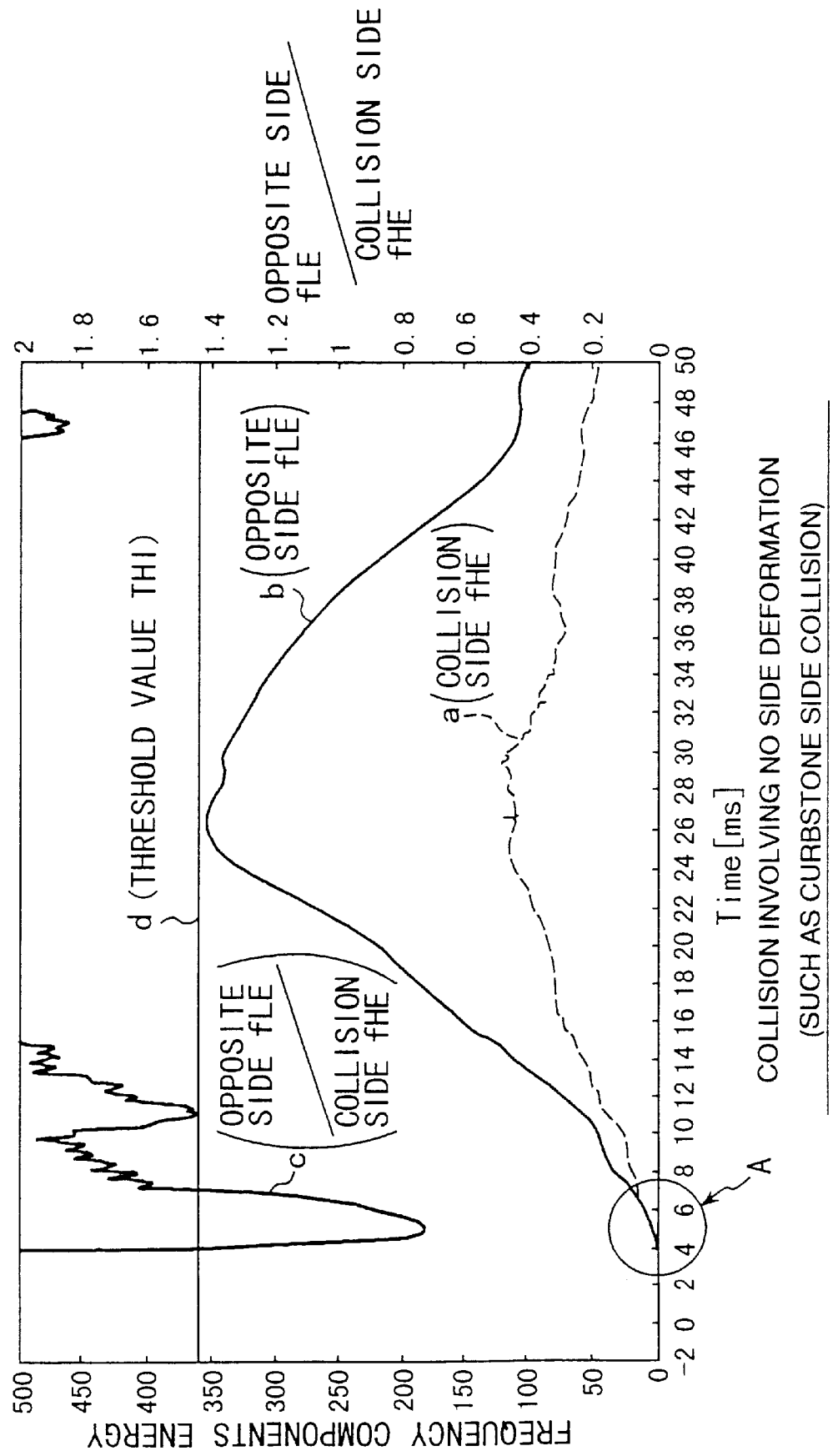
FIG. 10 is a graph for showing the actual results of determining the non-occurrence of deformation of a vehicle side part according to the ratio between the low frequency components energy on the opposite side and the high frequency components energy on the collision side.

FIGS. 9 and 10 show measurement results which were obtained from an acceleration sensor attached to point P1 on the collision side of the vehicle body as illustrated in FIG. 5(b), and an acceleration sensor attached to point P2 on the opposite side of the vehicle body as illustrated in FIG. 5(b). FIG. 9 shows measurement results when a collision involving a side deformation was determined, and FIG. 10 shows measurement results when a collision not involving a side deformation was determined.

In FIGS. 9 and 10, "a" indicates high frequency components energy (fHL) on the collision side. "b" indicates low frequency components energy (fLR) on the opposite side, "c" indicates a ratio (fLR/fHL) between the two frequency components energy levels, and "d" indicates a threshold line for determining the occurrence of deformation of a vehicle side part.

As shown in FIG. 9, in case of a collision involving a side deformation, the ratio between the two energy levels (fLR/fHL) indicated by the curve c is kept sufficiently below the threshold value TH1 indicated by the line d, and this leads to the conclusion that a collision involving a side deformation has occurred.

On the other hand, in case of a collision not involving a side deformation, as show in FIG. 10, the ratio between the two energy levels (fLR/fHL) indicated by the curve c rises sharply immediately after the collision, and immediately goes over the threshold value TH1 indicated by the line d. This leads to the conclusion that a collision not involving, a side deformation has occurred.

As indicated by a portion A surrounded by a circle in FIG. 10, while the two frequency components energy levels (fHL, fLR) are still low during an early stage of the collision, the ratio between the two energy levels (fLR/fHL) indicated by the curve tends to be unstable, and would not exceed the threshold value TH1 indicated by the line d. This problem can be readily avoided by delaying the determination process until a certain value (such as the frequency components energy and an integrated value over an interval) which is computed according to the acceleration value has built up to a prescribed level, or by stabilizing the ratio adding a predetermined constant value to one of the frequency components energy levels.

Now is described the other determination logic (which is referred to as the second determination logic hereinafter) for determining the occurrence of deformation on the collision side by using the output signals from both the acceleration sensors attached to either side of the vehicle body.

The second determination logic takes into consideration both the low frequency components (fLL) or the frequency components (fLL+fHL, for instance) of a wider frequency range contained in the acceleration sensor attached to the collision side of the vehicle body and the low frequency components (fLR) or the frequency components (fLR+fHR, for instance) of a wider frequency range contained in the acceleration sensor attached to the opposite side of the vehicle body. According to the second determination logic, occurrence of deformation of a vehicle side part is determined from the results of the comparison made between the two sets of frequency components. According to an example of the comparison method, if the ratio between the low frequency components (fLL) or the frequency components (fLL+fHL, for instance) of a wider frequency range on the collision side of the vehicle body and the low frequency components (fLR) or the frequency components (fLR+fHR, for instance) of a wider frequency range of a wider frequency range on the opposite side of the vehicle body is smaller than a reference value, it is concluded that a collision involving a side deformation has occurred. If the ratio (fLR (or fLR+fHR)/fLL (or fLL+fHL)) between the low frequency components (fLL) or the frequency components (fLL+fHL, for instance) of a wider frequency range on the collision side of the vehicle body and the low frequency components (fLR) or the frequency components (fLR+fHR, for instance) of a wider frequency range of a wider frequency range on the opposite side of the vehicle body is greater than or substantially equal to a reference value, it is concluded that a collision involving a side deformation has not occurred.

This determination logic is based on the recognition that when the low frequency components obtained from the two acceleration sensors are considered, as can be appreciated from the comparison of FIG. 1(I)(a), FIG. 1(I)(c), FIG. 1(II)(a') and FIG. 1(II)(c'), the low frequency components energy level decays more sharply on the opposite side than on the collision side in case (I) involving an intrusion, and the low frequency components on the opposite side does not substantially decay in comparison with the low frequency components on the collision side in case (I) involving only a travel of the vehicle body and no intrusion.

Now is described the yet other determination logic (which is referred to as the third determination logic hereinafter) for determining the occurrence of deformation on the collision side by using the output signals from both the acceleration sensors attached to either side of the vehicle body.

The third determination logic takes into consideration both the high frequency components (fHL) contained in the acceleration sensor attached to the collision side of the vehicle body and the high frequency components (fHR) contained in the acceleration sensor attached to the opposite side of the vehicle body. According to the third determination logic, occurrence of deformation of a vehicle side part is determined from the results of the comparison made between the two sets of frequency components. According to an example of the comparison method, if the ratio (fHR/fHL) between the high frequency components (fHL) on the collision side of the vehicle body and the high frequency components (fHR) on the opposite side of the vehicle body is smaller than a reference value, it is concluded that a collision involving a side deformation has occurred. If the ratio (fHR/fHL) between the high frequency components (fHL) on the collision side of the vehicle body and the high frequency components (fHR) on the opposite side of the vehicle body is greater than or equal to the reference value, it is concluded that a collision involving a side deformation has not occurred.

This determination logic is based on the recognition that when the high frequency components obtained from the two acceleration sensors are considered, as can be appreciated from the comparison of FIG. 1(I)(a), FIG. 1(I)(c), FIG. 1(II)(a') and FIG. 1(II)(c'), the high frequency components energy level decays more sharply on the opposite side than on the collision side in the case involving an intrusion, and the high frequency components on the opposite side does not substantially decay in comparison with the high frequency components on the collision side in the case involving only a travel of the vehicle body and no intrusion.

By considering the two acceleration sensors attached to either side of the vehicle body, and applying either one of the first to third determination logics, it is possible to accurately determine the occurrence of a deformation involving an intrusion has occurred on the collision side of the vehicle body.

When the correlation shown in FIGS. 1 and 2 is considered again, the differences in the frequency components distribution between the case of a side impact involving an intrusion and a side impact not involving an intrusion may be attributed to the fact that the part carrying the sensor on the impact side of the vehicle body and the part carrying the sensor on the opposite side of the vehicle body is substantially separated from each other as two systems of vibration. This deduction leads to the conclusion that any parts between the two side walls across the width of the vehicle body can be selected as parts for carrying the acceleration sensors on the collision side and the opposite side of the vehicle body as long as the two parts are separated from each other as different systems of vibration. This deduction can be corroborated by the fact that FIGS. 1(I)(b) and FIG. (II)(b') showing the frequency components distribution for the central part of the vehicle body, and FIGS. 1(I)(c) and FIG. (II)(c') showing the frequency components distribution for the opposite part of the vehicle body demonstrate substantially identical wave forms.

Based on such an observation, "the acceleration sensor on the opposite side" in the first to third determination logics may be substituted with an acceleration sensor attached to a central part of the vehicle body (such as the point P2 in the center tunnel 20 in FIG. 5(b)) (multiple point type 2).

In other words, the first determination logic after such a substitution will be designed to determine the occurrence of deformation in a vehicle side part by considering the high frequency components contained in the acceleration signal from the acceleration sensor on the collision side, and the low frequency components or the frequency components of a wider frequency range in the central part of the vehicle body, and comparing the two sets of frequency components. According to an example of the comparison method, if the ratio between the high frequency components on the collision side of the vehicle body and the low frequency components or the frequency components of a wider frequency range in the central part of the vehicle body is smaller than a reference value, it is concluded that a collision involving a side deformation has occurred. If the ratio between the high frequency components on the collision side of the vehicle body and the low frequency components or the frequency components of a wider frequency range in the central part of the vehicle body is greater than the reference value, it is concluded that a collision involving a side deformation has not occurred.

The second determination logic after such a substitution will be designed to determine the occurrence of deformation in a vehicle side part by considering the low frequency components or the frequency components of a wider frequency range contained in the acceleration signal from the acceleration sensor on the collision side, and the low frequency components or the frequency components of a wider frequency range in the central part of the vehicle body, and comparing the two sets of frequency components. According to an example of the comparison method, if the ratio between the low frequency components or the frequency components of a wider frequency range on the collision side of the vehicle body and the low frequency components or the frequency components of a wider frequency range in the central part of the vehicle body is smaller than a reference value, it is concluded that a collision involving a side deformation has occurred. If the ratio between the low frequency components or the frequency components of a wider frequency range on the collision side of the vehicle body and the low frequency components or the frequency components of a wider frequency range in the central part of the vehicle body is greater than or substantially equal to the reference value, it is concluded that a collision involving a side deformation has not occurred.

The third determination logic after such a substitution will be designed to determine the occurrence of deformation in a vehicle side part by considering the high frequency components contained in the acceleration signal from the acceleration sensor on the collision side, and the high frequency components in the central part of the vehicle body, and comparing the two sets of frequency components. According to an example of the comparison method, if the ratio between the high frequency components on the collision side of the vehicle body and the high frequency components in the central part of the vehicle body is smaller than a reference value, it is concluded that a collision involving a side deformation has occurred. If the ratio between the high frequency components on the collision side of the vehicle body and the high frequency components in the central part of the vehicle body is greater than or substantially equal to the reference value, it is concluded that a collision involving a side deformation has not occurred.

According to these substituted determination logics, if two acceleration sensors are arranged on either side of the vehicle body in a symmetric relationship with respect to a central longitudinal line of the vehicle body, the acceleration sensor for a non-deformed part of the vehicle body which serves as a reference for comparison may consist of a single common acceleration sensor. If this acceleration sensor for comparison is commonly used as the acceleration sensor arranged on the center tunnel 20 for the activation of the frontal air bag, the need for an additional acceleration sensor for the non-deformed part of the vehicle body. In this case, however, an acceleration sensor which is capable of detecting acceleration at least in both the longitudinal and lateral directions of the vehicle body or two acceleration sensors for detecting acceleration in these two different direction will be necessary.

When the present invention is implemented by using a pair of acceleration sensors arranged in an asymmetric relationship such as when an acceleration sensor on the collision side of the vehicle body and an acceleration in the central part of the vehicle body are used, it is desirable to consider the possibility of the rotation of the vehicle body as a result of a collision.

A theoretical analysis is made on the influences of rotation of the vehicle body for the case when two acceleration sensors are attached to two points P1 and P3 of the vehicle body parts with are symmetric with respect to the central longitudinal line of the vehicle body, and the case when two acceleration sensors are attached to a point P1 on the collision side of the vehicle body and a point P2 slightly behind the gravitational center in the laterally middle part of the vehicle body (in an asymmetric arrangement with respect to the central longitudinal line of the vehicle body) as illustrated in FIG. 5(b).

Suppose that the vehicle body has turned in counter-clockwise direction as a result of a side impact as indicated by the arrow A. In this case, the acceleration F resulting from this rotation is produced identically at the points P1 and P3 as they are spaced from the gravitational sensor by an equal distance, and the lateral components of the acceleration F1 and F3 are equal to each other. In other words, the influences of the rotation of the vehicle body on the acceleration sensors attached to the points P1 and P3 are identical.

On the other hand, when the lateral acceleration components F1 and F2 at the points P1 and P2 are compared, as they are spaced from the gravitational center by different distances, it can be seen that F2 is smaller than F1. In other words, the influences of the rotation of the vehicle body on the acceleration sensors attached to the points P1 and P2 are not identical in this case.

Figure 3:
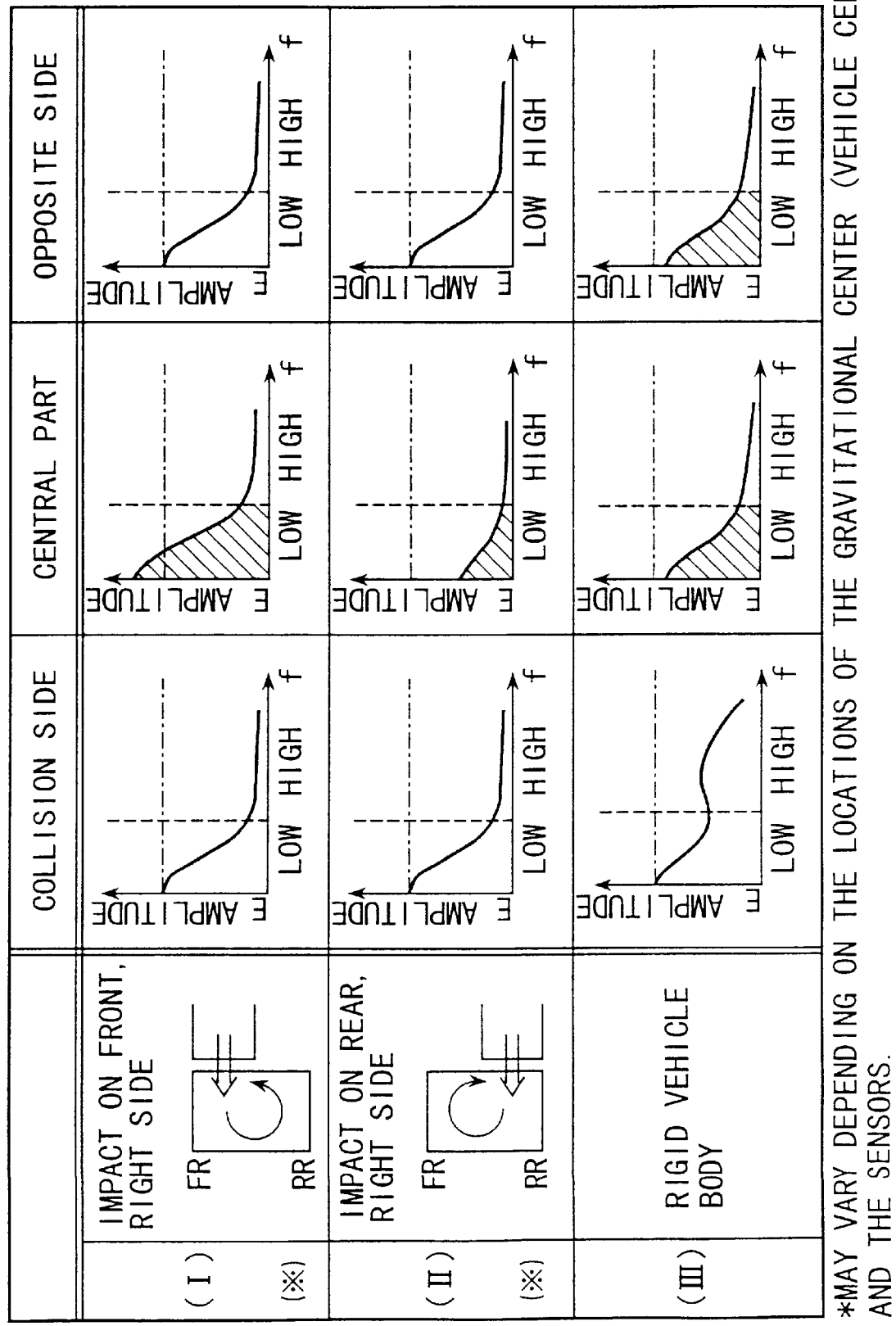
FIG. 3 is a view showing the differences in the frequency distributions of the outputs of the acceleration sensors attached to the collision side, the central part and the opposite side of the vehicle body depending on the case of a rotation of the vehicle body as a result an offset collision at the frontal right side, the case of a rotation of the vehicle body as a result an offset collision at the rear right side, and the case of a collision with a highly rigid vehicle body.

As a matter of fact, this is also reflected in the frequency distributions of the outputs from the acceleration sensors attached to the central part of the vehicle body and the opposite side of the vehicle body as shown in FIGS. 3(I) and 3(II).

FIG. 3(I) shows the frequency components distribution of the output of each of the acceleration sensors (the collision side, the central part and the opposite side) when the vehicle body has turned in counter-clockwise direction in such a manner that a front part of the vehicle body moves (is swung) significantly laterally in the direction facing away from the collision side as a result of an offset side impact to a frontal right side part of the vehicle body. FIG. 3(II) shows the frequency components distribution of the output of each of the acceleration sensors (the collision side, the central part and the opposite side) when the vehicle body has turned in clockwise direction in such a manner that a rear part of the vehicle body moves (is swung) significantly laterally in the direction facing away from the collision side as a result of an offset side impact to a rear right side part of the vehicle body. The frequency components distributions resulting from offset side impacts shown in FIGS. 3(I) and 3(II) were obtained after the slight deformation immediately after the impact has subsided.

As can be appreciated by the comparison of the experimental results shown in the two drawings (FIGS. 3(I) and 3(II)), the outputs of the two acceleration sensors which were mounted at a substantially equal distance from the gravitational center of the vehicle body such as the collision side and the opposite side of the vehicle body were evenly affected by the rotation of the vehicle body. On the other hand, the outputs of the two acceleration sensors which were mounted at different distances from the gravitational center of the vehicle body such as the collision side and the central part of the vehicle body were unevenly affected by the rotation of the vehicle body. More specifically, the low frequency components contained in the output signal of the acceleration sensor attached to the central part of the vehicle body were observed to significantly change depending on the mode of rotation as indicated by the shaded parts of FIGS. 3(I) and 3(II). In this case also, it should be noted that the high frequency components did not substantially change without regard to mode of rotation.

According to the theoretical analysis made with reference to FIG. 5(b), and the experimental results shown in FIGS. 3(I) and 3(II), if the rotation of the vehicle body resulting from a side impact is taken into consideration, it is preferable to use the acceleration sensor on the collision side (the point P1 of FIG. 5(b), for instance) and the acceleration sensor on the opposite side (the point P3 of FIG. 5(b), for instance), or the two acceleration sensors which are arranged symmetric with respect to the central longitudinal line of the vehicle body, for the two acceleration sensors which are to be compared.

There may be a case where the acceleration sensor on the collision side (the point P1 of FIG. 5(b), for instance) and the acceleration sensor in the central part (the point P2 of FIG. 5(b), for instance), or the two acceleration sensors have to be arranged asymmetrically with respect to the central longitudinal line of the vehicle body have to be used for the two acceleration sensors which are to be compared because of such reasons as the lack of a sufficient mounting space for the sensor unit at the point P3 of FIG. 5(b) and the absence of the sensor unit at the point P3 due to the restriction of the system to be intended to detect the collision of only one side. In such a case, it is most desirable to use the third determination logic of the three determination logics as it is most insensitive to the influences of the rotation of the vehicle body. In other words, the determination method for vehicle body deformation based on the third determination logic takes into consideration both the high frequency components of the acceleration signal detected from the acceleration sensor (the point P1 of FIG. 5(b), for instance) and the high frequency components of the acceleration signal detected from the acceleration sensor (the point P2 of FIG. 5(b), for instance), and determines the occurrence of deformation of a vehicle side part according to the comparison of these two sets of frequency components. According to an exemplary method for comparison, occurrence of deformation of a vehicle side part is determined when the ratio of the high frequency components of the central part of the vehicle body to the high frequency components of the collision side is smaller than a reference value, and non-occurrence of deformation of a vehicle side part is determined when the ratio of the high frequency components of the central part of the vehicle body to the high frequency components of the collision side is larger than or substantially equal to the reference value.

This determination method takes advantage of the fact that when the high frequency components in the outputs of the two acceleration sensors over a prescribed time period, as shown in FIGS. 1(I), 1(II), 3(I) and 3(II), the high frequency components energy more sharply decays in the central part than on the collision side of the vehicle body irrespective of the rotation of the vehicle body in case of a time period involving an intrusion, and the high frequency components energy does not substantially decay in the central part as compared with the collision side of the vehicle body irrespective of the rotation of the vehicle body in case of a time period involving only a travel of the vehicle body substantially without any intrusion.

The determination method for vehicle body deformation using the acceleration sensors (asymmetric) attached to the collision side and the central part of the vehicle body and based on the third determination logic (comparing high frequency components) has found to be advantageous not only when the vehicle body rotates but also when the vehicle body is reinforced (or the vehicle body has a high rigidity) as shown in FIG. 3(III). As the vehicle body structure is reinforced, the degree of deformation tends to diminish while the travel of the vehicle body increases. Therefore, the low frequency components in the time period involving deformation show little difference between the collision side, the central part and the opposite side of the vehicle body, and the characteristics related to the deformation show only in the high frequency components as shown in the shaded area in FIG. 3(III). In such a case also, according to the determination method for vehicle body deformation which compares the high frequency components, because the low frequency components which show differences depending on the occurrence of deformation are not used as the reference for determining the occurrence of deformation, a highly reliable determination results can be obtained.

The comparison of the ratio of the two sets of frequency components in the first to third determination logics can be implemented in a number of different ways, besides the method which divides a two-dimensional coordinate plane with a slanted threshold line and was described with reference to FIG. 7, and the method which compares the ratio between the two sets of frequency components with a certain threshold value line and was described with reference to FIG. 8. Such other possible methods includes a method which divides regions by using a threshold curve which corresponds to the comparison of a mathematical function of the high frequency components energy on the collision side and the low frequency components energy on the opposite side, and the rectangular region dividing method including the steps of comparing the high frequency components energy on the collision side with a corresponding reference value, comparing the low frequency components energy on the opposite side with a corresponding reference value, and defining the results with logic operation.

Referring to FIG. 4 again, how the left side determination output S1L and the right side determination output S1R of the side deformation determining unit 12 may be used in the activation determination unit 13 is described in the following.

The left side determination output S1L and the right side determination output S1R produced from the side deformation determining unit 12, for instance, consist of binary values, "1" indicating the occurrence of a side deformation, and "0" indicating the non-occurrence of a side deformation.

The activation determination unit 13 may consist of a conventional arrangement, and determines if the activation of the side air bag is necessary or not by interval integrating the discrete acceleration data Gsl(k) and Gsr(k) over one or more than two integration time intervals, and determining various modes of collision according to the obtained change in the speed. A more concrete structure of such an activation determination unit can be readily understood by a person skilled in the art in the light of publicly known documents, and any more details description thereof is omitted in this specification. Here, S2L and S2R denote the side air bag activation signals for the right and left side air bags.

In particular, in this activation determination unit 13, when the determination outputs S1L and S1R indicate that no side deformation has occurred, it is presumed to mean the occurrence of a side impact involving no intrusion into the passenger compartment, such as a collision with a curbstone and an offset side impact, and the determination threshold value in the activation determination unit or the structural factors such as the integration time and the determination logic are changed. Thereby, it becomes possible to determine the need to activate the side air bag by taking into the possibility of a mode of side impact resulting in a lateral travel of the vehicle body without any intrusion, and the possibility of causing an injury to the vehicle occupant.

Therefore, according to this side air bag activation control device 100, even when a sharp change in velocity is detected immediate after an impact due to a low speed side collision with a curbstone, or a low speed offset side impact which is not likely to affect the vehicle occupant, a determination output indicating the absence of side deformation from the side deformation determination unit 12 so that the unnecessary activation of the side air bag can be avoided. Even in case of a side impact involving only a travel of the vehicle body and without any side deformation, if the side impact is a result of an intermediate to high speed collision with a curbstone or an intermediate to high speed offset side impact which could cause an injury to the vehicle occupant, by adopting an appropriate method for determining the need to activate the side air bag which suits such modes of collision, it becomes possible to positively prevent the vehicle occupant from an injury.

As can be appreciated from the above description, an essential aspect of the present invention is to analyze the frequency components contained in an acceleration signals over preceding certain time periods. The means for this analysis was implemented by the frequency extraction process, which is often referred to as filtering, in the case of the embodiment illustrated in FIG. 4. This, however, should be considered as only one of a number of possible processes for frequency analysis. It should be obvious for a person skilled in the art that other known processes, such as time window moving FFT, may be used as well as the frequency extraction process based on filtering.

In those aspects of the present invention which determine the occurrence of vehicle side deformation according to the results of a plurality of frequency component analyses, it is necessary to transmit the original acceleration signals and the signals produced by processing the acceleration signals to a single location for arithmetic operations. A digital transmission technology was used for such transmission means in the embodiment illustrated in FIG. 4. This, however, should be considered only as exemplary of other possible means for data transmission. It should be obvious for a person skilled in the art that other modifications are possible. For instance, the acceleration signals may be transmitted as analog signals, and the results of arithmetic operations produced in various side units may be transmitted to a single location, possibly by using optical fibers.

It was the output of the acceleration sensor on the opposite side of the vehicle body or the central part of the vehicle body which was compared with the output of the acceleration on the collision side of the vehicle body in the above described embodiments, but the performance of the determination logic can be improved by using the outputs from both the accelerations as references for comparison. More specifically, the results of the frequency analysis (computed values) from the acceleration sensor (A) on the collision side of the vehicle body may be individually associated with both the results of the frequency analysis from the acceleration sensor (B) in the central part of the vehicle body, and the results of the frequency analysis from the acceleration sensor (C) on the opposite of the vehicle body so that OR logic (J1+J2) or AND logic (J1*J2) may be applied to the determination result (J1) based on the combination of the frequency analysis from the acceleration sensor (A) on the collision side of the vehicle body and the frequency analysis from the acceleration sensor (B) in the central part of the vehicle body, and the determination result (J2) based on the combination of the frequency analysis from the acceleration sensor (A) on the collision side of the vehicle body and the frequency analysis from the acceleration sensor (C) on the opposite side of the vehicle body.

Second Preferred Embodiment

Figure 11:
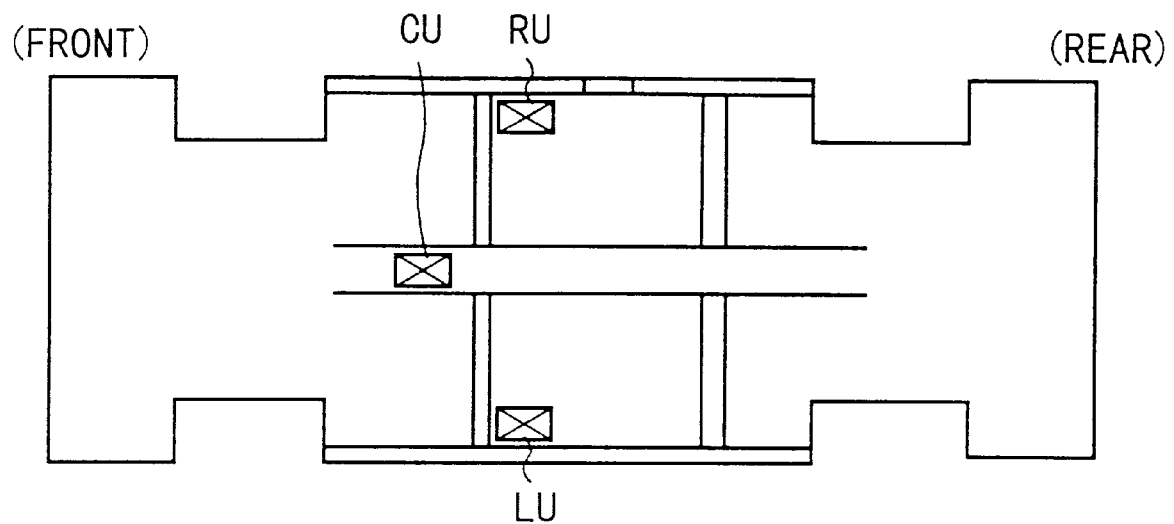
FIG. 11 is a vehicle structural view showing an exemplary arrangement of the various units according to the second embodiment of the present invention.

Now is described the overall structure of an embodiment of the device for determining an occurrence of deformation in a side part of the vehicle body according to the present invention with reference to the block diagram of FIG. 11.

First of all, the outline of the basic structure of the vehicle side deformation determination device is described. This vehicle side deformation determination device comprises a first acceleration detecting unit (U1) which is attached to a part of the vehicle body which will move in response to deformation of a side part of the vehicle body resulting from a side impact, and a second acceleration detecting unit (U2) which is attached to a part of the vehicle body which would not substantially move in response to deformation of a side part of the vehicle body resulting from a side impact. The first acceleration detecting unit (U1) includes an acceleration sensor, and binary value conversion means for comparing prescribed frequency components contained in the output signal of the corresponding acceleration sensor over a prescribed preceding time period with a prescribed threshold value, and producing the result of the comparison as a binary value. The second acceleration detecting unit (U2) includes an acceleration sensor, and binary value conversion means for comparing prescribed frequency components contained in the output signal of the corresponding acceleration sensor over a prescribed preceding time period with a prescribed threshold value, and producing the result of the comparison as a binary value. The vehicle side deformation determination device further comprises determination means (J) which determines if deformation of a vehicle side part has occurred or not according to the binary output signal from the binary conversion means included in the first acceleration detecting unit (U1) and the binary output signal from the binary conversion means included in the second acceleration detecting unit (U2). These units U1 and U2 and the determination means (J) are functional elements, and are not shown in the attached drawings.

In case of a one-side determination system which is limited only to the vehicle side part, on the side of the vehicle operator for instance, in determining deformation of a vehicle side part, the functions of the first acceleration detecting unit (U1) and the second acceleration detecting unit (U2) may be implemented by respective dedicated units. On the other hand, in case of a two-side determination system which covers both sides of the vehicle body in determining deformation of a vehicle side part, the functions of the first acceleration detecting unit (U1) and the second acceleration detecting unit (U2) may be implemented in a number of different ways by giving variously different functions to each unit and arranging the various units in different ways.

Figure 12:
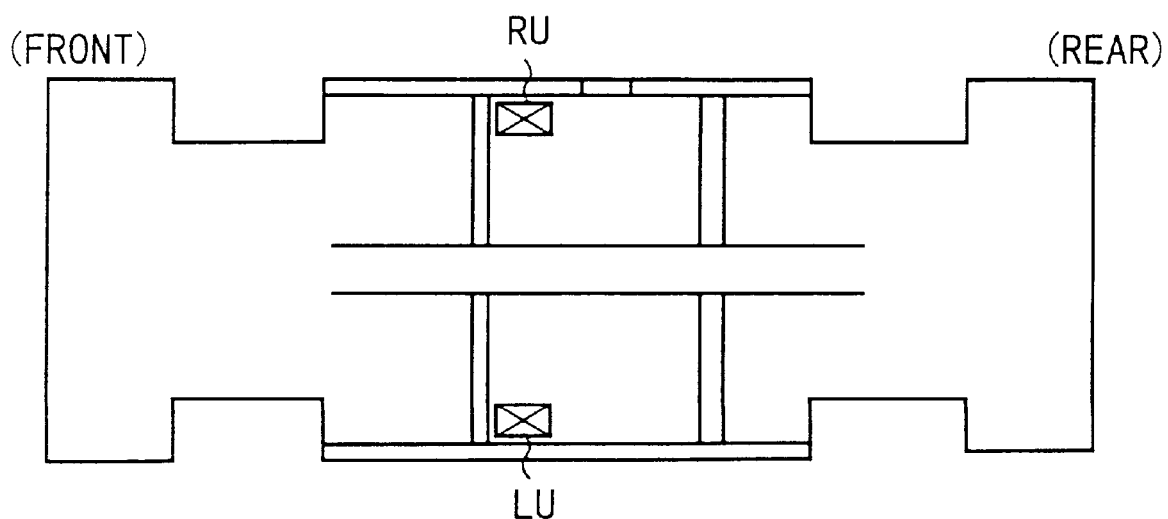
FIG. 12 is a vehicle structural view showing another exemplary arrangement of the various units according to the second embodiment of the present invention.

The views of the structure of a vehicle body in FIGS. 11 and 12 include the typical layouts of the various units. In these drawings, RU denotes a vehicle right side unit which is attached to a vehicle part which moves in response to the deformation of the right side of the vehicle body, LU denotes a vehicle left side unit which is attached to a vehicle part which moves in response to the deformation of the left side of the vehicle body, and CU denotes a vehicle central part unit which is attached to a vehicle part which would not substantially move in response to the deformation of either the right side of the vehicle body or the left side of the vehicle body. The possible arrangements of these units include the three-unit arrangement (RU, LU and CU) illustrated in FIG. 11, and the two-unit arrangement (RU and LU) illustrated in FIG. 12.

The expressions, "a vehicle part which moves in response to the deformation of a side part of the vehicle body", and "a vehicle part which would not substantially move in response to the deformation of either the right side of the vehicle body or the left side of the vehicle body", mean as explained in connection with the first embodiment. The vehicle central part unit CU may be attached to any vehicle part other than "a vehicle part which moves in response to the deformation of a side part of the vehicle body", but in view of the symmetric relationship between the vehicle left side unit LU and the vehicle right side unit RU, it would be desirable to mount the vehicle central part unit CU on a suitable location on a central longitudinal line X of the vehicle body extending in the fore-and-aft direction such as the center tunnel 20 as shown in FIG. 5(b).

Now is described the mode of operation of the various units RU, LU and CU in the three-unit arrangement illustrated in FIG. 11.

As described earlier, the present invention may be implemented by using the first acceleration detecting unit (U1) which is attached to a part of the vehicle body which will move in response to deformation of a side part of the vehicle body resulting from a side impact, the second acceleration detecting unit (U2) which is attached to a part of the vehicle body which would not substantially move in response to deformation of a side part of the vehicle body resulting from a side impact, the determination means (J) which determines if deformation of a vehicle side part has occurred or not according to the binary output signal from the binary value conversion means included in the first acceleration detecting unit (U1) and the binary output signal from the binary value conversion means included in the second acceleration detecting unit (U2). These units U1 and U2 and the determination means (J) are functional elements, and are not specifically illustrated in the attached drawings.

Of these essential elements (U1, U2 and J), the functions of the first acceleration detecting unit (U1) may be accomplished by the vehicle left side unit LU in case of a left side impact, and by the vehicle right side unit RU in case of a right side impact. On the other hand. there are many possible alternatives with regard to the specific units which accomplish the functions of the second acceleration detecting unit (U2) and the determination means (J).

According to a first method, as will be described in more detail hereinafter with reference to FIG. 14, the function of both the second acceleration detecting unit (U2) and the determination means (J) may be accomplished by the vehicle central part unit CU. According to a second method, as will be described in more detail hereinafter with reference to FIG. 15, the function of the second acceleration detecting unit (U2) may be accomplished by either one of the vehicle right side unit RU and the vehicle left side unit LU which is located on the opposite side of the vehicle body, and the function of the determination means (J) may be accomplished by the vehicle central part unit CU for the determination of deformation of either vehicle side part.

Now the outline of the functions of the respective units RU and LU in the two-unit arrangement illustrated in FIG. 12 is described in the following. In this case also, the functions of the first acceleration detecting unit (U1) is accomplished by the vehicle left side unit LU in case of a left side impact, and by the vehicle right side unit RU in case of a right side impact. On the other hand, the function of the second acceleration detecting unit (U2) is accomplished by either one of the vehicle right side unit RU and the vehicle left side unit LU which is located on the opposite side of the vehicle body, and the function of the determination means (J) is accomplished by the vehicle right side unit RU for determining the deformation of a vehicle right side part, and by the vehicle left side unit LU for determining the deformation of a vehicle left side part.

The determination of deformation of a vehicle side part by the determination means (J) can be accomplished by any one of the following determination logics by combining the frequency components which are handled by the first acceleration detecting unit (U1) and the second acceleration detecting unit (U2).

Figure 13:
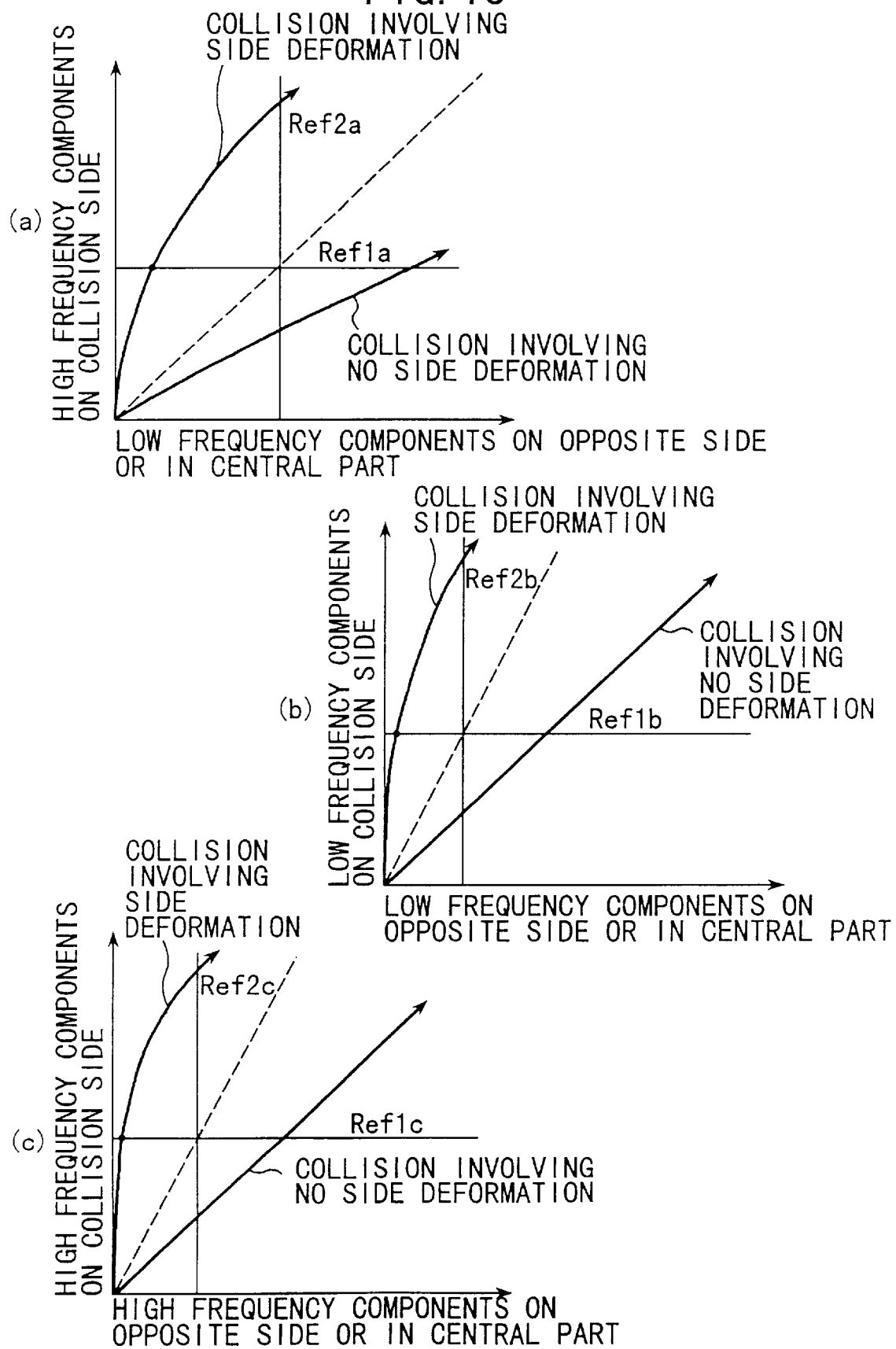
FIG. 13 is a view showing several methods for determining deformation which may be applied to the device of the second embodiment of the present invention.

According to the first determination logic, the occurrence of deformation of a vehicle side part is determined by comparing the on-timing of the binary output signal based on the high frequency components contained in the output signal of the acceleration sensor incorporated in the first acceleration detecting unit (U1) with the on-timing of the binary output signal based on the low frequency components (or frequency components of a wider range including low frequency components) contained in the output signal of the acceleration sensor incorporated in the second acceleration detecting unit (U2). This is based on the recognition that, as illustrated in FIG. 13(a), if the trajectories of the low frequency components (or frequency components of a wider range including low frequency components) in the central part or on the opposite side of the vehicle body which are to be detected by the second acceleration detecting unit (U2), and the high frequency components on the collision side of the vehicle body which are to be detected by the first acceleration detecting unit (U1) are observed in the two-dimensional coordinate plane in which the two sets of frequency components are taken along the X-axis and the Y-axis, respectively, the following conclusion can be drawn. Namely, in case of a side impact involving deformation of a vehicle side part, the high frequency components on the collision side of the vehicle body exceed the associated threshold value (Ref1a) earlier than the low frequency components (or frequency components of a wider range including low frequency components) in the central part or on the opposite side of the vehicle body exceed the associated threshold value (Ref2a); on the other hand, in case of a side impact involving substantially no deformation of a vehicle side part, the low frequency components (or frequency components of a wider range including low frequency components) in the central part or on the opposite side of the vehicle body exceed the associated threshold value (Ref2a) earlier than the high frequency components on the collision side of the vehicle body exceed the associated threshold value (Ref1a).

According to the second determination logic, the occurrence of deformation of a vehicle side part is determined by comparing the on-timing of the binary output signal based on the low frequency components (or frequency components of a wider range including low frequency components) contained in the output signal of the acceleration sensor incorporated in the first acceleration detecting unit (U1) with the on-timing of the binary output signal based on the low frequency components (or frequency components of a wider range including low frequency components) contained in the output signal of the acceleration sensor incorporated in the second acceleration detecting unit (U2). This is based on the recognition that, as illustrated in FIG. 13(b), if the trajectories of the low frequency components (or frequency components of a wider range including low frequency components) in the central part or on the opposite side of the vehicle body which are to be detected by the second acceleration detecting unit (U2), and the low frequency components (or frequency components of a wider range including low frequency components) on the collision side of the vehicle body which are to be detected by the first acceleration detecting unit (U1) are observed in the two-dimensional coordinate plane in which the two sets of frequency components are taken along the X-axis and the Y-axis, respectively, the following conclusion can be drawn. Namely, in case of a side impact involving deformation of a vehicle side part, the low frequency components (or frequency components of a wider range including low frequency components) on the collision side of the vehicle body exceed the associated threshold value (Ref1a) earlier than the low frequency components (or frequency components of a wider range including low frequency components) in the central part or on the opposite side of the vehicle body exceed the associated threshold value (Ref2a); on the other hand, in case of a side impact not involving substantially any deformation of a vehicle side part, the low frequency components (or frequency components of a wider range including low frequency components) in the central part or on the opposite side of the vehicle body exceed the associated threshold value (Ref2a) earlier than the low frequency components (or frequency components of a wider range including low frequency components) on the collision side of the vehicle body exceed the associated threshold value (Ref1a).

According to the third determination logic, the occurrence of deformation of a vehicle side part is determined by comparing the on-timing of the binary output signal based on the high frequency components contained in the output signal of the acceleration sensor incorporated in the first acceleration detecting unit (U1) with the on-timing of the binary output signal based on the high frequency components contained in the output signal of the acceleration sensor incorporated in the second acceleration detecting unit (U2). This is based on the recognition that, as illustrated in FIG. 13(c), if the trajectories of the high frequency components in the central part or on the opposite side of the vehicle body which are to be detected by the second acceleration detecting unit (U2), and the high frequency components on the collision side of the vehicle body which are to be detected by the first acceleration detecting unit (U1) are observed in the two-dimensional coordinate plane in which the two sets of frequency components are taken along the X-axis and the Y-axis, respectively, the following conclusion can be drawn. Namely, in case of a side impact involving deformation of a vehicle side part, the high frequency components on the collision side of the vehicle body exceed the associated threshold value (Ref1a) earlier than the high frequency components in the central part or on the opposite side of the vehicle body exceed the associated threshold value (Ref2a); on the other hand, in case of a side impact involving substantially no deformation of a vehicle side part, the high frequency components in the central part or on the opposite side of the vehicle body exceed the associated threshold value (Ref2a) earlier than the high frequency components on the collision side of the vehicle body exceed the associated threshold value (Ref1a).

Four concrete embodiments of the vehicle body side deformation determination device are described in the following in more detail with reference to FIGS. 14, 15, 16 and 17. The first determination logic described in FIG. 13(a) is selected as the determination logic for these, but it is also possible to use the second or the third determination logic described in FIG. 13(b) or FIG. 13(c).

Figure 14:
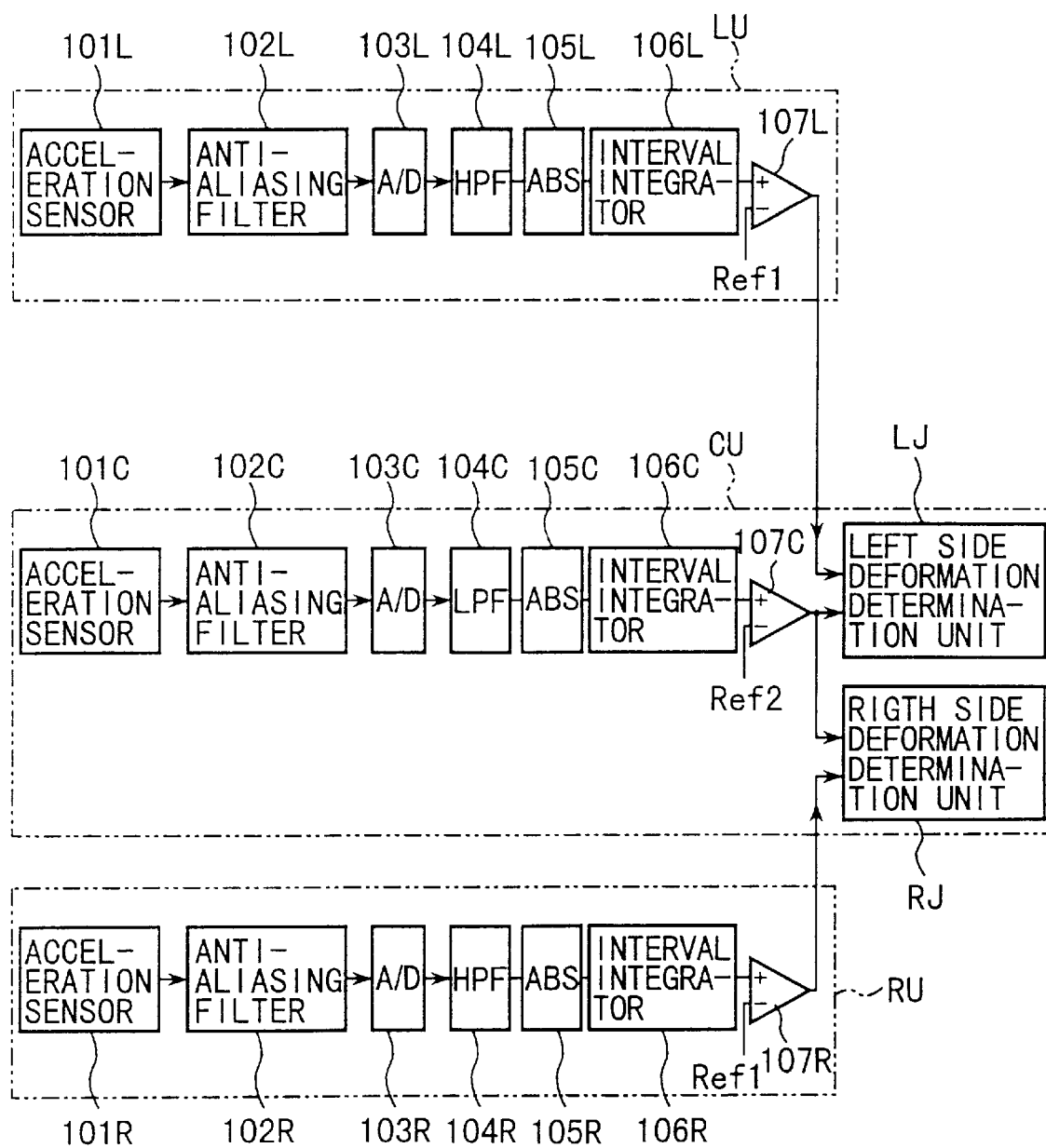
FIG. 14 is a block diagram showing an example of the device of the second embodiment of the present invention.

First of all, the device illustrated in FIG. 14 is described in the following. This vehicle body side deformation determination device comprises a vehicle right side unit RU which is attached to a vehicle part which moves in response to the deformation of the right side of the vehicle body, a vehicle left side unit LU which is attached to a vehicle part which moves in response to the deformation of the left side of the vehicle body, and a vehicle central part unit CU which is attached to a vehicle part which would not substantially move in response to the deformation of either the right side of the vehicle body or the left side of the vehicle body. In this case, the first acceleration detecting unit (U1) corresponds to either one of the vehicle right side unit RU and the vehicle left side unit LU which is on the collision side of the vehicle body, and the second acceleration detecting unit (U2) corresponds to the vehicle central part unit CU. The vehicle central part unit (CU) includes both a right side deformation determination unit RJ and a left side determination unit LJ which correspond to the determination means (J) of the present invention.

The vehicle right side unit RU and the vehicle left side unit LU include acceleration sensors 101L and 101R, antialiasing filters 102L and 102R, AD converters 103L and 103R, high pass filters (HPF) 104L and 104R, absolute value converters (ABS) 105L and 105R, interval integrators 106L and 106R, and comparators 107L and 107R.

The acceleration sensors 101L and 101R may consist of those having strain gauges made of piezoelectric resistors formed on semiconductor substrates, electrostatic capacitive acceleration sensors, and acceleration sensors using piezoelectric elements. The acceleration in the lateral direction of the vehicle body is of primary interest in this case, but the sensors may be each capable of detecting acceleration in two or three directions.

The antialiasing filters 102L and 102R remove turnaround errors in AD conversion, and may consist of filters having various configurations.

The AD converters (A/D) 103L and 103R AD convert the output from the acceleration sensors 101L and 101R transmitted thereto via the antialiasing filters 102L and 102R into discrete right and left acceleration data Gsl(k) and Gsr(k), and may consist of AD converters having various configurations.

The thus obtained discrete right and left acceleration data Gsl(k) and Gsr(k) are processed by the succeeding high pass filters (HPF) 104L and 104R, the absolute value converters (ABS) 105L and 105R, and the interval integrators 106L and 106R as described in the following to allow the high frequency components energy of the accelerations detected by the right and left acceleration sensors 101L and 101R to be obtained.

The right and left high pass filters (HPF) 104L and 104R extracts high frequency components from the output signals of the acceleration sensors 101L and 101R by conducting a software high frequency filtering process on the thus obtained discrete acceleration data Gsl(k) and Gsr(k). In the above described structure, the high pass filter (HPF) 104L and 104R may consist of differential arithmetic algorithm such as the forward or backward differential algorithm and Simpson's differential theorem. The absolute value converters (ABS) 105L and 105R convert the high frequency components obtained from the high pass filters (HPF) 104L and 104R into their absolute values. The interval integrators 106L and 106R integrate the absolute values of the high frequency components over a prescribed time period (such as 5 to 30 ms). This produces the high frequency components energy included in the output signals of the right and left acceleration sensors 101L and 101R over a prescribed preceding time period.

The high frequency components energy levels obtained from the interval integrators 106L and 106R are compared with the prescribed reference value Ref1 in the comparators 107L and 107R (corresponding to the binary conversion means), and are converted into a binary value consisting of either "0" or"1". In other words, these comparators 107L and 107R determine if the high frequency components energy contained the output signal from each of the right and left acceleration sensors 101L and 101R over a prescribed preceding time period has reached the prescribed reference value Ref1 or not. The functions of absolute value converters (ABS) 105L and 105R, the interval integrators 106L and 106R, and the comparators 107L and 107R can also be accomplished by a microcomputer provided with suitable software.

The vehicle central part unit CU likewise comprises an acceleration sensor 101C, an antialiasing filter 102C, an AD converter 103C, a low pass filter (LPF) 104C, an absolute value converter (ABS) 105C, an interval integrator 106C, and a comparator 107C. The contents of these elements 101C to 107C are similar to those of the vehicle right side unit RU and the vehicle left side unit LU, except for the low pass filter (LPF) 104C.

The acceleration sensor 101C may consist of those having strain gauges made of piezoelectric resistors formed on semiconductor substrates, electrostatic capacitive acceleration sensors, and acceleration sensors using piezoelectric elements. The direction of acceleration in the lateral direction of the vehicle body is of primary interest in this case, but the sensor may be capable of detecting acceleration of two or three directions.

The antialiasing filter 102C remove turnaround errors in AD conversion, and may consist of filters having various configurations.

The AD converter (A/D) 103C AD converts the output from the acceleration sensor 101C transmitted thereto via the antialiasing filter 102C into discrete acceleration data Gsc(k), and may consist of AD converters having various configurations.

The thus obtained discrete acceleration data Gsc(k) is processed by the succeeding low pass filter (LPF) 104C, the absolute value converter (ABS) 105C, and the interval integrator 106C as described in the following to allow the low frequency components energy of the acceleration detected by the central acceleration sensors 101C to be obtained.

The low high pass filters (LPF) 104C extracts low frequency components from the output signal of the acceleration sensor 101C by conducting a software low frequency filtering process on the thus obtained discrete acceleration data Gsc(k). The absolute value converter (ABS) 105C converts the low frequency components obtained from the low pass filters (LPF) 104C into their absolute value. The interval integrator 106C integrates the absolute value of the low frequency components over a prescribed time period (such as 5 to 30 ms). This produces the low frequency components energy included in the output signal of the central acceleration sensor 101C over a prescribed preceding time period.

The low frequency components energy level obtained from the interval integrator 106C is compared with the prescribed reference value Ref2 in the comparator 107C (corresponding to the binary conversion means), and is converted into a binary value consisting of either "0" or"1". In other words, the comparator 107C determines if the low frequency components energy contained the output signal from the central acceleration sensors 101C over a prescribed preceding time period has reached the prescribed reference value Ref2 or not. When the absolute value converter (ABS) 105C is not uses, as it means that the low frequency components for a side impact of only one side is being considered, another comparator having a threshold value of an opposite sign in a stage following the interval integrator 106C would be become necessary when the absolute value converter is not used in the present embodiment, and these may be appropriately combined with the right and left side units.

The binary output signals obtained from the comparator 107L of the vehicle left side unit LU and the comparator 107R of the vehicle right side unit RU are transmitted to the vehicle central part unit CU via an appropriate transmission device. The transmitter and the receiver for such a transmission device may be implemented not only by a simple structure exchanging "H" and "L" as a base band but also by using a pair of dedicated IC's for each of the vehicle left side unit LU, the vehicle right side unit RU and the vehicle central part unit CU. It is also possible to conduct a communication by using a special communication protocol which may be implemented in interface circuits and microcomputers.

Now is described the mode of operation in determining the occurrence of deformation of a either right or left side of a vehicle body in the vehicle central part unit CU according to the binary output signals transmitted from the vehicle left side unit LU, the vehicle right side unit RU. Referring to FIG. 14, the vehicle central part unit CU comprises both a right side deformation determination unit RJ and a left side determination unit LJ which correspond to the determination means (J) of the present invention.

In the left side determination unit U, the occurrence of deformation of a vehicle left side part is determined from the binary signal indicating the high frequency components energy (if it exceeds the threshold value Ref1 or not) transmitted from the comparator 107L of the vehicle left side unit LU, and the binary signal indicating the low frequency components energy (if it exceeds the threshold value Ref2 or not) transmitted from the comparator 107C of the vehicle central part unit CU. If the on-timing of the binary signal (the timing of exceeding the threshold value Ref1) from the comparator 107L of the vehicle left side unit LU is earlier than the on-timing of the binary signal (the timing of exceeding the threshold value Ref2) from the comparator 107C of the vehicle central part unit CU, it can be determined that a deformation has occurred in the left side part of the vehicle body. On the other hand, if the on-timing of the binary signal (the timing of exceeding the threshold value Ref2) from the comparator 107C of the vehicle central part unit CU is earlier than the on-timing of the binary signal (the timing of exceeding the threshold value Ref1) from the comparator 107L of the vehicle left side unit LU, it can be determined that no deformation has occurred in the left side part of the vehicle body.

In the right side determination unit RJ, the occurrence of deformation of a vehicle right side part is determined from the binary signal indicating the high frequency components energy (if it exceeds the threshold value Ref1 or not) transmitted from the comparator 107R of the vehicle right side unit RU, and the binary signal indicating the low frequency components energy (if it exceeds the threshold value Ref2 or not) transmitted from the comparator 107C of the vehicle central part unit CU. If the on-timing of the binary signal (the timing of exceeding the threshold value Ref1) from the comparator 107R of the vehicle right side unit RU is earlier than the on-timing of the binary signal (the timing of exceeding the threshold value Ref2) from the comparator 107C of the vehicle central part unit CU, it can be determined that a deformation has occurred in the right side part of the vehicle body. On the other hand, if the on-timing of the binary signal (the timing of exceeding the threshold value Ref2) from the comparator 107C of the vehicle central part unit CU is earlier than the on-timing of the binary signal (the timing of exceeding the threshold value Ref1) from the comparator 107R of the vehicle right side unit RU, it can be determined that no deformation has occurred in the right side part of the vehicle body.

Figure 18:
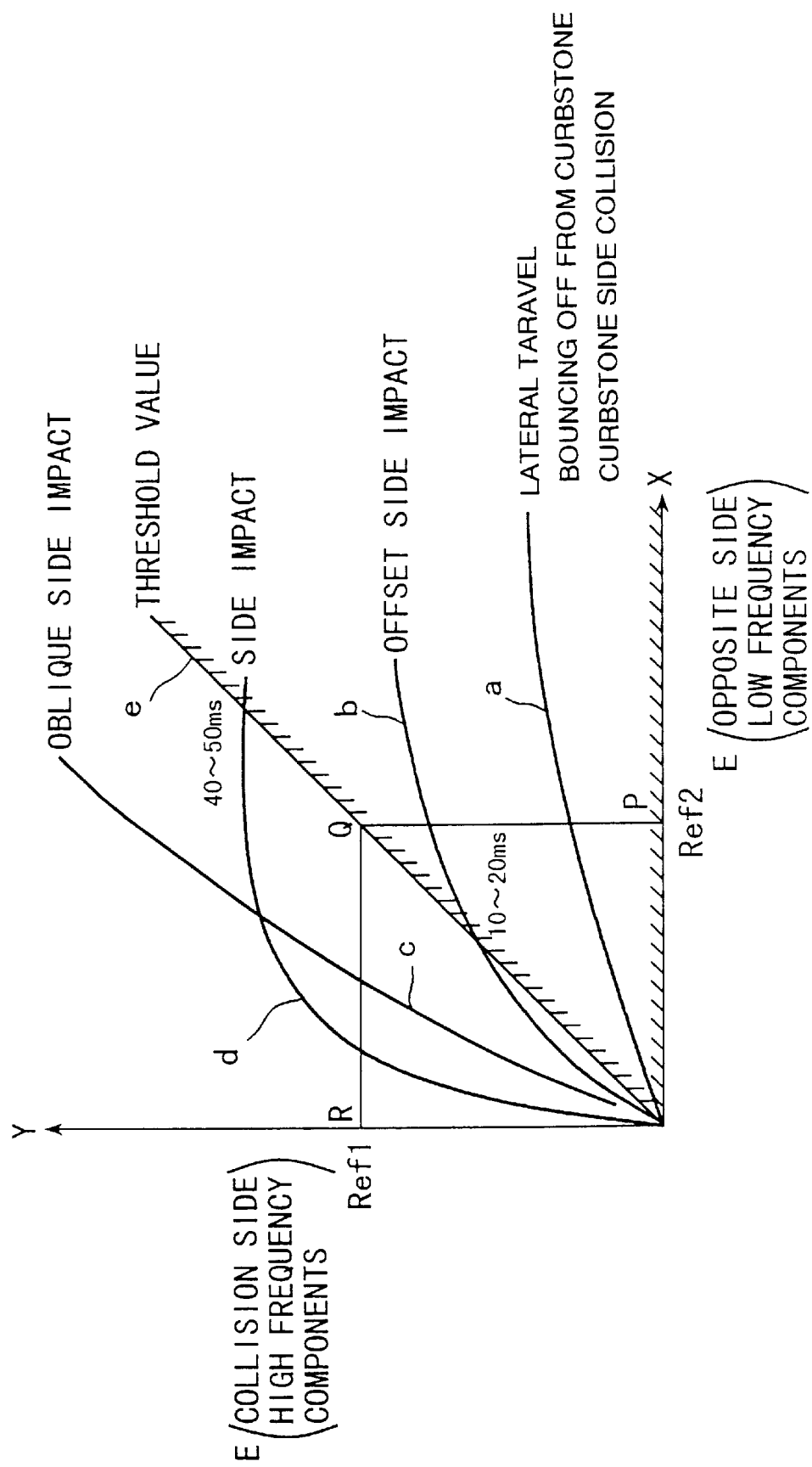
FIG. 18 is a graph showing the results of the actual process of determining a side deformation of a vehicle body by using the first determination method in the device of the second embodiment of the present invention.

An exemplary determination process of determination an occurrence of deformation on the collision side of the vehicle body is shown in the two-dimensional coordinate plane of FIG. 18 in which the low frequency components energy on the opposite side and the high frequency components on the collision side are taken along the X- and Y-axes, respectively.

In this drawing, "a" indicates a curve showing the values on the two-dimensional coordinate system when the vehicle has moved laterally and been bounced back by a curbstone or when the vehicle has collided laterally with a curbstone, "b" indicates a curve showing the values on the two-dimensional coordinate system when the vehicle has made an offset side collision, "c" indicates a curve showing the values on the two-dimensional coordinate system when the vehicle has made an angled side collision, "d" indicates a curve showing the values on the two-dimensional coordinate system when the vehicle has made a side collision, and "e" indicates a threshold line defining a prescribed angle for determining the occurrence of deformation in a vehicle side part.

Similarly as described previously in connection with FIG. 7, when the coordinate value in the two dimensional coordinate system is located in the shaded area defined by the X-axis and the slanted threshold line e, it can be concluded that deformation involving an intrusion has not occurred to the collision side of the vehicle body. On the other hand, when the coordinate value in the two dimensional coordinate system is located in the area defined by the Y-axis and the slanted threshold line e, it can be concluded that deformation involving an intrusion has occurred to the collision side of the vehicle body.

Observation of the curves a, b, c and d based on such an assumption leads to the conclusion that no deformation involving an intrusion has occurred to the collision side of the vehicle body when the vehicle has moved laterally, and has been bounced back by the curbstone or when the vehicle collided sideways with a curbstone, because the curve a is located within the shaded area (determination 1). Also when the vehicle has made an offset side collision, because the curve b is located within the shaded area, it can be concluded that no deformation involving an intrusion has occurred to the collision side of the vehicle body (determination 2). On the other hand, when the vehicle has made an oblique side collision, because the curve c is not located in the shaded area, it can be concluded that deformation involving an intrusion has occurred to the collision side of the vehicle body (determination 3). Also when the vehicle has made a side collision, because the curve d is not located in the shaded area, it can be concluded that deformation has occurred to the collision side of the vehicle body (determination 4).

The above described determinations (determinations 1 to 4) can be also interpreted in the following manner.

When the vehicle has moved laterally and been bounced back by a curbstone or when the vehicle has collided laterally with a curbstone, the curve a eventually crosses line PQ. Similarly, when the vehicle has made an offset side collision, the curve b eventually crosses line PQ. On the other hand, when the vehicle has made an angled side collision, the curve c eventually crosses line RQ. Crossing of line PQ by any curve means that the low frequency components energy on the opposite side exceeds the threshold value Ref2 before the high frequency components energy on the collision side exceeds the threshold value Ref1. Similarly, crossing of line RQ by any curve means that the high frequency components energy on the collision side exceeds the threshold value Ref1 before the low frequency components energy on the opposite side exceeds the threshold value Ref2.

Therefore, when any signals are obtained from the two acceleration sensors on either side of the vehicle body, it is possible to accurately determine if a side impact has caused a deformation on the collision side of the vehicle body by noting the high frequency components energy contained in the acceleration signal from the collision side and the low frequency components energy contained in the acceleration signal from the opposite side, and which of them has exceeded the corresponding threshold value (Ref1 or Ref2) before the other.

Thus, according to the device shown in FIG. 14, because the frequency components of different extraction band ranges derived from acceleration sensors attached to the collision side and the central part of the vehicle body, it is possible to accurately determine if a side impact has caused deformation on the collision side of the vehicle body at least by using the acceleration signal produced in a part of the vehicle body which moves in response to the deformation of the vehicle side part as a result of the side impact (which is not necessarily produced by the deformation of the vehicle side part). Furthermore, because a comparator incorporated with the acceleration sensor is used for determining if the frequency components energy has reached a prescribed value, and a single bit signal resulting from this determination process is transmitted to the side deformation determination unit (LJ or RJ) to determined which of the single bit signal changed into the ON state, it is not necessary to transmit the multi-bit acceleration signal itself between the units LU and RU, and this contributes to the improvement in performance through elimination of the influences of noises.

Figure 15:
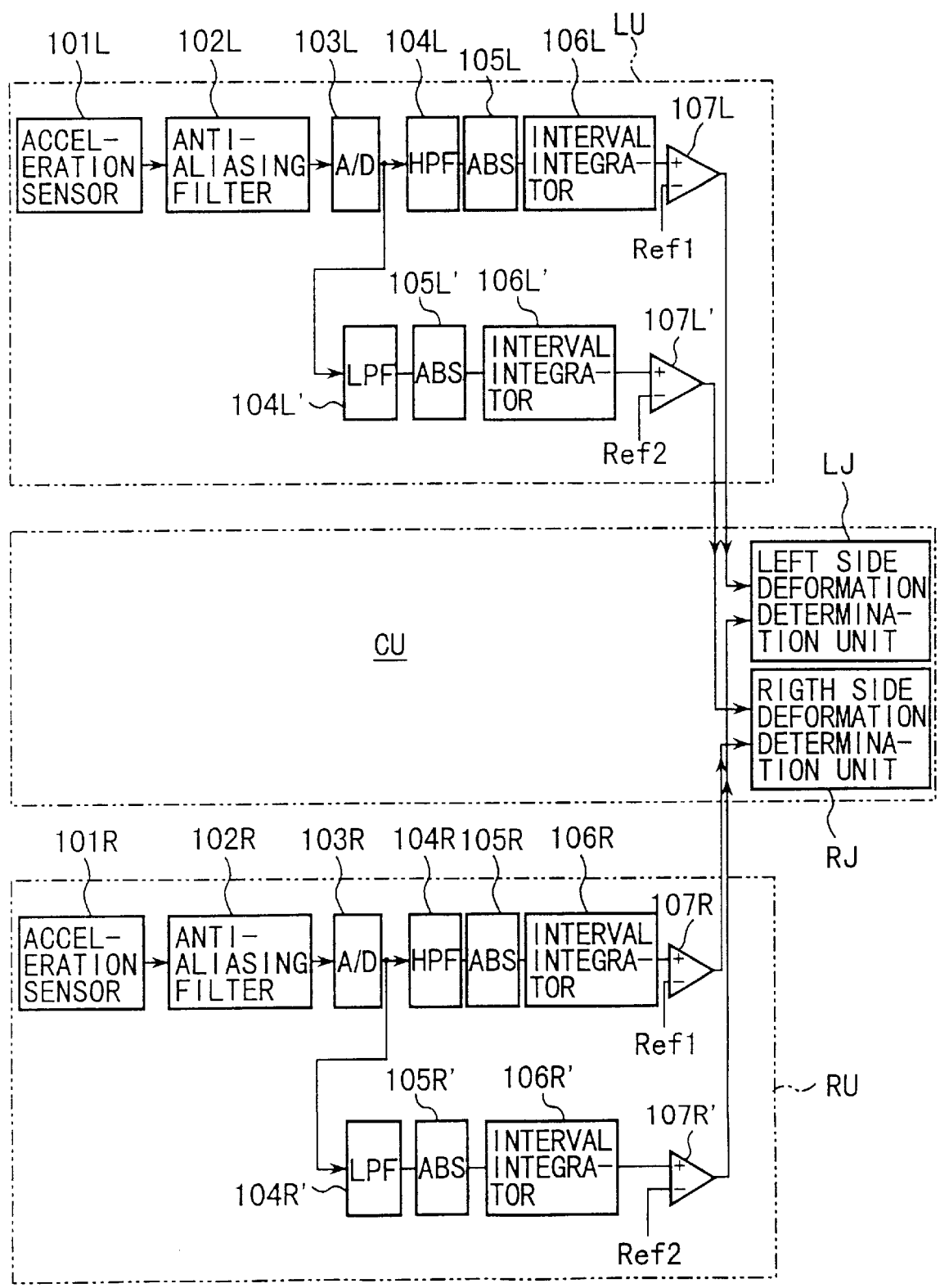
FIG. 15 is a block diagram showing another example of the device of the second embodiment of the present invention.

The device illustrated in FIG. 15 is described in the following. This vehicle body side deformation determination device comprises a vehicle right side unit RU which is attached to a vehicle part which moves in response to the deformation of the right side of the vehicle body, a vehicle left side unit LU which is attached to a vehicle part which moves in response to the deformation of the left side of the vehicle body, and a vehicle central part unit CU which is attached to a vehicle part which would not substantially move in response to the deformation of either the right side of the vehicle body or the left side of the vehicle body. In this case, the first acceleration detecting unit (U1) corresponds to either one of the vehicle right side unit RU and the vehicle left side unit LU which is on the collision side of the vehicle body, and the second acceleration detecting unit (U2) corresponds to the vehicle central part unit CU. The vehicle central part unit (CU) includes both a right side deformation determination unit RJ and a left side deformation determination unit LJ which correspond to the determination means (J) of the present invention.

As can be appreciated by the comparison of FIGS. 14 and 15, the device illustrated in FIG. 15 comprises, in the vehicle right side unit RU and the vehicle left side unit LU, low pass filters (LPF) 104L' and 104R', absolute value converters (ABS) 105L' and 105R', interval integrators 106L' and 106R', and comparators 107L' and 107R'. In other words, the elements 101C, 102C, 103C, 104C, 105C, 106C and 107C in the vehicle central part unit CU which were required in the device illustrated in FIG. 14 were eliminated. The parts corresponding to those shown in FIG. 14 are denoted with like numerals in FIG. 15 without repeating the description thereof.

According to the device illustrated in FIG. 15, only two acceleration sensors are required, and because the first acceleration detecting unit (U1) and the second acceleration detecting unit (U2) are at an equal distance from the gravitational center of the vehicle body, rotation of the vehicle body resulting from a side impact evenly affects the two detecting units (U1 and U2) so that the performance of the acceleration sensors can be improved. When the absolute value converters (ABS) 105L' and 105R' are omitted, the threshold values for the comparators 107L' and 107R' should have signs suited to determine the low frequency components of side impacts from mutually opposite sides of the vehicle body.

Figure 16:
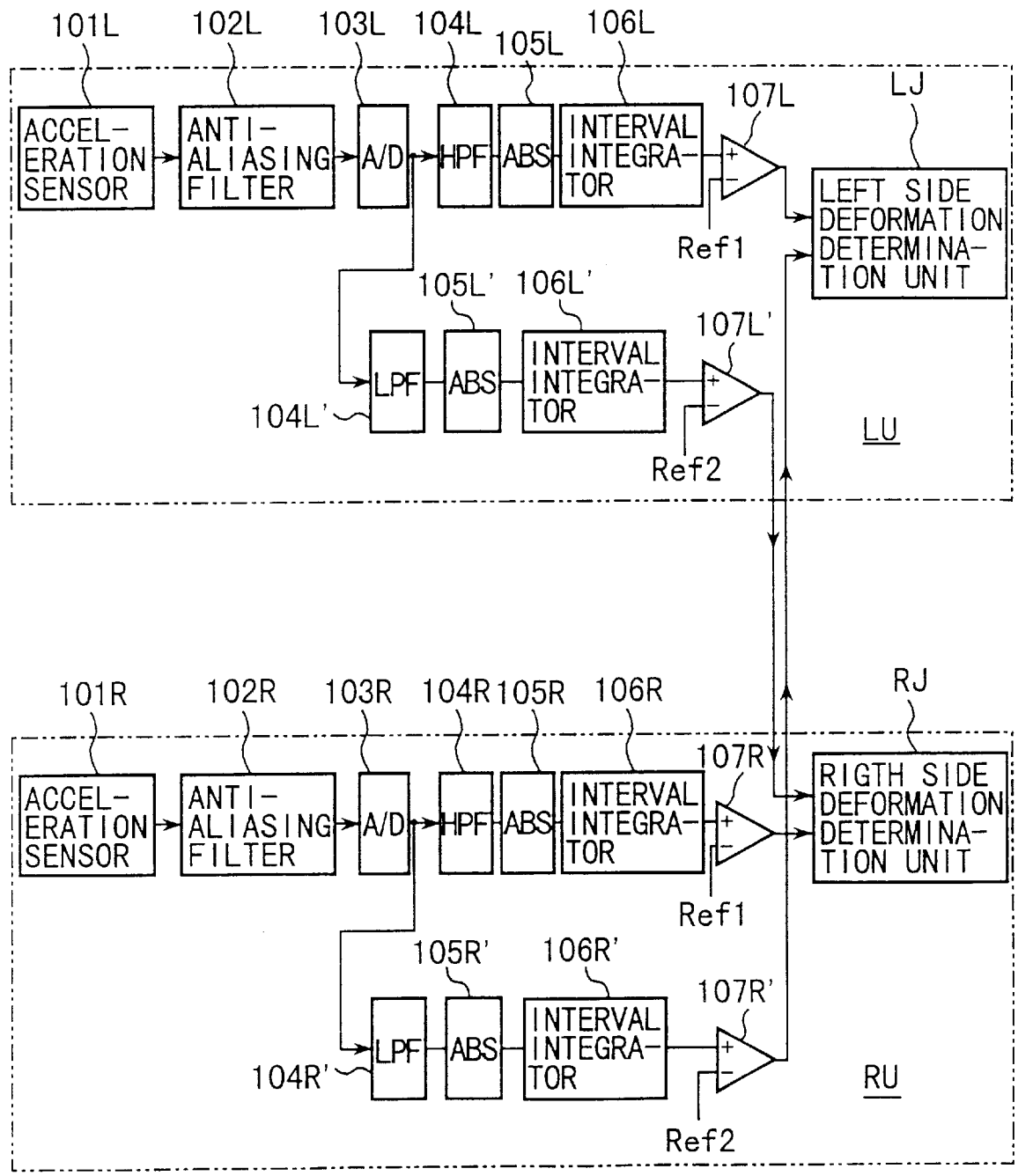
FIG. 16 is a block diagram showing yet another example of the device of the second embodiment of the present invention.

The device illustrated in FIG. 16 is described in the following. This vehicle body side deformation determination device comprises a vehicle right side unit RU which is attached to a vehicle part which moves in response to the deformation of the right side of the vehicle body, and a vehicle left side unit LU which is attached to a vehicle part which moves in response to the deformation of the left side of the vehicle body. In this case, the first acceleration detecting unit (U1) corresponds to either one of the vehicle right side unit RU and the vehicle left side unit LU which is on the collision side of the vehicle body, and the second acceleration detecting unit (U2) corresponds to the other one of the vehicle right side unit RU and the vehicle left side unit LU which is on the opposite side of the vehicle body. The vehicle left side unit (LU) includes a left side deformation determination unit LJ which corresponds to the determination means (J) of the present invention, and the vehicle right side unit (RU) includes a right side deformation determination unit RJ which corresponds to the determination means (J) of the present invention.

As can be appreciated by the comparison of FIGS. 15 and 16, the device illustrated in FIG. 16 includes the left side deformation determination unit LJ in the vehicle left side unit (LU), and the right side deformation determination unit RJ in the vehicle right side unit (RU), and does not require the central determination unit CU. The parts corresponding to those of FIG. 15 are denoted with like numerals without repeating the description thereof.

According to the device illustrated in FIG. 16, in addition to the advantages obtained by the device illustrated in FIG. 15, it is possible to achieve the advantages in that the left side deformation determination unit LJ and the right side deformation determination unit RJ can be arranged in the left side unit LU and the right side unit RU, respectively, when a side air bag activation control device is individually incorporated in each of the right side unit RU and the left side unit LU as described hereinafter.

Figure 17:
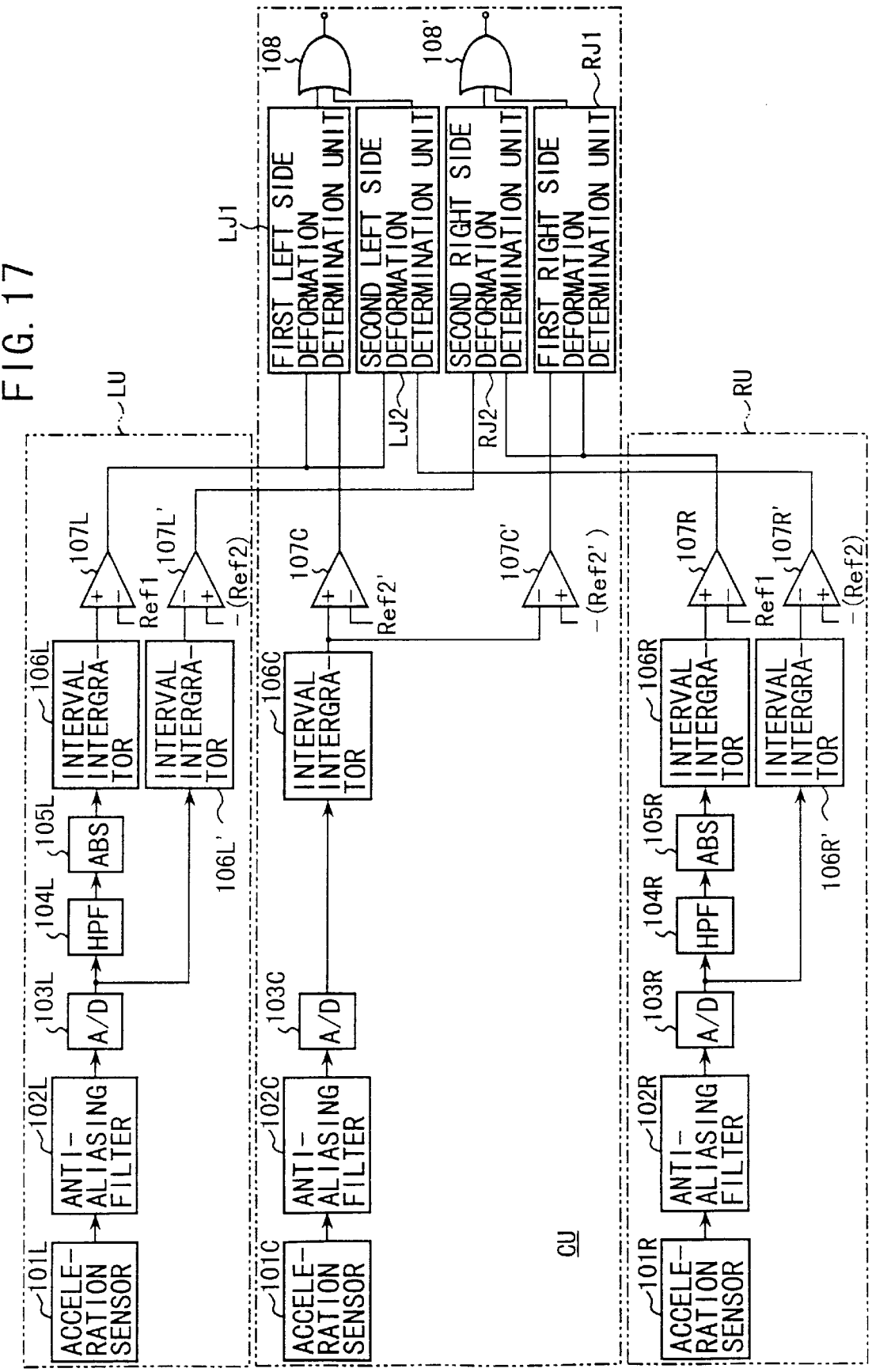
FIG. 17 is a block diagram showing yet another example of the device of the second embodiment of the present invention.

The device illustrated in FIG. 17 is described in the following. This vehicle body side deformation determination device comprises a first acceleration detecting unit (U1) which is attached to a vehicle part which moves in response to the deformation of a side part of the vehicle body resulting from a side impact, a plurality of second acceleration detecting units (U2) which are attached to vehicle parts which do not substantially move in response to the deformation of a side part of the vehicle body resulting from a side impact. The first acceleration detecting unit (U1) comprises an acceleration sensor and a binary value conversion means for comparing certain frequency components contained in the output signal of the acceleration sensor over a prescribed preceding time period with a prescribed threshold value and producing a corresponding binary value. The second acceleration detecting units (U2) each comprise an acceleration sensor and a binary value conversion means for comparing certain frequency components contained in the output signal of the acceleration sensor over a prescribed preceding time period with a prescribed threshold value and producing a corresponding binary value. The vehicle body side deformation determination device further comprises determination means for determining the occurrence of the deformation of a vehicle side part from the binary output signal from the binary value conversion means incorporated in the first acceleration detecting unit (U1), and the binary output signal from the binary value conversion means incorporated in each of the second acceleration detecting units (U2).

The embodiment illustrated in FIG. 17 comprises a vehicle right side unit (RU) which is attached to a vehicle part which moves in response to the deformation of a right side part of the vehicle body resulting from a side impact, a vehicle left side unit (LU) which is attached to a vehicle part which moves in response to the deformation of a left side part of the vehicle body resulting from a side impact, and a vehicle central part unit CU which is attached to a vehicle part which would not substantially move in response to the deformation of either the right side of the vehicle body or the left side of the vehicle body. In this case, the first acceleration detecting unit (U1) corresponds to either one of the vehicle right side unit RU and the vehicle left side unit LU which is on the collision side of the vehicle body, and the second acceleration detecting units (U2) correspond to the other of the vehicle right side unit RU and the vehicle left side unit LU which is on the opposite side of the vehicle body and the vehicle central part unit CU. The vehicle central part unit (CU) includes both a first right side deformation determination unit RJ1, a second right side deformation determination unit RJ2, a first left side deformation determination unit LJ1 and a second left side deformation determination unit LJ2 which correspond to the determination means (J) of the present invention.

Referring to FIG. 17, the vehicle right side unit RU and the vehicle left side unit LU comprise high frequency components extraction systems incorporated with high pass filters (HPF) 104L and 104R, absolute value converters (ABS) 105L and 105R, interval integrators 106L and 106R, and comparators 107L and 107R, and low frequency components extraction systems incorporated with interval integrators 106L' and 106R', and inverted input comparators 107L' and 107R'. As can be appreciated from the drawing, the low frequency components extraction systems lead the output signals of the AD converters (AID) 103L and 103R to the interval integrators 106L' and 106R' without passing through the low pass filters (LPF) or the absolute value converters (ABS) so that frequency components of a wide range including low frequency components may be extracted. Thus, the low frequency components extracted from the interval integrators 106L' and 106R' are compared with the threshold value (−Ref2) in the succeeding inverted input comparators 107L' and 107R' and converted into appropriate binary values.

The vehicle central part unit CU comprises a low frequency components extraction system incorporated with an interval integrators 106C, a non-inverted input comparator 107C, and a inverted input comparator 107C'. The low frequency components extraction system leads the output signals of the AD converter 103C to the interval integrator 106C without passing through the low pass filter (LPF) or the absolute value converter (ABS) so that frequency components of a wide range including low frequency components may be extracted. Thus, the low frequency components extracted from the interval integrator 106C are compared with the threshold values (Ref2' and −Ref2) in the succeeding non-inverted input and inverted input comparators 107C and 107C' and converted into appropriate binary values.

The vehicle central part unit (CU) includes both a first right side deformation determination unit RJ1, a second right side deformation determination unit RJ2, a first left side deformation determination unit LJ1 and a second left side deformation determination unit U2 which correspond to the determination means (J) of the present invention.

The first left side deformation determination unit LJ1 determines the occurrence of deformation of the left side of the vehicle body according to the on timing of the binary value signal corresponding to the high frequency components on the left side which is produced from the non-inverted input comparator 107L and the on-timing of the binary value signal corresponding to the low frequency components in the central part which is produced from the inverted input comparator 107C. The second right side deformation determination unit LJ2 determines the occurrence of deformation of the left side of the vehicle body according to the on-timing of the binary value signal corresponding to the high frequency components on the left side which is produced from the non-inverted input comparator 107L and the on-timing of the binary value signal corresponding to the wide frequency components on the right side which is produced from the inverted input comparator 107R'.

The first right side deformation determination unit RJ1 determines the occurrence of deformation of the right side of the vehicle body according to the on-timing of the binary value signal corresponding to the high frequency components on the right side which is produced from the non-inverted input comparator 107R and the on-timing of the binary value signal corresponding to the low frequency components in the central part which is produced from the inverted input comparator 107C'. The second right side deformation determination unit RJ2 determines the occurrence of deformation of the right side of the vehicle body according to the on-timing of the binary value signal corresponding to the high frequency components on the right side which is produced from the non-inverted input comparator 107R and the on-timing of the binary value signal corresponding to the low frequency components on the right side which is produced from the inverted input comparator 107L'.

The determination output of the first left side deformation determination unit LJ1 and the determination output of the second left side deformation determination unit LJ2 are connected to each other via an OR gate 108. Therefore, when deformation in a left side part of the vehicle body is determined as a result of comparison between the left side unit LU and the central part unit CU or between the left side unit LU and the right side unit RU, the determination result indicating an occurrence of deformation of a side part of the vehicle body is immediately produced to the outside.

The determination output of the first right side deformation determination unit RJ1 and the determination output of the second right side deformation determination unit RJ2 are connected to each other via an OR gate 108'. Therefore, when deformation in a right side part of the vehicle body is determined as a result of comparison between the right side unit RU and the vehicle central part unit CU or between the right side unit RU and the left side unit LU, the determination result indicating an occurrence of deformation of a side part of the vehicle body is immediately produced to the outside.

According to the vehicle side deformation determination device illustrated in FIG. 17, because the output of the acceleration sensor on the collision side is compared with the outputs of both the accelerations sensors in the central part and on the right side of the vehicle body, it is possible to improve the reliability of the determination result. Furthermore, because the low frequency components in the central part and on the opposite side of the vehicle body are used as the frequency components which are compared with the high frequency components on the collision side, the need for low pass filters are eliminated, and owing to the use of the inverted input comparator, the need for an absolute value converter is also eliminated.

A logical sum was taken with respect to the outputs from the two side deformation determination units by using the OR gates 108 and 108' in the example illustrated in FIG. 17. However, it is also possible to take a logical product with respect to outputs from the two side deformation determination units by using AND gates 108 and 108' in the example illustrated in FIG. 17.

Third Preferred Embodiment

Now is described the overall structure and the mode of operation of an embodiment of the vehicle side air bag activation control device to which is applied the device for determining an occurrence of deformation in a side part of the vehicle body according to the present invention with reference to FIGS. 19 to 24.

Figure 19:
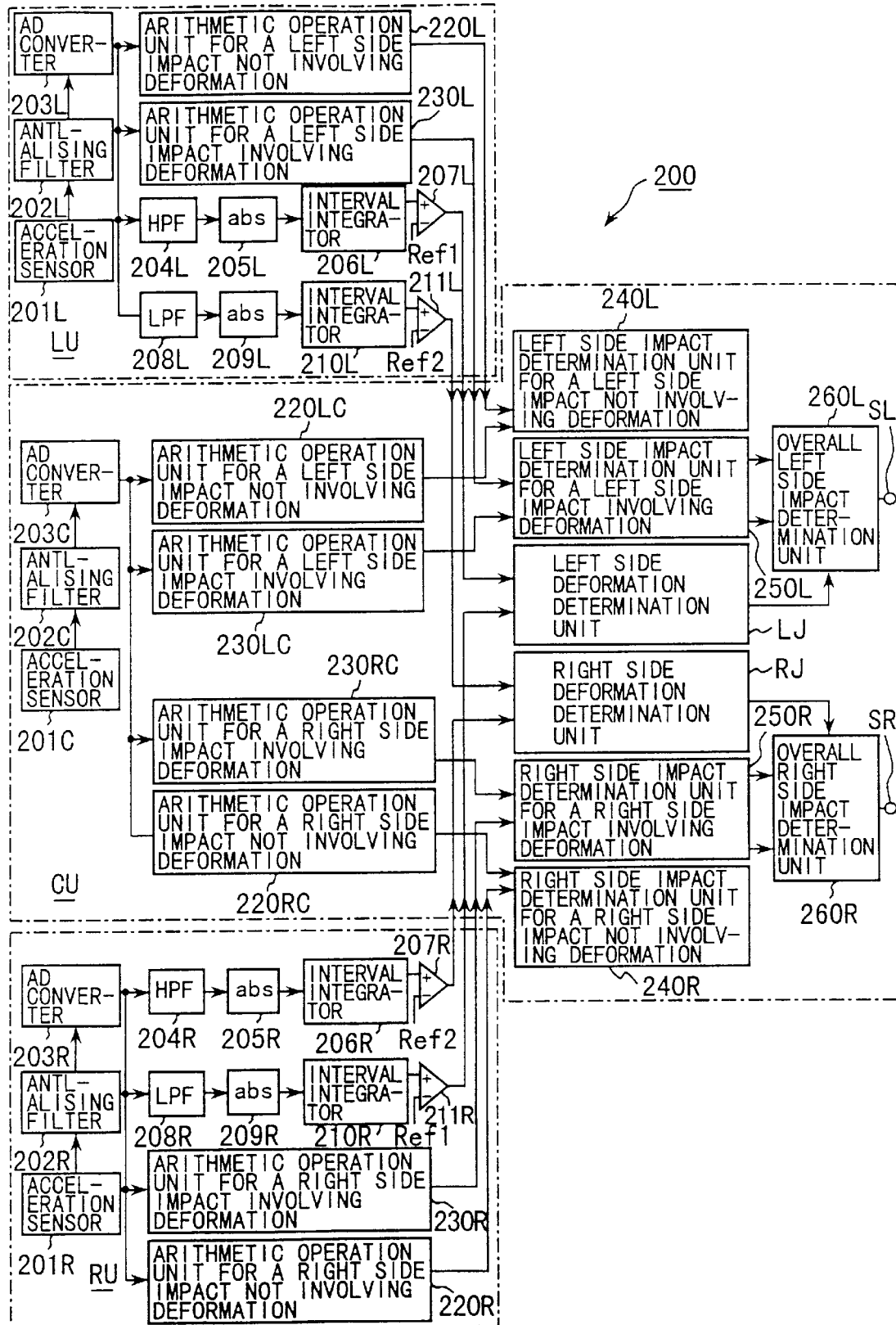
FIG. 19 is a block diagram schematically showing the entire side air bag activation control device for a vehicle according to a third embodiment of the present invention.
Figure 20:
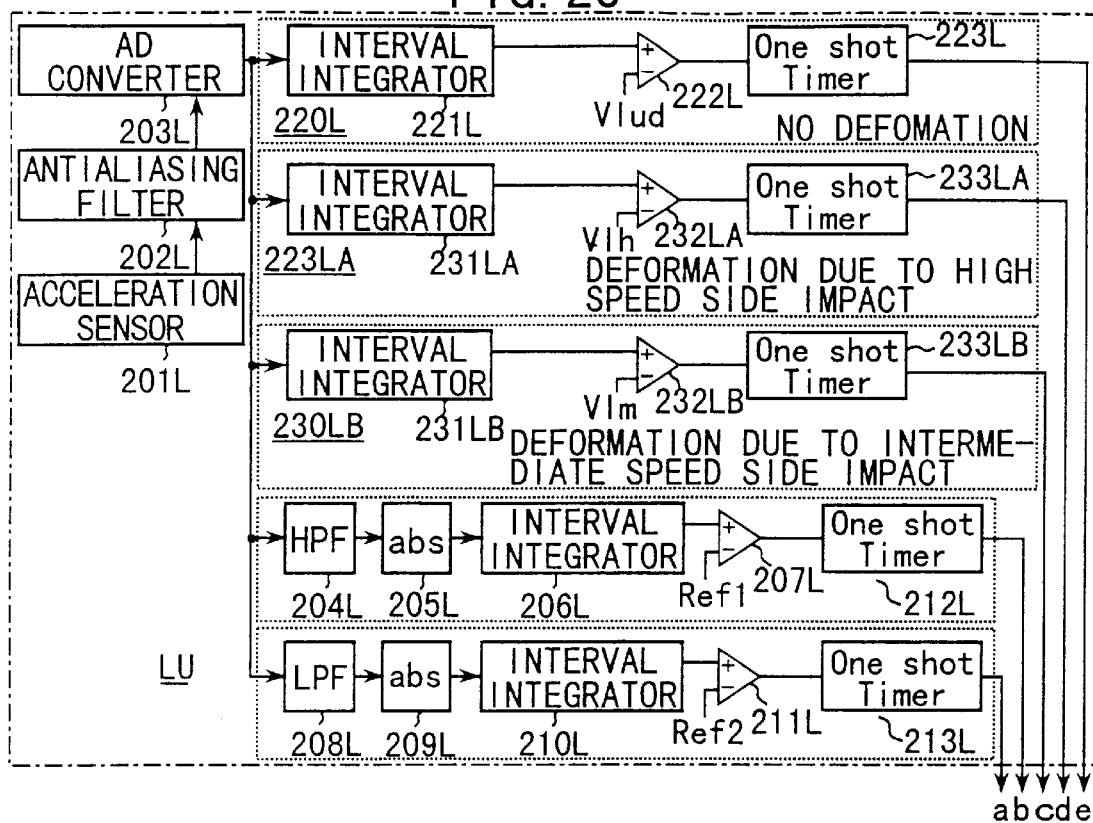
FIG. 20 is a block diagram schematically showing the details of the vehicle left side unit of the device shown in FIG. 19.

Referring to FIG. 19, the vehicle side air bag activation control device 200 comprises a vehicle right side unit (RU) which is attached to a vehicle part which moves in response to the deformation of a right side part of the vehicle body resulting from a side impact, a vehicle left side unit (LU) which is attached to a vehicle part which moves in response to the deformation of a left side part of the vehicle body resulting from a side impact, and a vehicle central part unit CU which is attached to a vehicle part which would not substantially move in response to the deformation of either the right side of the vehicle body or the left side of the vehicle body. In this case, the first acceleration detecting unit (U1) corresponds to either one of the vehicle right side unit RU and the vehicle left side unit LU which is on the collision side of the vehicle body, and the second acceleration detecting units (U2) correspond to the other of the vehicle right side unit RU and the vehicle left side unit LU which is on the opposite side of the vehicle body and the vehicle central part unit CU. The vehicle central part unit (CU) includes a right side deformation determination unit RJ and a left side deformation determination unit LJ which correspond to the determination means (J) of the present invention.

The vehicle right side unit (RU) has an identical structure to the vehicle left side unit (LU). More specifically, the vehicle left side unit (LU) comprises an acceleration sensor 201L, an antialiasing filter 202L, an AD converter 203L, a high pass filter (HPF) 204L, an absolute value converter (abs) 205L, an interval integrators 206L, a comparator 207L, a low pass filter (LPF) 208L, an absolute value converter (abs) 209L, an interval integrators 210L and a comparator 211L, while the vehicle right side unit (RU) comprises an acceleration sensor 201R, an antialiasing filter 202R, an AD converter 203R, a high pass filter (HPF) 204R, an absolute value converter (abs) 205R, an interval integrators 206R, a comparator 207R, a low pass filter (LPF) 208R, an absolute value converter (abs) 209R, an interval integrators 210R and a comparator 211R. These elements 201L to 211L, and 201R to 211R form a part of the vehicle side deformation determination device of the present invention.

The vehicle left side unit LU comprises an arithmetic operation unit 220L for a left side impact not involving deformation and an arithmetic operation unit 230L for a left side impact involving deformation. As more clearly shown in FIG. 20, the arithmetic operation unit 220L for a left side impact not involving deformation comprises an interval integrator 221L for integrating the discrete acceleration data which is forwarded from the AD converter 203L over a prescribed time interval, a comparator 222L for producing a binary signal according to a result of comparison between the result of integration by the interval integrator 221L and a prescribe threshold value (Vlud), and a one-shot timer 223L for producing a one-shot pulse in response to an edge of the output signal from the comparator 222L.

The arithmetic operation unit 230L for a left side impact involving deformation, in this case, consists of a high speed side impact determination block 230LA for a high speed side impact involving deformation, and an intermediate speed side impact determination block 230LB for an intermediate speed side impact involving deformation. The high speed side impact determination block 230LA for a high speed side impact involving deformation comprises an interval integrator 231LA for integrating the discrete acceleration data which is forwarded from the AD converter 203L over a prescribed time interval, a comparator 232LA for producing a binary signal according to a result of comparison between the result of integration by the interval integrator 231LA and a prescribe threshold value (Vlh), and a one-shot timer 233LA for producing a one-shot pulse in response to an edge of the output signal from the comparator 232LA. The intermediate speed side impact determination block 230LB for a intermediate speed side impact involving deformation comprises an interval integrator 231LB for integrating the discrete acceleration data which is forwarded from the AD converter 203L over a prescribed time interval, a comparator 232LB for producing a binary signal according to a result of comparison between the result of integration by the interval integrator 231LB and a prescribe threshold value (Vlm), and a one-shot timer 233LB for producing a one-shot pulse in response to an edge of the output signal from the comparator 232LB.

Likewise, the vehicle right side unit RU comprises an arithmetic operation unit 220R for a right side impact not involving deformation and an arithmetic operation unit 230R for a right side impact involving deformation.

Figure 21:
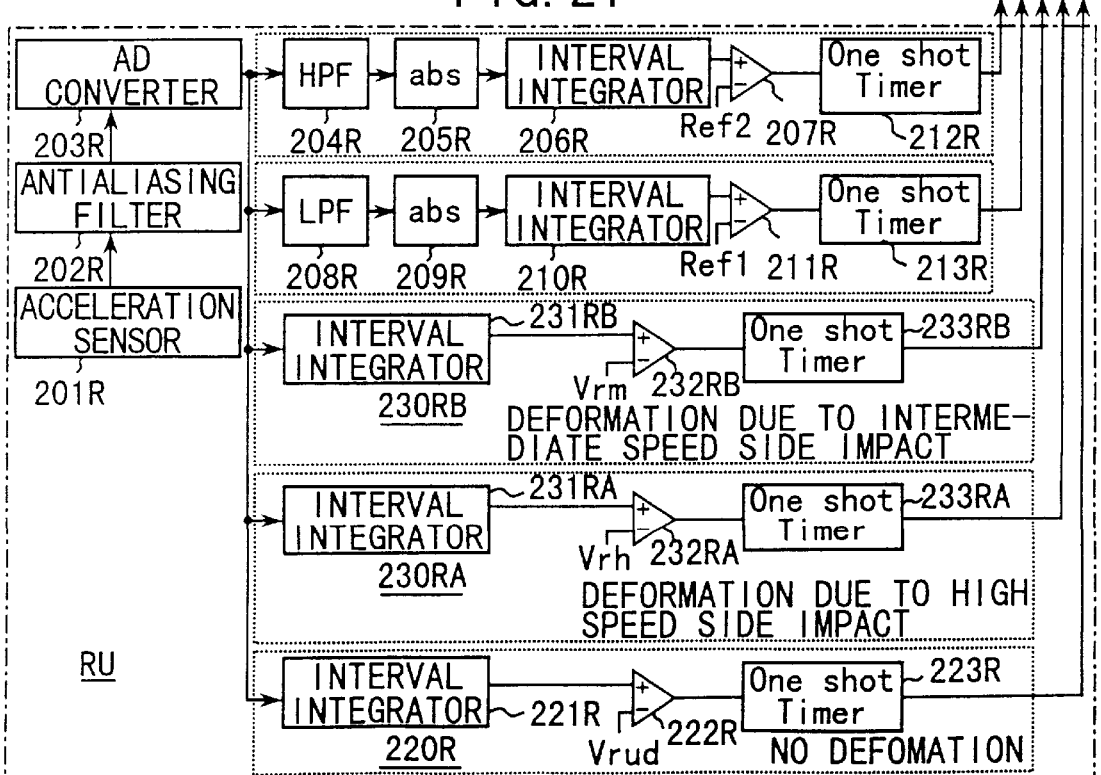
FIG. 21 is a block diagram schematically showing the details of the vehicle right side unit of the device shown in FIG. 19.

Referring to FIG. 21, the arithmetic operation unit 220R for a right side impact not involving deformation comprises an interval integrator 221R for integrating the discrete acceleration data which is forwarded from the AD converter 203R over a prescribed time interval, a comparator 222R for producing a binary signal according to a result of comparison between the result of integration by the interval integrator 221R and a prescribe threshold value (Vrud), and a one-shot timer 223R for producing a one-shot pulse in response to an edge of the output signal from the comparator 222R.

The arithmetic operation unit 230R for a right side impact involving deformation, in this case, consists of a high speed side impact determination block 230RA for a high speed side impact involving deformation, and an intermediate speed side impact determination block 230RB for an intermediate speed side impact involving deformation. The high speed side impact determination block 230RA for a high speed side impact involving deformation comprises an interval integrator 231RA for integrating the discrete acceleration data which is forwarded from the AD converter 203R over a prescribed time interval, a comparator 232RA for producing a binary signal according to a result of comparison between the result of integration by the interval integrator 231RA and a prescribe threshold value (Vch), and a one-shot timer 233RA for producing a one-shot pulse in response to an edge of the output signal from the comparator 232RA. The intermediate speed side impact determination block 230RB for a intermediate speed side impact involving deformation comprises an interval integrator 231RB for integrating the discrete acceleration data which is forwarded from the AD converter 203R over a prescribed time interval, a comparator 232RB for producing a binary signal according to a result of comparison between the result of integration by the interval integrator 231RB and a prescribe threshold value (Vcm), and a one-shot timer 233RB for producing a one-shot pulse in response to an edge of the output signal from the comparator 232RB.

The vehicle central part unit CU comprises an arithmetic operation unit 220LC for a left side impact not involving deformation, an arithmetic operation unit 230LC for a left side impact involving deformation, an arithmetic operation unit 220RC for a right side impact not involving deformation and an arithmetic operation unit 230RC for a right side impact involving deformation.

Figure 22:
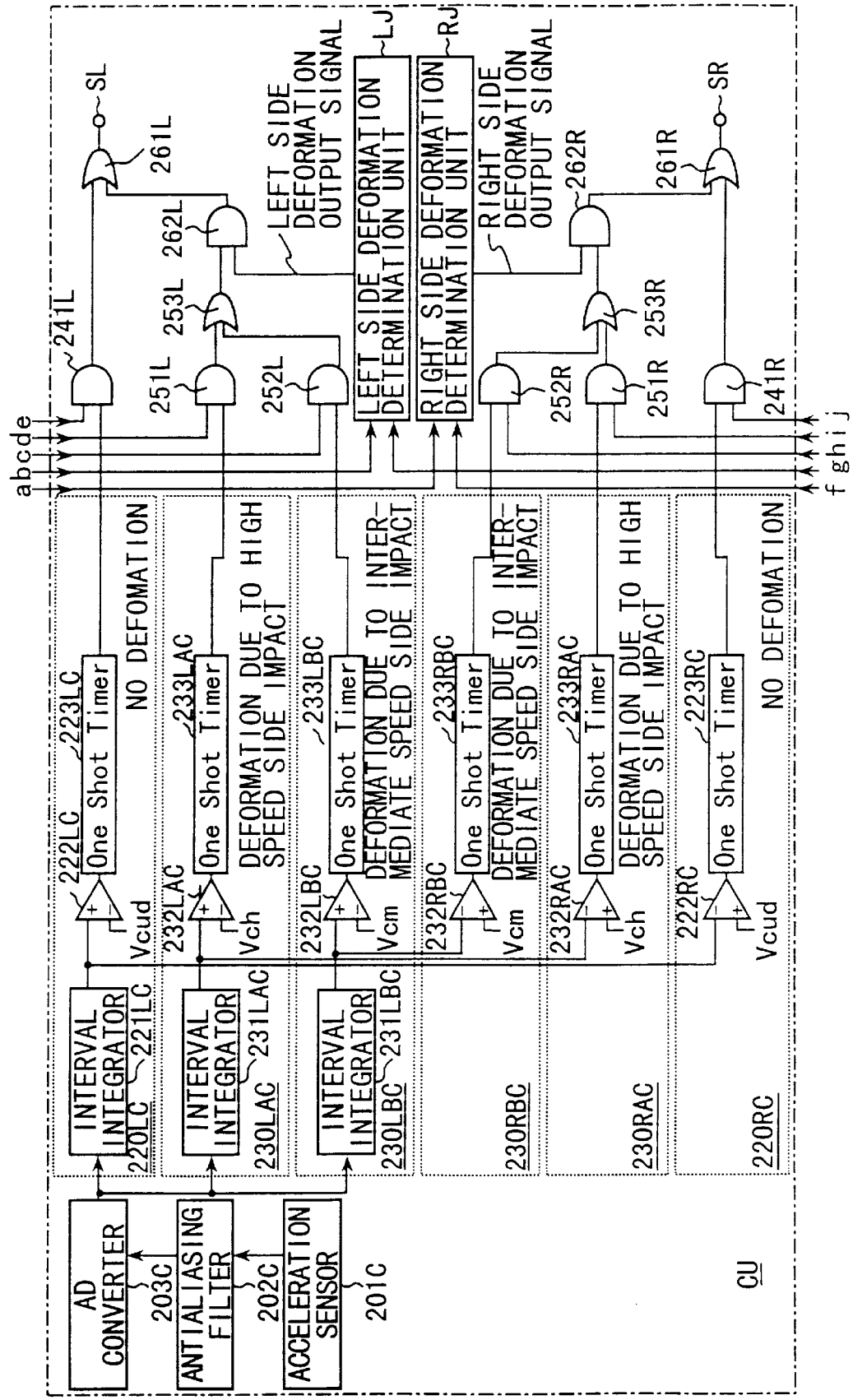
FIG. 22 is a block diagram schematically showing the details of the vehicle central part unit of the device shown in FIG. 19.

Referring to FIG. 22, the arithmetic operation unit 220LC for a right side impact not involving deformation comprises an interval integrator 221LC for integrating the discrete acceleration data which is forwarded from the AD converter 203C over a prescribed time interval, a comparator 222LC for producing a binary signal according to a result of comparison between the result of integration by the interval integrator 221LC and a prescribe threshold value (Vcud), and a one-shot timer 223LC for producing a one-shot pulse in response to an edge of the output signal from the comparator 222LC.

The arithmetic operation unit 230LC for a left side impact involving deformation, in this case, consists of a high speed side impact determination block 230LAC for a high speed side impact involving deformation, and an intermediate speed side impact determination block 230LBC for an intermediate speed side impact involving deformation. The high speed side impact determination block 230LAC for a high speed side impact involving deformation comprises an interval integrator 231LAC for integrating the discrete acceleration data which is forwarded from the AD converter 203C over a prescribed time interval, a comparator 232LAC for producing a binary signal according to a result of comparison between the result of integration by the interval integrator 231LAC and a prescribe threshold value (Vch), and a one-shot timer 233LAC for producing a one-shot pulse in response to an edge of the output signal from the comparator 232LAC. The intermediate speed side impact determination block 230LBC for a intermediate speed side impact involving deformation comprises an interval integrator 231LBC for integrating the discrete acceleration data which is forwarded from the AD converter 203C over a prescribed time interval, a comparator 232LBC for producing a binary signal according to a result of comparison between the result of integration by the interval integrator 231LBC and a prescribe threshold value (Vcm), and a one-shot timer 233LBC for producing a one-shot pulse in response to an edge of the output signal from the comparator 232LBC.

The arithmetic operation unit 220RC for a right side impact not involving deformation comprises a comparator 222RC for producing a binary signal according to a result of comparison between the result of integration by the interval integrator 221LC and a prescribe threshold value (−Vcud), and a one-shot timer 223RC for producing a one-shot pulse in response to an edge of the output signal from the comparator 222RC.

The arithmetic operation unit 230RC for a right side impact involving deformation, in this case, consists of a high speed side impact determination block 230RAC for a high speed side impact involving deformation, and an intermediate speed side impact determination block 230RBC for an intermediate speed side impact involving deformation. The high speed side impact determination block 230RAC for a high speed side impact involving deformation comprises a comparator 232RAC for producing a binary signal according to a result of comparison between the result of integration by the interval integrator 231LAC and a prescribe threshold value (−Vch), and a one-shot timer 233RAC for producing a one-shot pulse in response to an edge of the output signal from the comparator 232RAC. The intermediate speed side impact determination block 230RBC for a high speed side impact involving deformation comprises a comparator 232RBC for producing a binary signal according to a result of comparison between the result of integration by the interval integrator 231LBC and a prescribe threshold value (−Vcm), and a oneshot timer 233RBC for producing a one-shot pulse in response to an edge of the output signal from the comparator 232RBC.

The vehicle central part unit CU comprises a left side impact determination unit 240L for a left side impact not involving deformation, a left side impact determination unit 250L for a left side impact involving deformation, a right side impact determination unit 240RC for a right side impact not involving deformation and a right side impact determination unit 250RC for a right side impact involving deformation, a left side deformation determining unit LJ, a right side deformation determining unit RJ, an overall left side impact determination unit 260L, and an overall right side impact determination unit 260R.

The left side impact determination unit 240L for a left side impact not involving deformation determines if there is a possibility of the vehicle occupant receiving an injury even when there is substantially no deformation on the left side of the vehicle body according to the signals from the arithmetic operation unit 220L for a left side impact not involving deformation incorporated in the vehicle left side unit LU and the arithmetic operation unit 220LC for a left side impact not involving deformation incorporated in the vehicle central part unit CU. As shown in FIG. 22, the function of the left side impact determination unit 240L for a left side impact not involving deformation may be implemented by using an AND gate 241L.

The left side impact determination unit 250L for a left side impact involving deformation determines if there is a possibility of the vehicle occupant receiving an injury when the left side of the vehicle body is deformed by a high speed side impact according to the signals from the arithmetic operation unit 230LA for a high speed impact involving deformation incorporated in the vehicle left side unit LU and the arithmetic operation unit 230LAC for a left side high speed impact involving deformation incorporated in the vehicle central part unit CU. At the same time, the left side impact determination unit 250L for a left side impact involving deformation determines if there is a possibility of the vehicle occupant receiving an injury when the left side of the vehicle body is deformed by an intermediate speed side impact according to the signals from the arithmetic operation unit 230LB for an intermediate speed impact involving deformation incorporated in the vehicle left side unit LU and the arithmetic operation unit 230LBC for a left side intermediate speed impact involving deformation incorporated in the vehicle central part unit CU. As shown in FIG. 22, the function of the left side impact determination unit 250L for a left side impact involving deformation may be implemented by using a pair of AND gates 251L and 252L and an OR gate 253L.

The right side impact determination unit 240R for a right side impact not involving deformation determines if there is a possibility of the vehicle occupant receiving an injury even when there is substantially no deformation on the right side of the vehicle body according to the signals from the arithmetic operation unit 220R for a right side impact not involving deformation incorporated in the vehicle right side unit RU and the arithmetic operation unit 220RC for a right side impact not involving deformation incorporated in the vehicle central part unit CU. As shown in FIG. 22, the function of the right side impact determination unit 240R for a right side impact not involving deformation may be implemented by using an AND gate 241R.

The right side impact determination unit 250R for a right side impact involving deformation determines if there is a possibility of the vehicle occupant receiving an injury when the right side of the vehicle body is deformed by a high speed side impact according to the signals from the arithmetic operation unit 230RA for a high speed impact involving deformation incorporated in the vehicle right side unit RU and the arithmetic operation unit 230RAC for a right side high speed impact involving deformation incorporated in the vehicle central part unit CU. At the same time, the right side impact determination unit 250R for a right side impact involving deformation determines if there is a possibility of the vehicle occupant receiving an injury when the right side of the vehicle body is deformed by an intermediate speed side impact according to the signals from the arithmetic operation unit 230RB for an intermediate speed impact involving deformation incorporated in the vehicle right side unit RU and the arithmetic operation unit 230RBC for a right side intermediate speed impact involving deformation incorporated in the vehicle central part unit CU. As shown in FIG. 22, the function of the right side impact determination unit 250R for a right side impact involving deformation may be implemented by using a pair of AND gates 251R and 252R and an OR gate 253R.

The left side deformation determination unit LJ determines the occurrence of deformation of the left side of the vehicle body according to the on-timing of the binary value signal corresponding to the high frequency components on the left side which is produced from the comparator 207L incorporated in the vehicle left side unit LU, and the on-timing of the binary value signal corresponding to the low frequency components on the right side which is produced from the comparator 211R incorporated in the vehicle right side unit RU. If the on-timing for the high frequency components is earlier than that for the low frequency components, it can be concluded that deformation has been produced on the left side of the vehicle body. If the on-timing for the low frequency components is earlier than that for the high frequency components, it can be concluded that deformation has not been produced on the left side of the vehicle body.

The right side deformation determination unit RJ determines the occurrence of deformation of the right side of the vehicle body according to the on-timing of the binary value signal corresponding to the high frequency components on the right side which is produced from the comparator 207R incorporated in the vehicle right side unit RU, and the on-timing of the binary value signal corresponding to the low frequency components on the right side which is produced from the comparator 211L incorporated in the vehicle left side unit LU. If the on-timing for the high frequency components is earlier than that for the low frequency components, it can be concluded that deformation has been produced on the right side of the vehicle body. If the on-timing for the low frequency components is earlier than that for the high frequency components, it can be concluded that deformation has not been produced on the right side of the vehicle body.

Figure 23:
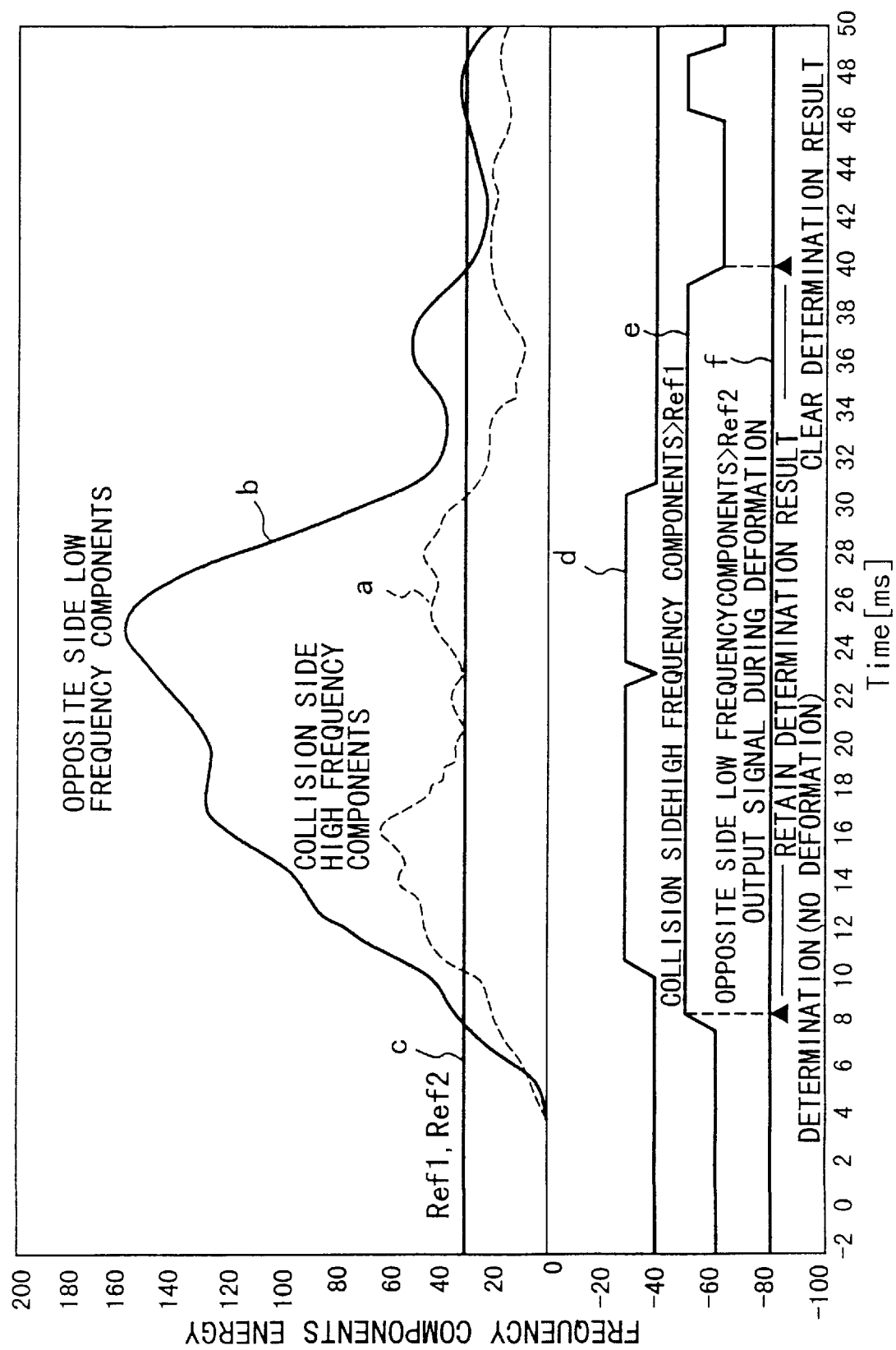
FIG. 23 is a time chart showing the operation of the device for determining vehicle deformation shown in FIG. 19 when no deformation has occurred.
Figure 24:
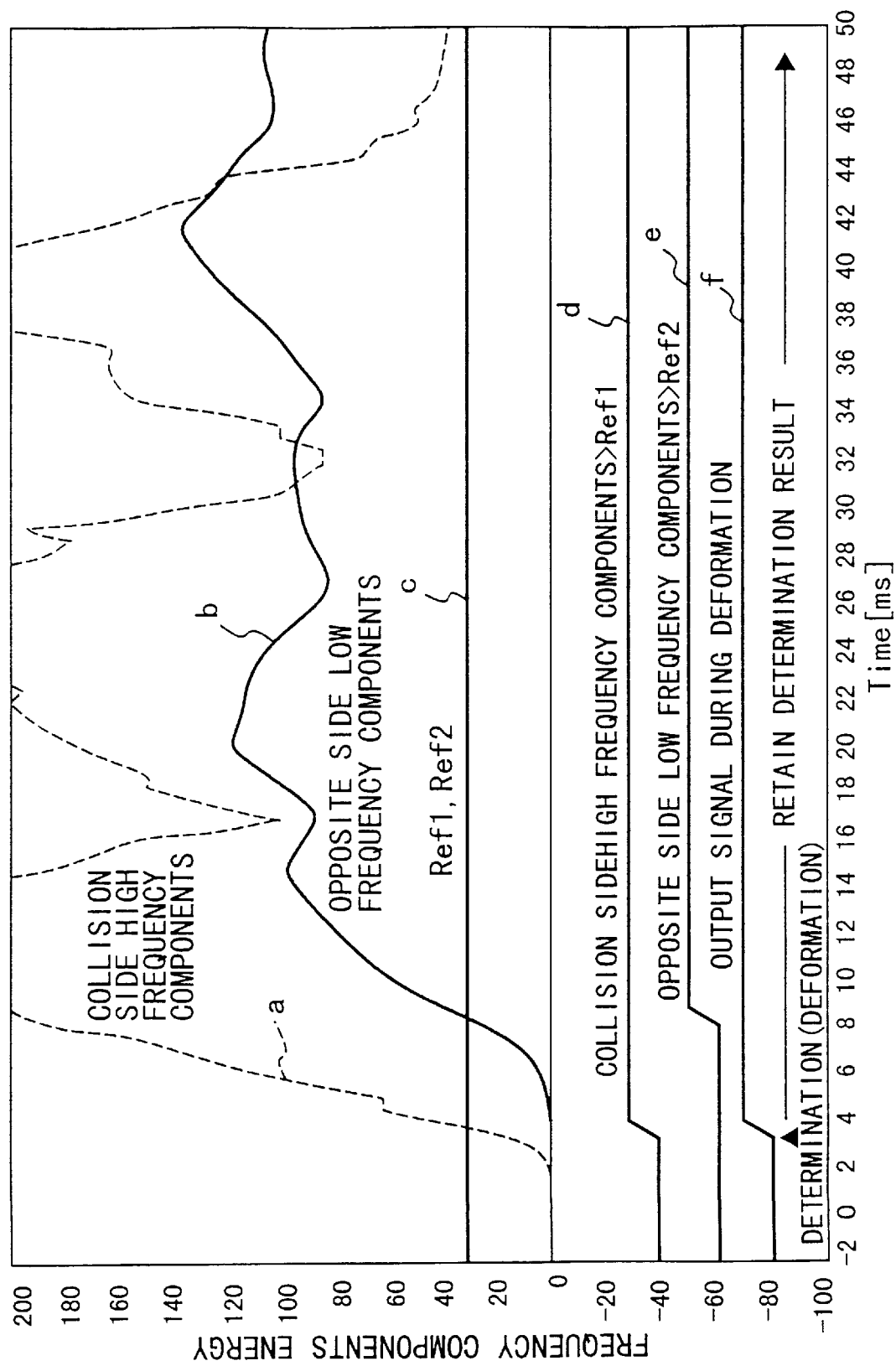
FIG. 24 is a time chart showing the operation of the device for determining vehicle deformation shown in FIG. 19 when deformation has occurred.

The mode of operation of the side deformation determination units (LJ or RJ) shown in FIGS. 19 and 22 is described in FIGS. 23 and 24. FIG. 23 shows the case where the vehicle only travels substantially without any deformation, and FIG. 24 shows the case where a side part of the vehicle body has deformed, and the vehicle occupant could be injured. In the drawings, curve a indicates the high frequency components energy on the collision side, curve b indicates the low frequency components energy on the opposite side, line c indicates the magnitude of the threshold value Ref1 (=Ref2), curve d indicates the output of the comparator on the collision side, curve e indicates the output of the comparator on the opposite side, and curve f indicates the output of the side deformation determination unit (LJ or RJ).

As can be appreciated from FIG. 23, when the acceleration signals on the collision side and the opposite side are due to only the travel of the vehicle body without involving any substantial deformation, the low frequency components energy on the opposite side represented by the curve b exceeds the line c representing the threshold value Ref1 (=Ref2) before the high frequency components energy on the collision side represented by the curve a does. Thus, the output of the comparator on the opposite side represented by the curve e turns on before the output of the comparator on the collision side represented by the curve d turns on so that the output of the side deformation determination unit is maintained in the state of "no deformation" which is an initial condition thereof.

As can be appreciated from FIG. 24, when the acceleration signals on the collision side and the opposite side are due to deformation of a vehicle side part, the high frequency components energy on the collision side represented by the curve a exceeds the line c representing the threshold value Ref1 (=Ref2) before the low frequency components energy on the opposite side represented by the curve b does. Thus, the output of the comparator on the collision side represented by the curve d turns on before the output of the comparator on the opposite side represented by the curve e turns on so that the output of the side deformation determination unit is changes from the state of "no deformation" which is an initial condition thereof to "deformation" in response to this on-timing. As shown in FIG. 24, the output of the side deformation determination unit represented by curve f automatically returns from the state of "deformation" to "no deformation" after the high frequency components and low frequency components energy represented by the curves a and b both drop below the threshold value represented by the line c.

The overall left side impact determination unit 260L produces either the determination result of the left side impact determination unit 240L for a left side impact not involving deformation and the determination result of the left side impact determination unit 250L for a left side impact involving deformation according to the determination result of the left side deformation determination unit LJ as an activation signal SL for the left side air bag. As shown in FIG. 22, the function of the overall left side impact determination unit 260L can be implemented by using an OR gate 261L and an AND gate 262L.

The overall right side impact determination unit 260R produces either the determination result of the right side impact determination unit 240R for a right side impact not involving deformation and the determination result of the right side impact determination unit 250R for a right side impact involving deformation according to the determination result of the right side deformation determination unit RJ as an activation signal SR for the right side air bag. As shown in FIG. 21, the function of the overall right side impact determination unit 260R can be implemented by using an OR gate 261R and an AND gate 262R.

As can be appreciated from the above description, according to the present invention, it is possible to accurately determine if deformation of a vehicle side part has occurred or not as a result of a side impact even though the used data consists of outputs of acceleration sensors for detecting accelerations given as combinations of deformation of a vehicle side part and a travel of the vehicle body.

Therefore, by using such determination results, in a side air bag activation control device, it is possible to prevent unnecessary activation of a side air bag system even when the result of interval integration of the acceleration has risen relatively sharply because of incidences which would not affect the vehicle occupants such as a low speed collision with a curbstone and a low speed offset side collision, by taking into account the determination result that there is no substantial deformation of a vehicle side part.

In case of a side impact which could injure the vehicle occupant even through there is no substantial deformation of a vehicle side part, such as an intermediate to high speed side collision and an intermediate to high speed offset side collision, by applying a determination standard for cases not involving deformation of a vehicle side part, it is possible to activate the side air bag without fail so that the vehicle occupant may be prevented from being thrown onto the inner side of the door by inertia, and is thereby protected from being injured.

Although the present invention has been described in terms of preferred embodiments thereof, it is obvious to a person skilled in the art that various alterations and modifications are possible without departing from the scope of the present invention which is set forth in the appended claims.

We claim:

1. A method for determining deformation of a side part of a vehicle body, comprising the steps of:
    detecting an acceleration produced in a part of the vehicle body which moves in response to a deformation of the vehicle side part resulting from a side impact;
    analyzing frequency components included in a time change of the detected acceleration over a prescribed preceding time period; and
    determining deformation of a vehicle side part resulting from a side impact according to the frequency components obtained in the analyzing step.

2. A method for determining deformation of a side part of a vehicle body according to claim 1, wherein the step of determining deformation of a vehicle side part is based on an application of a prescribed determination logic to the frequency components obtained in the analyzing step.

3. A method for determining deformation of a side part of a vehicle body according to claim 2, wherein the determination logic is adapted to allow determination of deformation of a vehicle side part by comparing a high frequency component with a reference value.

4. A method for determining deformation of a side part of a vehicle body according to claim 2, wherein the determination logic is adapted to allow determination of deformation of a vehicle side part by comparing a high frequency component with a low frequency component or a wide frequency range including a low frequency component.

5. A method for determining deformation of a side part of a vehicle body, comprising the steps of:
    detecting an acceleration produced in a first part of the vehicle body which moves in response to a deformation of the vehicle side part resulting from a side impact;
    detecting an acceleration produced in a second part of the vehicle body which does not substantially move in response to a deformation of the vehicle side part resulting from the side impact;
    analyzing a frequency component included in a time change of the detected acceleration of the first vehicle body part over a prescribed preceding time period;
    analyzing a frequency component included in a time change of the detected acceleration of the second vehicle body part over a prescribed preceding time period; and
    determining deformation of a vehicle side part resulting from a side impact according to the frequency components obtained in the two analyzing steps.

6. A method for determining deformation of a side part of a vehicle body according to claim 5, wherein the second vehicle body part consists of a vehicle body part adjacent to a central longitudinal line extending in a fore-and-aft direction of the vehicle body.

7. A method for determining deformation of a side part of a vehicle body according to claim 5, wherein the second vehicle body part consists of a vehicle body part symmetric to the first body part with respect to a central longitudinal line extending in a fore-and-aft direction of the vehicle body.

8. A method for determining deformation of a side part of a vehicle body according to claim 5, wherein the second vehicle body part consists of a vehicle body part adjacent to a central longitudinal line extending in a fore-and-aft direction of the vehicle body and a vehicle body part symmetric to the first body part with respect to the central longitudinal line extending in a fore-and-aft direction of the vehicle body.

9. A method for determining deformation of a side part of a vehicle body according to any one of claims 5 to 8, wherein the step of determining deformation of a vehicle side part is based on an application of a prescribed determination logic to the frequency component obtained by analyzing an acceleration produced in the first vehicle body part and the frequency component obtained by analyzing an acceleration produced in the second vehicle body part.

10. A method for determining deformation of a side part of a vehicle body according to claim 9, wherein the determination logic is adapted to allow determination of deformation of a vehicle side part by comparing a high frequency component of the first vehicle body part with a low frequency component or a wide frequency range including a low frequency component of the second vehicle body part.

11. A method for determining deformation of a side part of a vehicle body according to claim 9, wherein the determination logic is adapted to allow determination of deformation of a vehicle side part by comparing a low frequency component or frequency components of a wide frequency range including a low frequency component of the first vehicle body part with a low frequency component or frequency components of a wide frequency range including a low frequency component of the second vehicle body part.

12. A method for determining deformation of a side part of a vehicle body according to claim 9, wherein the determination logic is adapted to allow determination of deformation of a vehicle side part by comparing a high frequency component of the first vehicle body part with a high frequency component of the second vehicle body part.

13. A method for determining deformation of a side part of a vehicle body according to any one of claims 1 to 8, wherein the step of analyzing a frequency component included in a time change of the detected acceleration of the vehicle body part over a prescribed preceding time period comprises the steps of extracting a desired frequency component by filtering the acceleration detected at the vehicle body part, and integrating the value of the acceleration or the absolute value thereof over a prescribed interval.

14. A device for determining deformation of a side part of a vehicle body, comprising:
    means for detecting an acceleration produced in a part of the vehicle body which moves in response to a deformation of the vehicle side part resulting from a side impact;
    means for analyzing a frequency component included in a time change of the detected acceleration over a prescribed preceding time period; and
    means for determining deformation of a vehicle side part resulting from the side impact according to the frequency components obtained in the analyzing step.

15. A device for determining deformation of a side part of a vehicle body according to claim 14, wherein the deformation of the vehicle side part is determined by an application of a prescribed determination logic to the frequency component obtained by the analyzing means.

16. A device for determining deformation of a side part of a vehicle body according to claim 15, wherein the determination logic is adapted to allow determination of deformation of a vehicle side part by comparing a high frequency component with a reference value.

17. A device for determining deformation of a side part of a vehicle body according to claim 15, wherein the determination logic is adapted to allow determination of deformation of a vehicle side part by comparing a high frequency component with a low frequency component or frequency components of a wide frequency range including a low frequency component.

18. A device for determining deformation of a side part of a vehicle body, comprising:
- means for detecting an acceleration produced in a first part of the vehicle body which moves in response to a deformation of the vehicle side part resulting from a side impact;
- means for detecting an acceleration produced in a second part of the vehicle body which does not substantially move in response to a deformation of the vehicle side part resulting from a side impact;
- means for analyzing a frequency component included in a time change of the detected acceleration of the first vehicle body part over a prescribed preceding time period;
- means for analyzing a frequency component included in a time change of the detected acceleration of the second vehicle body part over a prescribed preceding time period; and
- means for determining deformation of a vehicle side part resulting from the side impact according to the frequency components obtained by the two analyzing means.

19. A device for determining deformation of a side part of a vehicle body according to claim 18, wherein the second vehicle body part consists of a vehicle body part adjacent to a central longitudinal line extending in a fore-and-aft direction of the vehicle body.

20. A device for determining deformation of a side part of a vehicle body according to claim 18, wherein the second vehicle body part consists of a vehicle body part symmetric to the first body part with respect to a central longitudinal line extending in a fore-and-aft direction of the vehicle body.

21. A device for determining deformation of a side part of a vehicle body according to claim 18, wherein the second vehicle body part consists of a vehicle body part adjacent to a central longitudinal line extending in a fore-and-aft direction of the vehicle body and a vehicle body part symmetric to the first body part with respect to the central longitudinal line extending in the fore-and-aft direction of the vehicle body.

22. A device for determining deformation of a side part of a vehicle body according to any one of claims 18 to 21, wherein the deformation of a vehicle side part is determined by an application of a prescribed determination logic to the frequency components obtained by analyzing an acceleration produced in the first vehicle body part and the frequency components obtained by analyzing an acceleration produced in the second vehicle body part.

23. A device for determining deformation of a side part of a vehicle body according to claim 22, wherein the determination logic is adapted to allow determination of deformation of a vehicle side part by comparing a high frequency component of the first vehicle body part with a low frequency component or frequency components of a wide frequency range including a low frequency component of the second vehicle body part.

24. A device for determining deformation of a side part of a vehicle body according to claim 22, wherein the determination logic is adapted to allow determination of deformation of a vehicle side part by comparing a low frequency component or frequency components of a wide frequency range including a low frequency component of the first vehicle body part with a low frequency component or frequency components of a wide frequency range including a low frequency component of the second vehicle body part.

25. A device for determining deformation of a side part of a vehicle body according to claim 22, wherein the determination logic is adapted to allow determination of deformation of a vehicle side part by comparing a high frequency component of the first vehicle body part with a high frequency component of the second vehicle body part.

26. A device for determining deformation of a side part of a vehicle body according to any one of claims 14 to 21, wherein the means for analyzing frequency components included in a time change of the detected acceleration of the vehicle body part over a prescribed preceding time period is adapted to extract a desired frequency component by filtering the acceleration detected at the vehicle body part, and integrate the value of the acceleration or the absolute value thereof over a prescribed interval.

27. A device for determining deformation of a side part of a vehicle body, comprising:
- an acceleration detecting unit which is mounted to a part of the vehicle body which moves in response to a deformation of the vehicle side part resulting from a side impact, said acceleration detecting unit including an acceleration sensor, and binary conversion means for producing a binary signal depending on a result of comparison of a prescribed frequency component included in a time change of an output signal from the acceleration sensor over a prescribed preceding time period with a prescribed threshold value; and
- means for determining deformation of a vehicle side part resulting from a side impact according to the binary sianal produced from the binary conversion means incorporated in the acceleration detecting unit.

28. A device for determining deformation of a side part of a vehicle body according to claim 27, wherein the deformation determining means is incorporated in the acceleration detecting unit.

29. A device for determining deformation of a side part of a vehicle body according to claim 27, further comprising a second acceleration detecting unit which is mounted to a part of the vehicle body which does not substantially move in response to a deformation of the vehicle side part, the deformation determining means being incorporated in the second acceleration detecting unit.

30. A device for determining deformation of a side part of a vehicle body according to any one of claims 27 to 29, wherein the deformation determining means is adapted to determine deformation of a vehicle side part by comparing an ON timing of the binary signal of the prescribed frequency component included in a time change of the output signal from the acceleration sensor over a prescribed preceding time period with a prescribed reference timing.

31. A device for determining deformation of a side part of a vehicle body according to any one of claims 27 to 29, wherein the deformation determining means is adapted to determine deformation of a vehicle side part by comparing an ON timing of the binary signal of the high frequency component included in a time change of the output signal from the acceleration sensor over a prescribed preceding time period with an ON timing of the binary signal of a low frequency component or a wide frequency range including a low frequency component included in a time change of the output signal from the acceleration sensor over a prescribed preceding time period.

32. A device for determining deformation of a side part of a vehicle body, comprising:
- a first acceleration detecting unit which is mounted to a part of the vehicle body which moves in response to a deformation of the vehicle side part resulting from a side impact, said first acceleration detecting unit including an acceleration sensor, and binary conversion means for producing a binary signal depending on a result of comparison of a prescribed frequency component included in a time change of an output signal from the acceleration sensor over a prescribed preceding time period with a prescribed threshold value;
- a second acceleration detecting unit which is mounted to a part of the vehicle body which does not substantially move in response to a deformation of the vehicle side part resulting from a side impact, said second acceleration detecting unit including an acceleration sensor, and binary conversion means for producing a binary signal depending on a result of comparison of a prescribed frequency component included in a time change of an output signal from the acceleration sensor over a prescribed preceding time period with a prescribed threshold value; and
- means for determining deformation of a vehicle side part resulting from a side impact according to a comparison of the binary signal produced from the binary conversion means incorporated in the first acceleration detecting unit with the binary signal produced from the binary conversion means incorporated in the second acceleration detecting unit.

33. A device for determining deformation of a side part of a vehicle body according to claim 32, comprising a right hand side unit mounted to a vehicle body part which moves in response to a deformation of a right side part of the vehicle body part resulting from a right side impact, a left hand side unit mounted to a vehicle body part which moves in response to a deformation of a left side part of the vehicle body part resulting from a left side impact, and a middle part unit mounted to a vehicle body which would not substantially deform in response to a deformation of a left or right part of the vehicle body;
- wherein the first acceleration detecting unit consists of one of the right hand side unit and the left hand side unit which receives a side impact, and the second acceleration detecting unit consists of the middle part unit.

34. A device for determining deformation of a side part of a vehicle body according to claim 32, comprising a right hand side unit mounted to a vehicle body part which moves in response to a deformation of a right side part of the vehicle body part resulting from a right side impact, and a left hand side unit mounted to a vehicle body part which moves in response to a deformation of a left side part of the vehicle body part resulting from a left side impact;
- wherein the first acceleration detecting unit consists of one of the right hand side unit and the left hand side unit which receives a side impact, and the second acceleration detecting unit consists of the other one of the right hand side unit and the left hand side unit which does not receive a side impact.

35. A device for determining deformation of a side part of a vehicle body according to claim 33 or 34, wherein the deformation determining means is incorporated in the first acceleration detecting unit and/or the second acceleration detecting unit.

36. A device for determining deformation of a side part of a vehicle body according to claim 32, comprising a right hand side unit mounted to a vehicle body part which moves in response to a deformation of a right side part of the vehicle body part resulting from a right side impact, a left hand side unit mounted to a vehicle body part which moves in response to a deformation of a left side part of the vehicle body part resulting from a left side impact, and a middle part unit mounted to a vehicle body which would not substantially deform in response to a deformation of a left or right part of the vehicle body;
- wherein the first acceleration detecting unit consists of one of the right hand side unit and the left hand side unit which receives a side impact, and the second acceleration detecting unit consists of the other one of the right hand side unit and the left hand side unit which does not receive a side impact;
the deformation determining means being incorporated in the middle part unit.

37. A device for determining deformation of a side part of a vehicle body, comprising:
- a first acceleration detecting unit which is mounted to a part of the vehicle body which moves in response to a deformation of the vehicle side part resulting from a side impact, said first acceleration detecting unit including an acceleration sensor, and binary conversion means for producing a binary signal depending on a result of comparison of a prescribed frequency component included in a time change of an output signal from the acceleration sensor over a prescribed preceding time period with a prescribed threshold value;
- a plurality of second acceleration detecting units which are each mounted to a part of the vehicle body which does not substantially move in response to a deformation of the vehicle side part resulting from a side impact, each of said plurality of second acceleration detecting units including an acceleration sensor, and binary conversion means for producing a binary signal depending on a result of comparison of a prescribed frequency component included in a time change of an output signal from the acceleration sensor over a prescribed preceding time period with a prescribed threshold value; and
- means for determining deformation of a vehicle side part resulting from a side impact according to the binary signal produced from the binary conversion means incorporated in the first acceleration detecting unit and the binary signals produced from the binary conversion means incorporated in the plurality of second acceleration detecting units.

38. A device for determining deformation of a side part of a vehicle body according to claim 37, comprising a right hand side unit mounted to a vehicle body part which moves in response to a deformation of a right side part of the vehicle body part resulting from a right side impact, a left hand side unit mounted to a vehicle body part which moves in response to a deformation of a left side part of the vehicle body part resulting from a left side impact, and a middle part unit mounted to a vehicle body which would not substantially deform in response to a deformation of a left or right part of the vehicle body;
- wherein the first acceleration detecting unit consists of one of the right hand side unit and the left hand side unit which receives a side impact, and the second acceleration detecting unit consists of the other one of the right hand side unit and the left hand side unit and the middle part unit.

39. A device for determining deformation of a side part of a vehicle body according to any of claims 32 to 34, or 36 to 38 wherein the deformation determining means is adapted to determine deformation of a vehicle side part by comparing an ON timing of the binary signal of a high frequency component included in a time change of the output signal from the acceleration sensor incorporated the first acceleration detecting unit over a prescribed preceding time period with an ON timing of the binary signal of a low frequency component or a wide frequency range including a low frequency component included in a time change of the output signal from the acceleration sensor incorporated in the second acceleration detecting unit over a prescribed preceding time period.

40. A device for determining deformation of a side part of a vehicle body according to any of claims 32 to 34, or 36 to 38 wherein the deformation determining means is adapted to determine deformation of a vehicle side part by comparing an ON timing of the binary signal of a low frequency component or a wide frequency range including a low frequency component included in a time change of the output signal from the acceleration sensor incorporated the first acceleration detecting unit over a prescribed preceding time period with an ON timing of the binary signal of a low frequency component or a wide frequency range including a low frequency component included in a time change of the output signal from the acceleration sensor incorporated in the second acceleration detecting unit over a prescribed preceding time period.

41. A device for determining deformation of a side part of a vehicle body according to any of claims 32 to 34, or 36 to 38 wherein the deformation determining means is adapted to determine deformation of a vehicle side part by comparing an ON timing of the binary signal of a high frequency component included in a time change of the output signal from the acceleration sensor incorporated the first acceleration detecting unit over a prescribed preceding time period with an ON timing of the binary signal of a high frequency component included in a time change of the output signal from the acceleration sensor incorporated the second acceleration detecting unit over a prescribed preceding time period.

42. A control device for activating a side protective device for a vehicle occupant, comprising:

a first crash determination system which is adapted to be applied at least when a deformation has been produced in a side part of a vehicle body; a second crash determination system which is adapted to be applied when no deformation has been produced in a side part of the vehicle body;

deformation determining means for determining a deformation of a side part of the vehicle body as set forth in any of claims 14 to 21, 27–29, 32–34, or 36–38; and general determination means for selecting one of the first crash determination system and the second crash determination system depending on a determination result of the deformation determining means.

43. A recording medium recording a program for allowing all or a part of the constituent means of the device as set forth in any of claims 14 to, 21, 27–29, 32–34 or 36–38 to function.

* * * * *

UNITED STATES PATENT AND TRADEMARK OFFICE
CERTIFICATE OF CORRECTION

PATENT NO.:   6,018,980
DATED     :   Feb. 1, 2000
INVENTOR(S):  KIMURA et al.

It is certified that error appears in the above-identified patent and that said Letters Patent is hereby corrected as shown below:

On the title page, item
[73] Change "NEC Home Electronics, Ltd." to read

-- NEC Corporation--

Signed and Sealed this

Twenty-second Day of August, 2000

Attest:

Q. TODD DICKINSON

Attesting Officer     Director of Patents and Trademarks